(12) United States Patent
Herman et al.

(10) Patent No.: US 11,173,440 B2
(45) Date of Patent: Nov. 16, 2021

(54) CENTRIFUGAL SEPARATOR WITH IMPROVED VOLUMETRIC SURFACE AREA PACKING DENSITY AND SEPARATION PERFORMANCE

(71) Applicant: Cummins Filtration IP, Inc., Columbus, IN (US)

(72) Inventors: Peter K. Herman, Stoughton, WI (US); Christopher E. Holm, Madison, WI (US); Mark V. Holzmann, Stoughton, WI (US); Arun P. Janakiraman, Stoughton, WI (US); Chirag D. Parikh, Madison, WI (US); Miao Li, McFarland, WI (US)

(73) Assignee: CUMMINS FILTRATION IP, INC., Columbus, IN (US)

( * ) Notice: Subject to any disclaimer, the term of this patent is extended or adjusted under 35 U.S.C. 154(b) by 221 days.

(21) Appl. No.: 16/466,711

(22) PCT Filed: Dec. 8, 2017

(86) PCT No.: PCT/US2017/065341
§ 371 (c)(1),
(2) Date: Jun. 5, 2019

(87) PCT Pub. No.: WO2018/107043
PCT Pub. Date: Jun. 14, 2018

(65) Prior Publication Data
US 2019/0299134 A1    Oct. 3, 2019

Related U.S. Application Data

(60) Provisional application No. 62/432,019, filed on Dec. 9, 2016.

(51) Int. Cl.
*B01D 45/12* (2006.01)
*B01D 45/14* (2006.01)
(Continued)

(52) U.S. Cl.
CPC .............. *B01D 45/14* (2013.01); *F01M 13/04* (2013.01); *B04B 5/005* (2013.01); *B04B 5/12* (2013.01);
(Continued)

(58) Field of Classification Search
CPC ................... B01D 45/14; F01M 13/04; F01M 2013/0422; F01M 2013/0461; B04B 7/12; B04B 2005/125; B04B 5/005; B04B 5/12
See application file for complete search history.

(56) References Cited

U.S. PATENT DOCUMENTS 463,794 A    11/1891   De Laval
806,346 A    12/1905   Kimball
(Continued)

FOREIGN PATENT DOCUMENTS

CN    104334284 A    2/2015
DE    10 2010 048 484    4/2012
(Continued)

OTHER PUBLICATIONS

International Search Report and Written Opinion from corresponding PCT Application No. PCT/US2017/065341, dated Feb. 23, 2018, pp. 1-6.
(Continued)

*Primary Examiner* — Dung H Bui
(74) *Attorney, Agent, or Firm* — Foley & Lardner LLP

(57) ABSTRACT

Various rotating coalescer elements are described. The rotating coalescer elements include various arrangements of stacked separator discs or cones. In some arrangements, the described rotating coalescer elements include a combination of stacked separator discs or cones and filter media. In some arrangements, the stacked separator discs are designed to provide the largest possible amount of radial-projected separation surface area in a given rotating cylindrical volume,
(Continued)

where flow to be cleaned is passing radially (outwardly or inwardly) through the rotating coalescer element. In some arrangements, this is achieved by stacking non-conical separating plates containing various area-maximizing features (e.g., spiral ribs, axial cylinders, spiral grooves, or spiral "V" shapes).

25 Claims, 42 Drawing Sheets

(51) Int. Cl.
*F01M 13/04* (2006.01)
*B04B 5/12* (2006.01)
*B04B 7/12* (2006.01)
*B04B 5/00* (2006.01)

(52) U.S. Cl.
CPC ........... *B04B 7/12* (2013.01); *B04B 2005/125* (2013.01); *F01M 2013/0422* (2013.01); *F01M 2013/0461* (2013.01)

(56) References Cited

U.S. PATENT DOCUMENTS

| | | | | |
|---|---|---|---|---|
| 970,477 | A * | 9/1910 | Dunn | B01D 46/10 55/422 |
| 2,998,100 | A * | 8/1961 | Pike | B01D 45/02 55/458 |
| 4,262,841 | A * | 4/1981 | Berber | B04B 7/14 494/66 |
| 4,479,790 | A * | 10/1984 | Bocckino | B04B 5/12 494/85 |
| 5,143,630 | A | 9/1992 | Rolchigo | |
| 5,637,217 | A | 6/1997 | Herman et al. | |
| 5,707,517 | A * | 1/1998 | Rolchigo | B01D 29/055 210/232 |
| 5,993,674 | A * | 11/1999 | Rolchigo | B01D 29/055 210/780 |
| 6,183,407 | B1 | 2/2001 | Hallgren et al. | |
| 6,602,180 | B2 | 8/2003 | Herman et al. | |
| 7,182,724 | B2 | 2/2007 | South | |
| 8,840,697 | B2 | 9/2014 | Dopper | |
| 10,786,775 | B2 * | 9/2020 | Oberli | B01D 45/16 |
| 2001/0029227 | A1 | 10/2001 | Herman et al. | |
| 2002/0045526 | A1 * | 4/2002 | Herman | B04B 5/005 494/75 |
| 2011/0180051 | A1 | 7/2011 | Schwandt et al. | |
| 2012/0174547 | A1 * | 7/2012 | Tornblom | B04B 5/005 55/461 |
| 2012/0234732 | A1 | 9/2012 | Cooke et al. | |
| 2015/0075377 | A1 | 3/2015 | Gorbach et al. | |
| 2016/0089680 | A1 * | 3/2016 | Buck | B01D 45/14 494/74 |
| 2017/0120176 | A1 * | 5/2017 | Ishida | B04B 7/14 |
| 2018/0117512 | A1 * | 5/2018 | Janakiraman | B01D 45/14 |
| 2018/0141057 | A1 * | 5/2018 | Hagqvist | B04B 9/02 |
| 2018/0169553 | A1 * | 6/2018 | Billiet | B01D 45/16 |
| 2018/0169556 | A1 * | 6/2018 | Parikh | B01D 46/0031 |
| 2018/0236461 | A1 * | 8/2018 | Pacy | B04B 3/00 |

FOREIGN PATENT DOCUMENTS

| | | |
|---|---|---|
| EP | 0 263 914 | 4/1988 |
| EP | 1 273 335 | 1/2003 |
| WO | WO-2009/050462 | 4/2009 |
| WO | WO-2016/159951 A1 | 10/2016 |

OTHER PUBLICATIONS

Ridley, J.N., Packing Efficiency in Sunflower Heads, Department of Mathematics, University of the Witwatersrand, Jun. 30, 1981, pp. 1-11.

Segerman, H., "The Sunflower Spiral and the Fibonacci Metric," Bridges 2010; Mathematics, Music, Art, Architecture, Culture, pp. 483-486.

Vogel, H., "A Better Way to Construct the Sunflower Head," Technische Universität Munchen, Lehrstuhl für Physik, Oct. 23, 1978, pp. 1-11.

First Chinese Office Action issued for CN 201780074915.9, dated Nov. 21, 2019, 6 pages.

\* cited by examiner

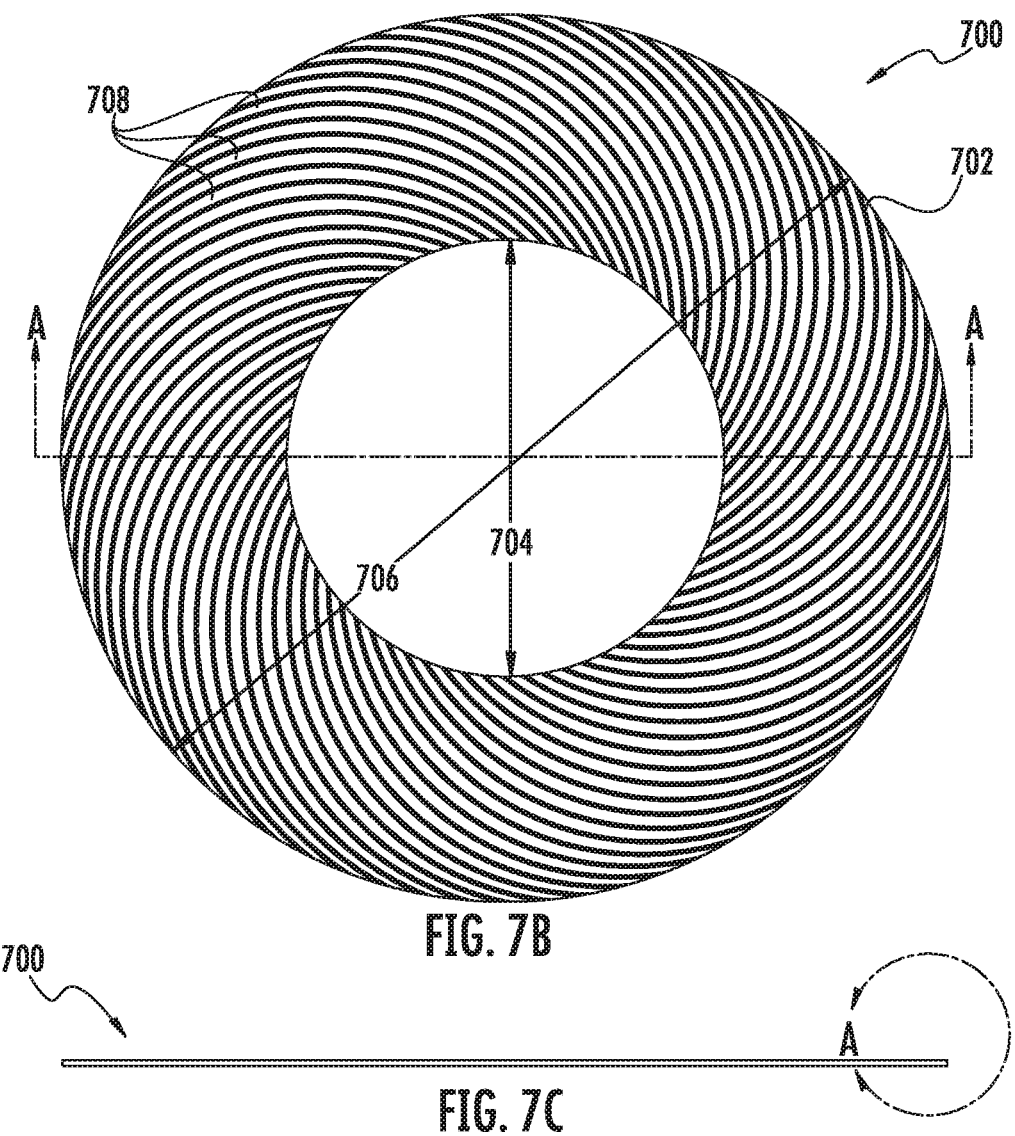
FIG. 7B
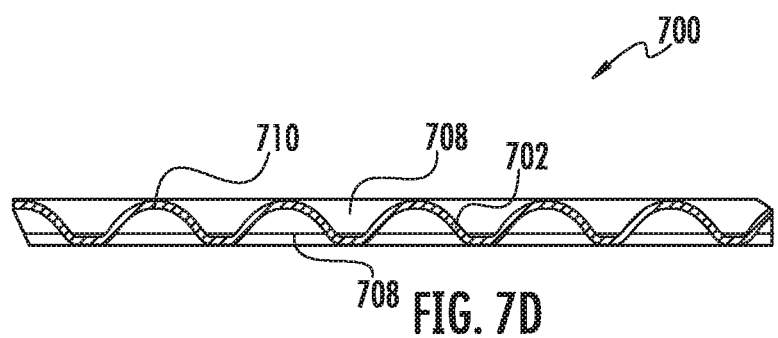
FIG. 7C
FIG. 7D

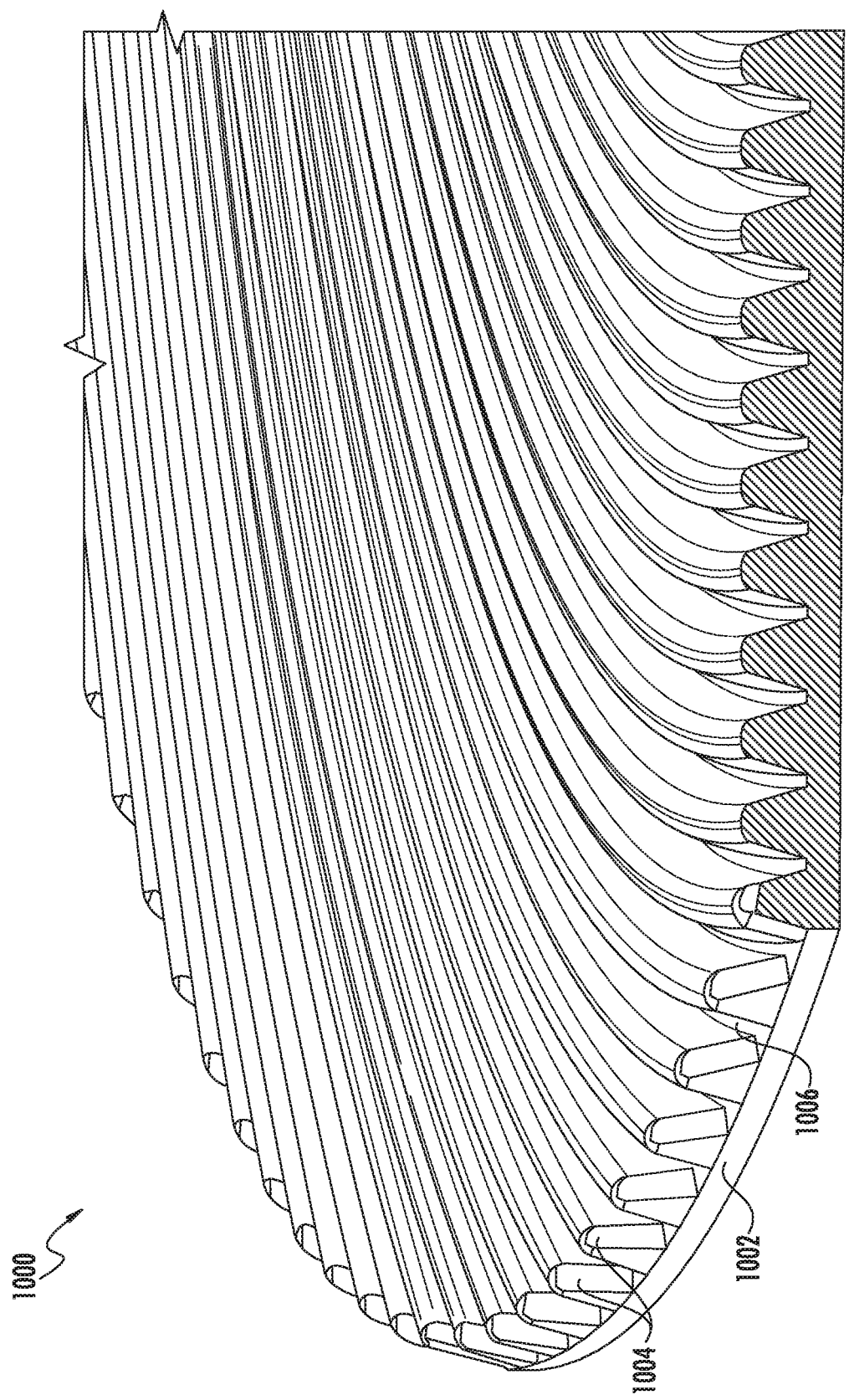

1200

1200

1200

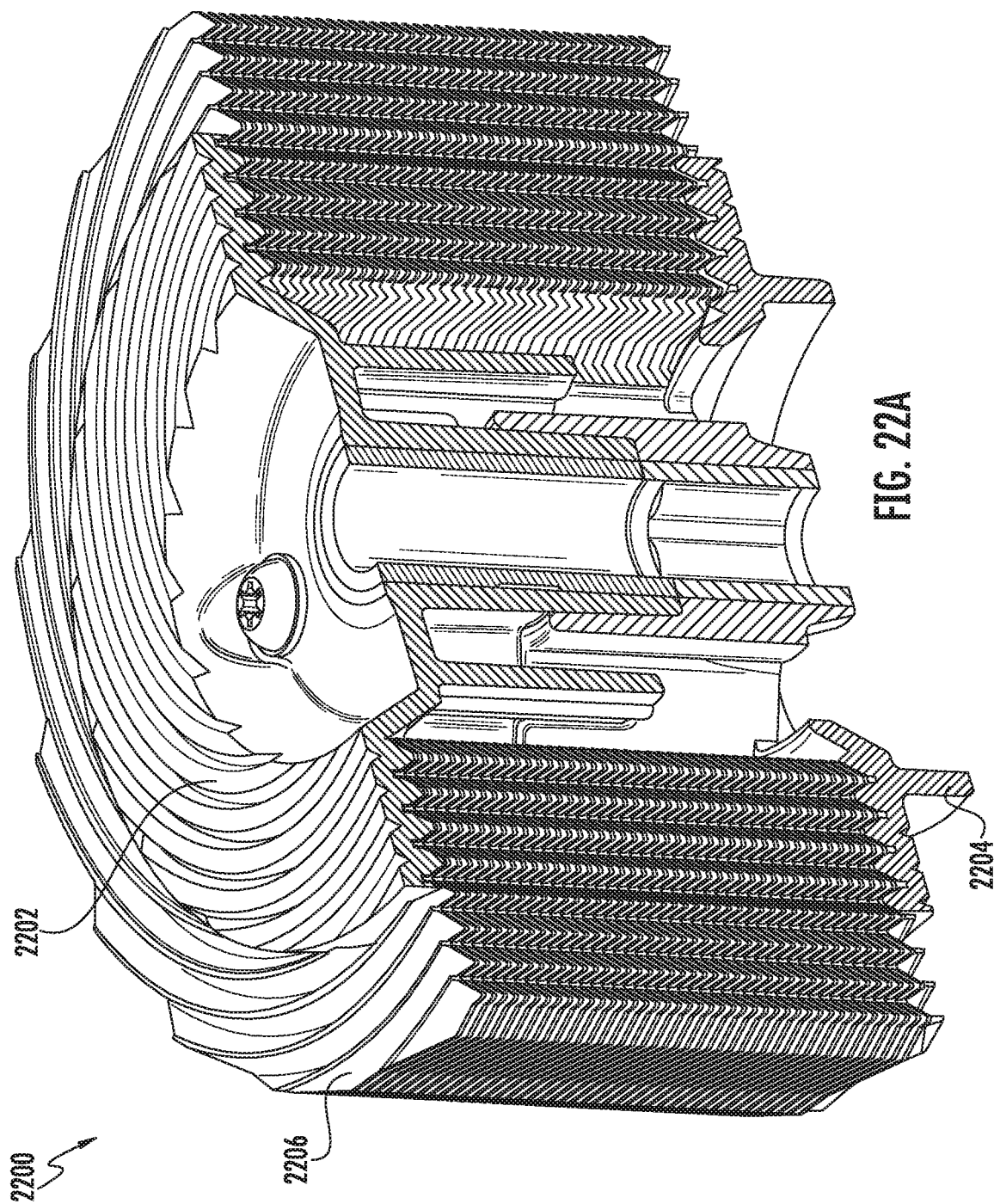

CENTRIFUGAL SEPARATOR WITH IMPROVED VOLUMETRIC SURFACE AREA PACKING DENSITY AND SEPARATION PERFORMANCE

CROSS-REFERENCE TO RELATED APPLICATIONS

This application is the U.S. national stage of PCT Application No. PCT/US2017/065341, filed Dec. 8, 2017, which claims priority to and benefit of U.S. Provisional Patent Application No. 62/432,019, filed Dec. 9, 2016 and entitled "Centrifugal Separator with improved Surface Area Packing Density and Separation Performance," the entire disclosure of which is incorporated herein by reference.

TECHNICAL FIELD

The present application relates to centrifugal separators.

BACKGROUND

During operation of an internal combustion engine, a fraction of combustion gases can flow out of the combustion cylinder and into the crankcase of the engine. These gases are often called "blowby" gases. The blowby gases include a mixture of aerosols, oils, and air. If vented directly to the ambient, the blowby gases can harm the environment. Accordingly, the blowby gases are typically routed out of the crankcase via a crankcase ventilation system. The crankcase ventilation system may pass the blowby gases through a coalescer (i.e., a coalescing filter element) to remove a majority of the aerosols and oils contained in the blowby gases. The filtered blowby gases ("clean" gases) are then either vented to the ambient (in open crankcase ventilation systems) or routed back to the air intake for the internal combustion engine for further combustion (in closed crankcase ventilation systems).

Some crankcase ventilation systems utilize rotating coalescer elements that increase the filter efficiency of the crankcase ventilation systems by rotating the coalescer element during filtering. In rotating coalescer elements, the contaminants (e.g., oil droplets suspended and transported by blowby gases) are separated at least in part by centrifugal separation techniques. Additionally, the rotation of the coalescer element can create a pumping effect, which reduces the pressure drop through the crankcase ventilation system.

Rotating coalescer elements include a separating element that can include filter media, stacks of separating cones, stacks of separating discs, or a combination thereof. However, existing arrangements have drawbacks. For example, filter media (e.g., fibrous filter media) may be plugged by insoluble particles or semi-solids gradually that collect and block the small-sized pore spaces within the filter media. This gradual pore blockage leads to slowly declining filter media permeability, slowly rising pressure loss across the crankcase ventilation system, and eventually flow bypass via dynamic seal in the crankcase ventilation systems, which results reduced separation efficiency. Thus, the rotating element requires periodic replacement as the pores clog. As another example, existing stacks of separating plates (or cones), which have larger flow passages than filter media separators, may not be as prone to clogging but are less efficient at removing aerosols and oils from the crankcase blowby gases. Additionally, the stacks of separating plates and cones have a low packing density, which either requires the crankcase ventilation systems to increase in size or have a reduced separating efficiency.

SUMMARY

One example embodiment relates to a separating plate for a rotating separator element. The separating plate includes a main body having an annular shape defined by an inner diameter and an outer diameter. The inner diameter defines a central opening. The outer diameter defines an outer edge of the main body. The main body includes a plurality of bends forming a plurality of flow channels positioned between adjacent peaks of a plurality of peaks. Each of the plurality of flow channels extends from the inner diameter to the outer diameter. Each of the plurality of peaks is associated with one of the plurality of bends. The plurality of bends has a spiral shape such that each of the channels is also defined by the spiral shape.

Another example embodiment relates to a rotating coalescer element. The rotating coalescer element includes a first endcap, a second endcap, and a separating device positioned between the first endcap and the second endcap. The separating device comprises a plurality of separating plates arranged in an axially aligned stack. Each of the plurality of separating plates includes a main body having an annular shape defined by an inner diameter and an outer diameter. The inner diameter defines a central opening. The outer diameter defines an outer edge of the main body. The main body includes a plurality of bends forming a plurality of flow channels positioned between adjacent peaks of a plurality of peaks. Each of the plurality of flow channels extends from the inner diameter to the outer diameter. Each of the plurality of peaks is associated with one of the plurality of bends. The plurality of bends has a spiral shape such that each of the channels is also defined by the spiral shape.

A further example embodiment relates to a crankcase ventilation system for an internal combustion engine. The crankcase ventilation system includes a rotating coalescer element. The rotating coalescer element includes a first endcap, a second endcap, and a separating device positioned between the first endcap and the second endcap. The separating device comprises a plurality of separating plates arranged in an axially aligned stack. Each of the plurality of separating plates includes a main body having an annular shape defined by an inner diameter and an outer diameter. The inner diameter defines a central opening. The outer diameter defines an outer edge of the main body. The main body includes a plurality of bends forming a plurality of flow channels positioned between adjacent peaks of a plurality of peaks. Each of the plurality of flow channels extends from the inner diameter to the outer diameter. Each of the plurality of peaks is associated with one of the plurality of bends. The plurality of bends has a spiral shape such that each of the channels is also defined by the spiral shape.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE FIGURES

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

FIG. 3A shows a perspective view of the separator plate. FIG. 3B shows a top view of the separator plate. FIG. 3C shows a cross-sectional view of the separator plate taken at section A-A of FIG. 3B. FIG. 3D shows a detailed cross sectional view of the separator plate.

FIGS. 7A through 7D show views of a separator plate according to an example embodiment. FIG. 7A shows a perspective view of a plurality of the separator plates arranged in a stacked manner. FIG. 7B shows a top view of the separator plate. FIG. 7C shows a cross-sectional view of the separator plate taken at section A-A of FIG. 7B. FIG. 7D shows a detailed cross-sectional view of the separator plate.

FIG. 9A shows a perspective view of the separator plate. FIG. 9B shows a top view of the separator plate. FIG. 9C shows a cross-sectional view of the separator plate taken at section A-A of FIG. 9B.

FIG. 10 shows a perspective cross-sectional view of a separator plate 1000 according to another example embodiment.

FIG. 11A shows a perspective view of the separator plate. FIG. 11B shows a top view of the separator plate. FIG. 11C shows a cross-sectional view of the separator plate taken along section A-A of FIG. 11B.

FIG. 12A shows a perspective view of the separator plate 1200. FIG. 12B shows a top view of the separator plate. FIG. 12C shows a cross-sectional view of the separator plate 1200. FIG. 12D shows a view of a plurality of separator plates 1200 arranged in a stacked formation. FIG. 12E shows a close-up view of the plurality of separator plates 1200 as stacked in FIG. 12D.

FIG. 13A shows a perspective view of the separator cone. FIG. 13B shows a top view of the separator cone. FIG. 13C shows the separator cone arranged as a cone-stack in a rotating filter element.

FIG. 14A is a perspective view of the separator plate. FIG. 14B is a top view of the separator plate. FIG. 14C is a perspective view of a stack of separator plates.

FIG. 15A shows a top view of the separator plate. FIG. 15B shows a perspective cross-sectional view of the separator plate.

FIG. 16A shows a top view of the separator plate. FIG. 16B shows a perspective view of a plurality of the separator plates arranged in a stacked configuration.

FIG. 17A shows a side view of the separating element. FIG. 17B shows a cross-sectional perspective view of the separating element. FIGS. 17C and 17D each show different top views of the separating element.

FIG. 18A shows a cross-sectional view of a first arrangement of the separating element using a corrugated media. FIG. 18B shows a cross-sectional view of a second arrangement of the separating element.

FIGS. 22A through 22E show views of a separating element according to an example embodiment, where FIG. 22A shows a cross-sectional perspective view of the rotating coalescer element; FIG. 22B shows a close-up cross-sectional view of the interaction between a bottom endcap of the rotating coalescer element and the stack of separator plates; FIG. 22C shows a cross-sectional perspective view of the rotating coalescer element having the stack of separator plates removed. FIG. 22D shows a perspective view of the bottom endcap; and FIG. 22E shows a perspective view of the top endcap.

DETAILED DESCRIPTION

Referring to the figures generally, various rotating coalescer elements are described. The rotating coalescer elements include various arrangements of stacked separator plates or cones. In some arrangements, the described rotating coalesces elements include a combination of stacked separator plates or cones and filter media. In some arrangements, the stacked separator plates are designed to provide the largest possible amount of radial-projected separation surface area in a given rotating cylindrical volume, where flow to be cleaned is passing radially (outwardly or inwardly) through the rotating coalescer element. In some arrangements, this is achieved by stacking non-conical separating plates containing various area-maximizing features (e.g., spiral ribs, axial cylinders, spiral grooves, or spiral "V" shapes) that are described in further detail below. The described rotating coalescer elements are non-plugging and service free. The described rotating coalescer elements are described in the context of crankcase ventilation units for internal combustion engines (e.g., diesel internal combustion engines); however, the same arrangements can be used within other liquid-solid centrifugal separators, such as industrial oil centrifuges, fuel centrifuges, and the like.

Figure 1:
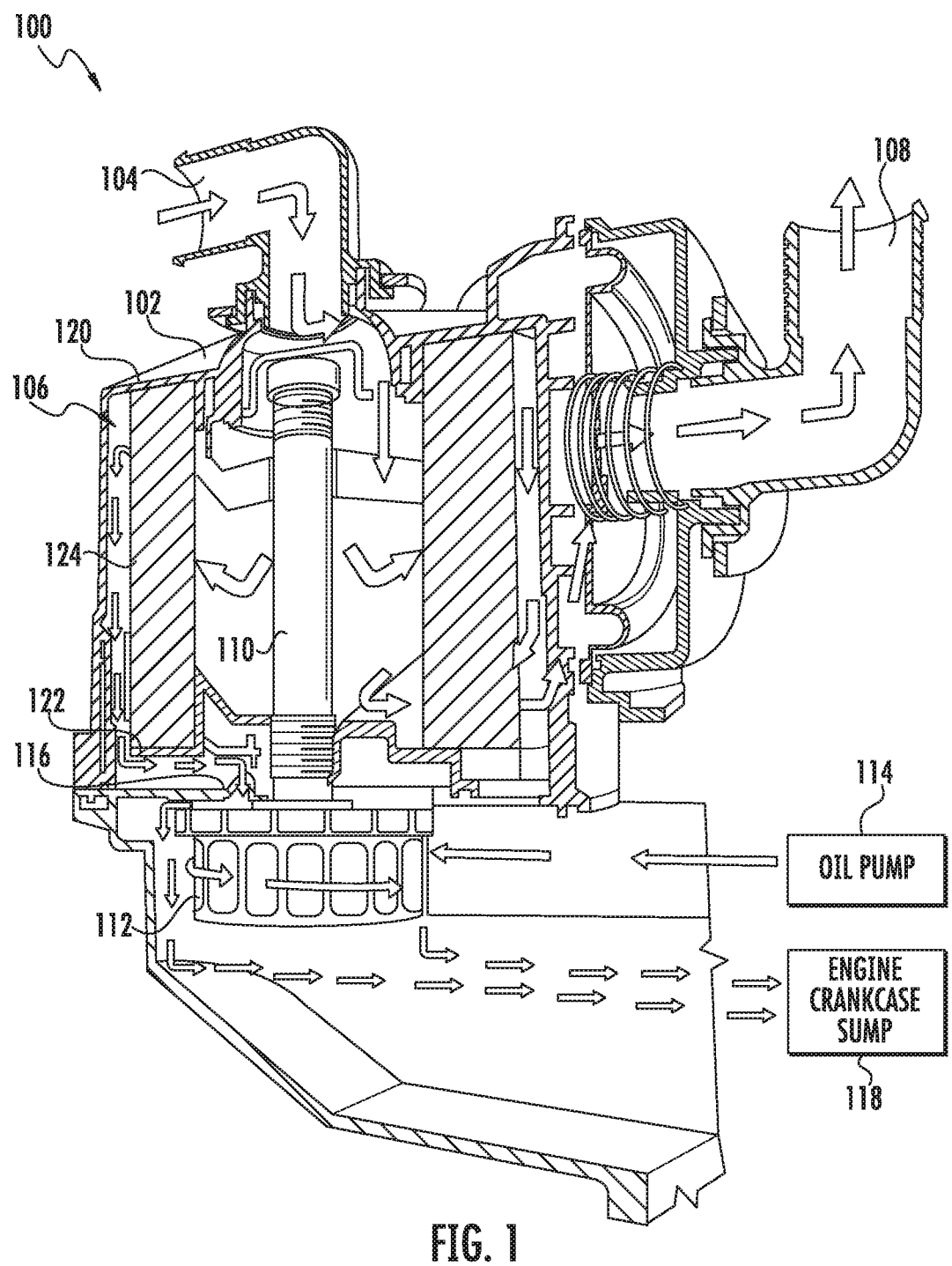
FIG. 1 shows a cross-sectional view of a crankcase ventilation system according to an example embodiment.

Referring to FIG. 1, a cross-sectional view of a crankcase ventilation system 100 is shown according to an example embodiment. The crankcase ventilation system 100 generally processes blowby gases received from an internal combustion engine crankcase to remove aerosols, oils, and other particulate contained in the crankcase blowby gases. The crankcase ventilation system 100 generally includes a housing 102 having an inlet 104 that receives crankcase blowby gases to be filtered, a central compartment having a rotating coalescer element 106 installed therein, and an outlet 108 that provides filtered blowby gases to the internal combustion engine (in a closed crankcase ventilation system) or to the ambient (in an open crankcase ventilation system).

During operation of the crankcase ventilation system 100, blowby gases enter the housing 102 through the inlet 104. The blowby gases are directed to the central compartment where the blowby gases flow through the rotating coalescer element 106 in an inside-out manner. In an alternate arrangement, the crankcase ventilation system 100 can be configured to have an outside-in flow arrangement. The rotating coalescer element 106 is coupled to a central shaft 110 that transfers rotation to the rotating coalescer element 106. In FIG. 1, the central shaft 110 is rotationally driven by a turbine 112 (i.e., a pelton wheel, a bucket wheel, etc.) that is rotated by a jet of oil generated by an oil pump 114. In alternate arrangements, the central shaft 110 is rotated by an electric motor, a mechanical coupling with the internal combustion engine, or the like. The rotating coalescer element 106 separates oil, aerosols, and other contaminants contained in the blowby gases. The separated contaminants drain from the housing 102 through a drain 116 and return to the engine crankcase sump 118.

Figure 2A:
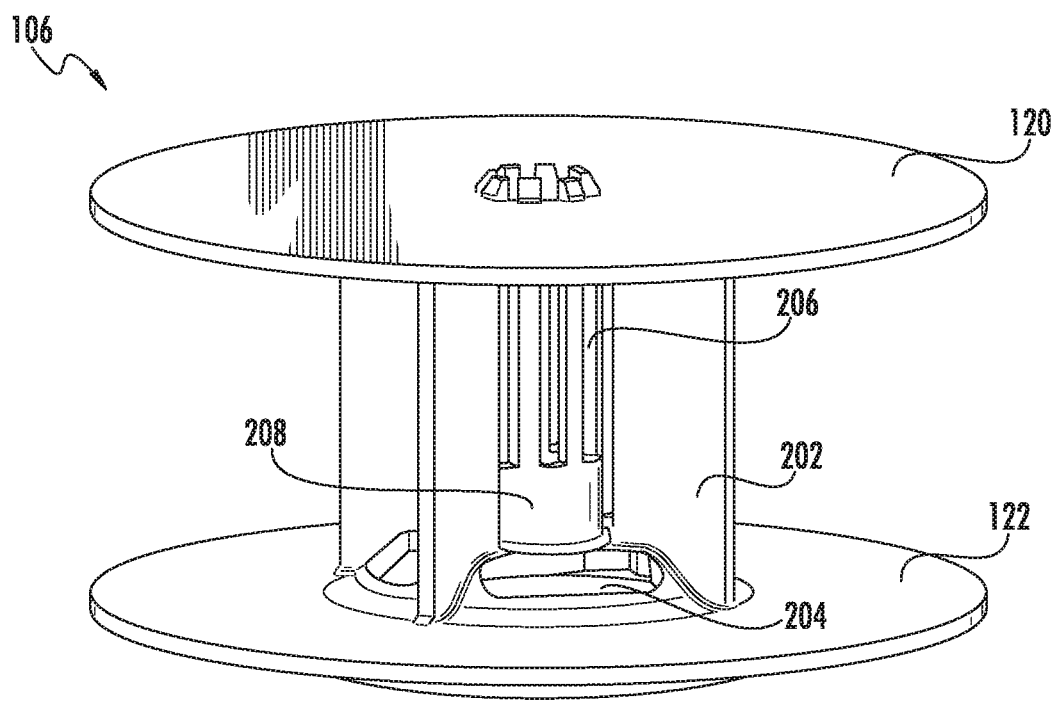
FIG. 2A shows a perspective view of the rotating coalescer element of FIG. 1 with the separating device removed.
Figure 2B:
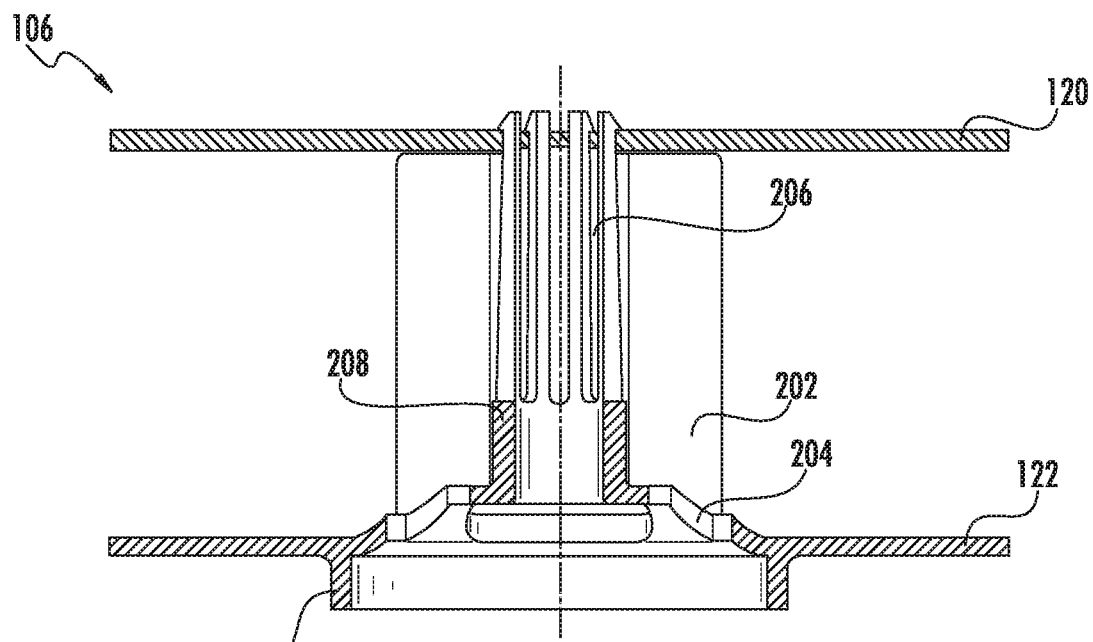
FIG. 2B shows a cross-sectional view of the rotating coalescer element of FIG. 1 with the separating device removed.

The rotating coalescer element 106 generally includes a first endcap 120, a second endcap 122, and a separating device 124. Views of the rotating coalescer element 106 without the separating device 124 are shown in FIGS. 2A and 2B. FIG. 2A shows a perspective view of the rotating coalescer element 106 with the separating device 124 removed. FIG. 2B shows a cross-sectional view of the rotating coalescer element 106 with the separating device 124 removed. In some arrangements, the first endcap 120 and the second endcap 122 are coupled via a snap-fit connection. The rotating coalescer element 106 includes centering ribs 202 that help center a plurality of stacked separator plates included in the separator device 124 in the rotating coalescer element 106. The centering ribs 202 may be radial or spiral in shape. The rotating coalescer element 106 includes axial flow inlet ports 204 on the second endcap 122. Additional inlet ports 206 are positioned on the central support tube 208 that connects the first endcap 120 and the second endcap 122. The second endcap 122 further includes an annular projecting ring 210 that is configured to form a dynamic seal with a housing projection to minimize and control recirculation of pumping flow generated by the rotating coalescer element 106.

The separating device 124 includes a plurality of stacked separator plates or separator walls that are designed to separate the oil, aerosols, and other contaminants contained in the blowby gases through centrifugal separation. Various arrangements of the stacked separator plates or separator walls are described in further detail with respect to FIGS. 3A-18B.

Figure 3A:
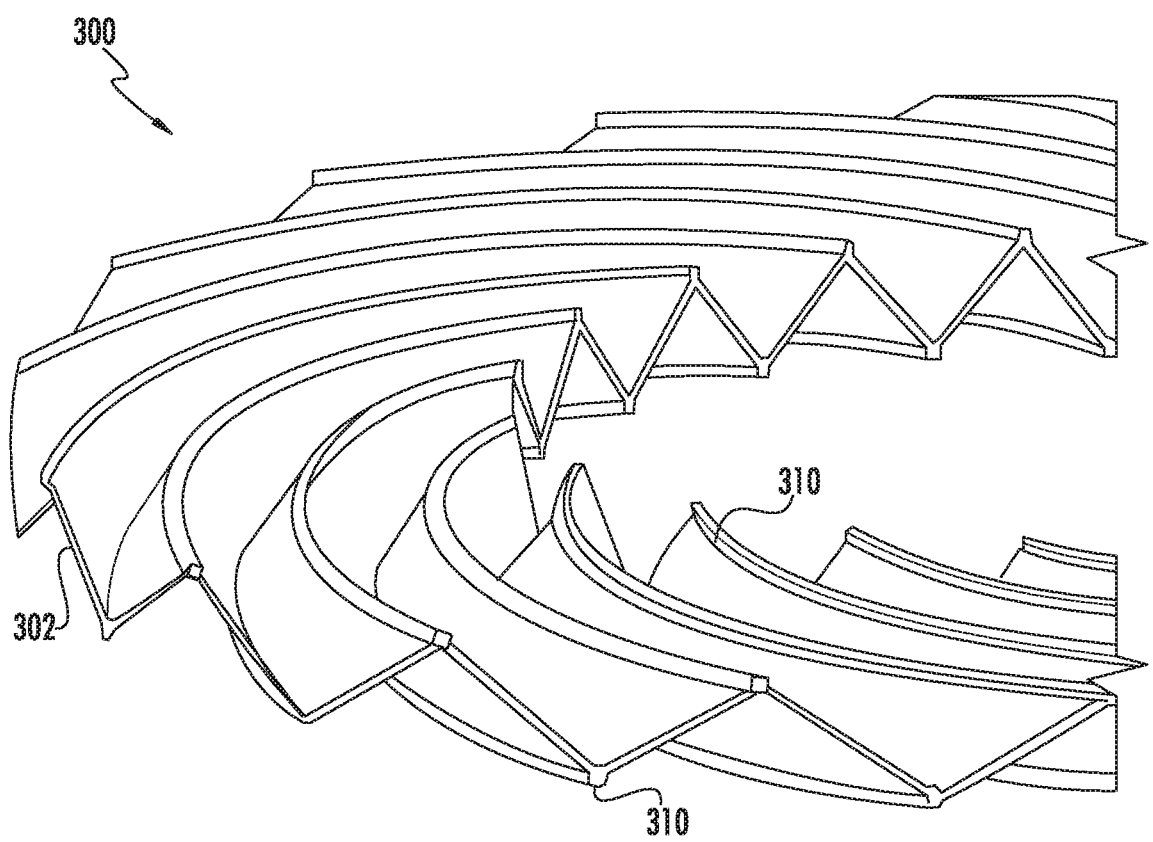
FIGS. 3A through 3D show various views of a separator plate according to an example embodiment.
Figure 3B:
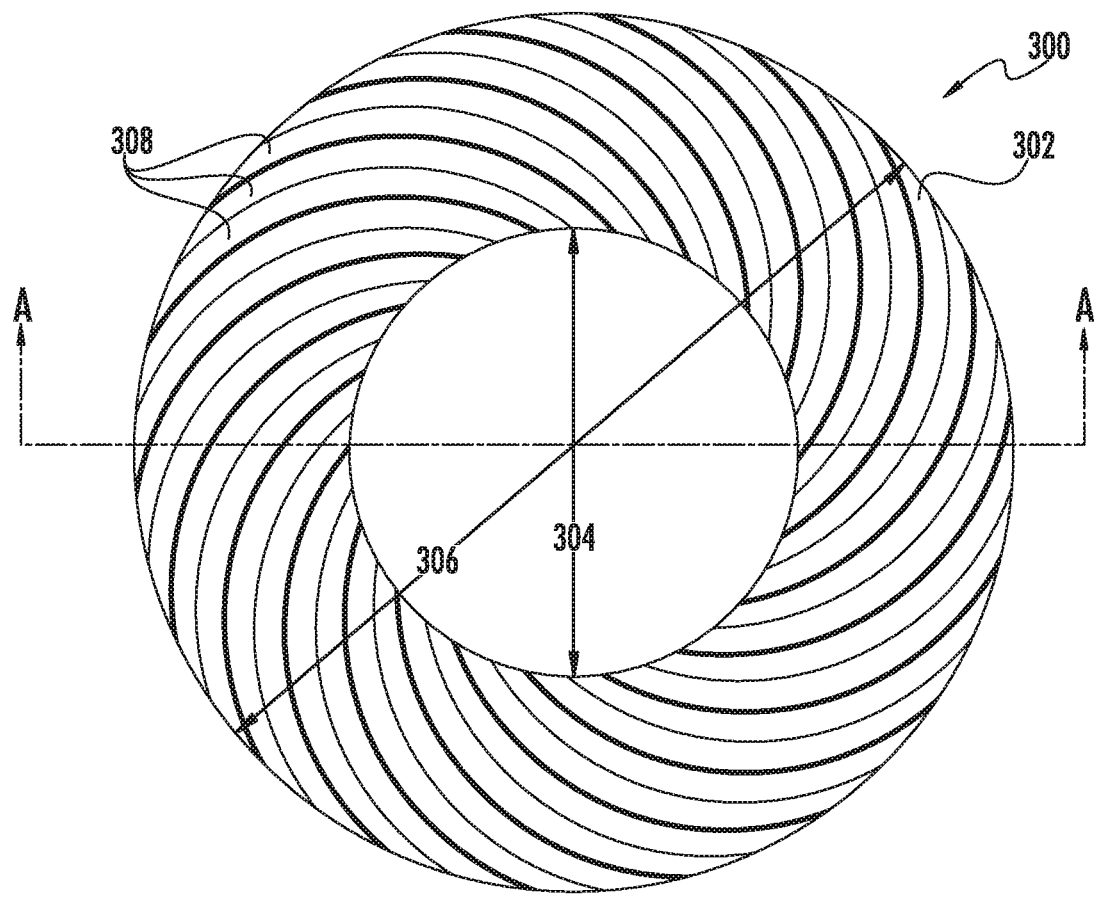
Figure 3C:
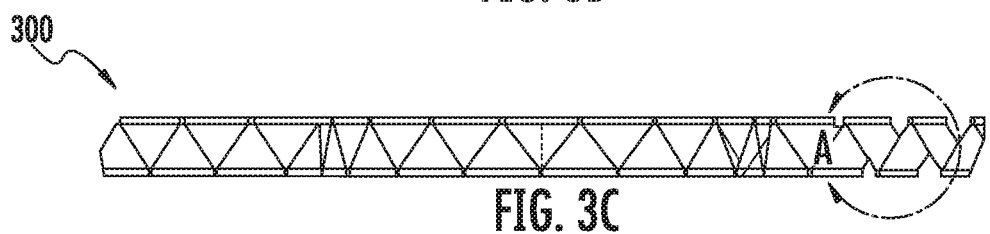
Figure 3D:
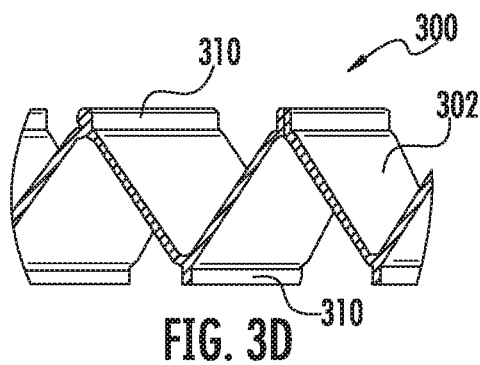

Referring to FIGS. 3A through 3D views of a separator plate 300 are shown according to an example embodiment. FIG. 3A shows a perspective view of the separator plate 300. FIG. 3B shows a top view of the separator plate 300. FIG. 3C shows a cross-sectional view of the separator plate 300 taken at section A-A of FIG. 3B. FIG. 3D shows a detailed cross sectional view of the separator plate 300. The separator plate 300 has a main body 302 having an inner diameter 304 that defines a central opening and an outer diameter 306 that defines the outer edge of the separator plate 300. The main body 302 of the separator plate 300 is annular in shape (i.e., is disc-shaped) and includes a plurality of flow channels 308 having a spiral shape. The separator plate 300 may be formed through a molding manufacturing process (e.g., injection molding).

As shown best in FIGS. 3A and 3D, the flow channels 308 are formed on both a top and bottom side of the main body 302 by bends in the main body 302 that provide a V-shape (or inverted V-shape) to each of the flow channels 308. The V-shape provides the separator plate 300 with an overall waffled shape. Each peak of a given flow channel 308 includes a spacer rib 310. The spacer rib 310 maintains a gap between adjacent separator plates 300 when the separator plates 300 are stacked one on top of the other to form the separating device 124. A plurality of the separator plates 300 may be stacked one on top of the other to form the separating device 124 of the rotating coalescer element 106.

As shown best in FIG. 3B, the spiral shape for each of the flow channels 308 is chosen such that each flow channel 308 has a uniform channel width (or approximately a uniform channel width that varies within 10% of the average channel width) from the inner diameter 304 to the outer diameter 306. In some arrangements, the uniform channel width is achieved by selecting a source spiral that is an involute spiral with a starting radius of approximately 70% of the inner diameter 304 (as discussed in further detail below with respect to Equations 2 through 10). In an alternate arrangement, the uniform channel width is achieved through the use of an Archimedean spiral having an optimized Archimedean spiral equation (e.g., having an optimized exponent of approximately 0.71, having a ratio of the outer diameter 306 to the inner diameter 304 being about two, and having an intercept angle of forty-five degrees. The constant channel width eliminates a "flaring out" of the flow channel thereby providing maximized effective separation area of each of the flow channels 308 via an increased average interception angle. The effective surface area of each flow channel 308 can be further increased by adding protrusions or separating ribs to each flow channel 308 (e.g., in a similar manner as described below with respect to FIGS. 7G, 7F, 12F, 12G, and 12H).

The separator plate 300 (as well as the below discussed alternate separator plates) are designed to provide increased "effective separation area" (ESA) and packing density (i.e., effective area per unit volume of the separating device 124) due to reduced end-loss over separator cone-stack designs because wasted space above/below/inside cones is reduced and also due to the larger radial intercept angles possible as compared to the conventional 45° cone surfaces of cone-stack designs. Further, the use of even steeper cone-stack angles, like 50°-60°, would result in even a disproportionate axial packing length requirement, which is avoided through the use of the above-described separator plates 300. Accordingly, the above-described separator plates 300 are easier to manufacture via molding manufacturing processes because deep/long tool and part extraction is substantially eliminated.

ESA as used herein is defined by the "radial-normal" projected total surface area of the separating device 124 towards which particles or droplets migrate and deposit upon. The "flat" axial-perpendicular surfaces contribute nothing to effective area—only angled surfaces are beneficial. For example, a simple cylindrical surface would have an area of 2πRH (where R is the radius of the cylinder and H is the axial height of the cylinder), whereas a straight radial vane would have an area of zero (since it is purely radial surface). Mathematically, this effective area can be described as the projected area that is perpendicular to the local centrifugal force (radial) vector direction, and can be calculated using the following surface integral defined in Equation (1).

$$\iint_S \vec{f} \cdot \vec{n} \, dA \tag{1}$$

Figure 4:
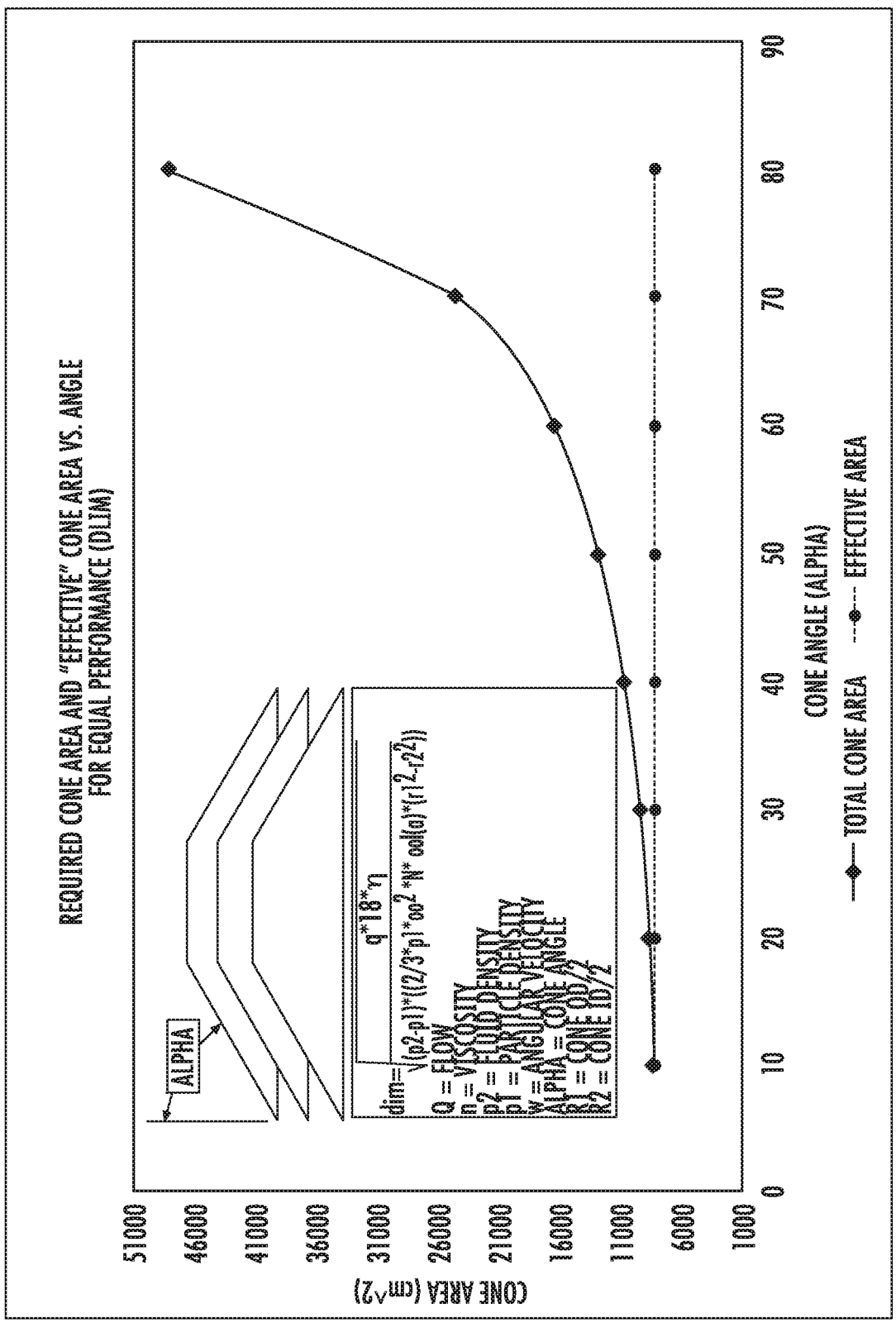
FIG. 4 shows a graph of required cone area and effective cone area vs. angle for equal d lim performance.

In Equation (1), $\vec{f}$ is the unit centrifugal force vector and $\vec{n} \, dA$ is the differential area element normal vector on the surface of the vanes. The relative separation performance of a separator is strongly dependent upon this ESA, along with flowrate, rotational speed, outer diameter (OD) and inner diameter (ID) of the separator plates 300, fluid viscosity, particle density, and fluid density. For example, conventional plate-stack separators have a "limiting" particle size (above which, efficiency is 100%) that has been derived theoretically based upon particle migration trajectory towards cone surface in a uniform flow field assumption. This relationship is shown in the graph of FIG. 4. According to the relationship, for a given ESA as calculated via Equation (1), the separation performance (d lim) should be equal, even if structure surfaces are of non-conical geometries. As an example, using the cone stack d lim equation (shown in FIG. 4), it is shown that the ESA required for a given d lim remains constant across wide range of cone angles (as shown by the flat line of FIG. 4) while the change in actual cone area increases exponentially (as shown by the curved line of FIG. 4) with all other parameters remaining fixed.

Figure 21:
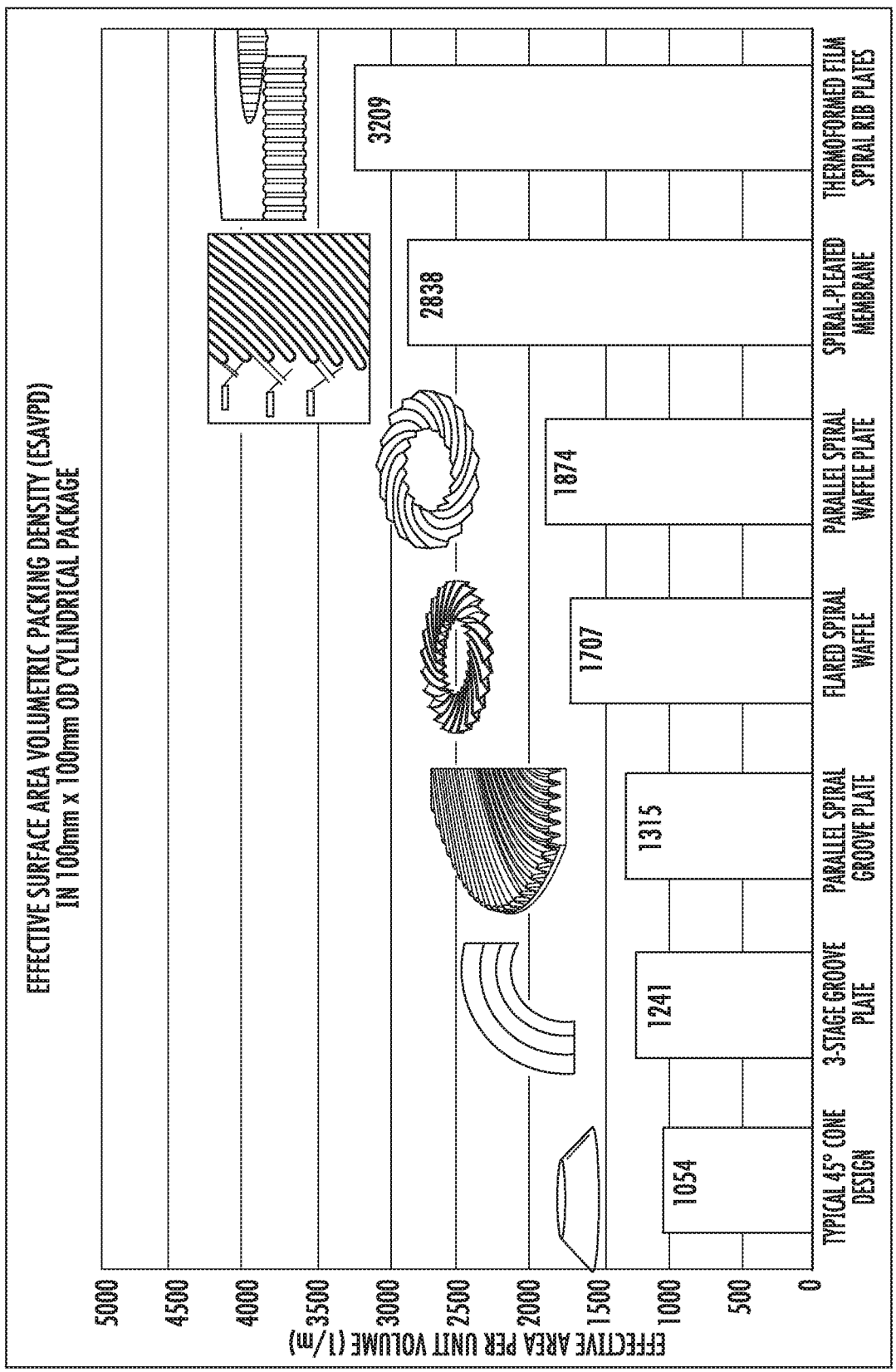
FIG. 21 shows a graph showing preliminary performance studies for some of the described separating plate/cone designs.

The described separator plates (e.g., separator plate 300) also have an associated ESA "volumetric packing density" (ESAVPD). As used herein, ESAVPD is defined as ESA per occupied package volume, with units 1/length. Separator plate designs having a higher ESAVPD are preferred over separator plate designs having a lower ESAVPD because a required degree of performance can be delivered in the minimum possible package space and/or at the lowest possible rotational speed (i.e., lower power consumption). Total surface area is a simple function of package volume and separator plate thickness, and for a given packaging solidity (volume of plates/total volume), the surface area (not ESA) approaches a very simple relationship of Area=2*Vol/stacking pitch, where the stacking pitch is the periodic repeat distance of the stacking elements having dimensions of length. As a working example, the calculations for surface area is calculated through for a package volume defined by a 1 m square cube. If 1 mm thick separator plates having a 2 m² area (i.e., each side of the separator plate is 1 m²) with 1 mm spacers between adjacent stacked plates were stacked up in the cube, 500 plates (at a 2 mm stacking pitch) would "fit" in the cube, which provides a total area of 1000 m² (calculated as Area=2*1/0.002=1000). ESA can then be calculated (approximately) by multiplying the calculated surface area with the sine of the average interception angle of the resulting surfaces with an axis-perpendicular ray. Subsequently, ESAVPD can then be calculated by dividing the ESA by the volume required for the package. For example, in the case of cones having a 45° interception angle, sin(45°)=0.707, the ESA computed for cones would be the surface area multiplied by 0.707 and divided by the volume taken up in the cone package stack. For case of a waffle design, the average interception angle may be 56°, so the multiplier with surface area would be sin(56°)=0.83. Comparing the ESAVPD of various plate configurations allows for a comparison of the relative advantage (or disadvantage) between different separator plate designs (e.g. as shown in the graph of FIG. 21).

Figure 5:
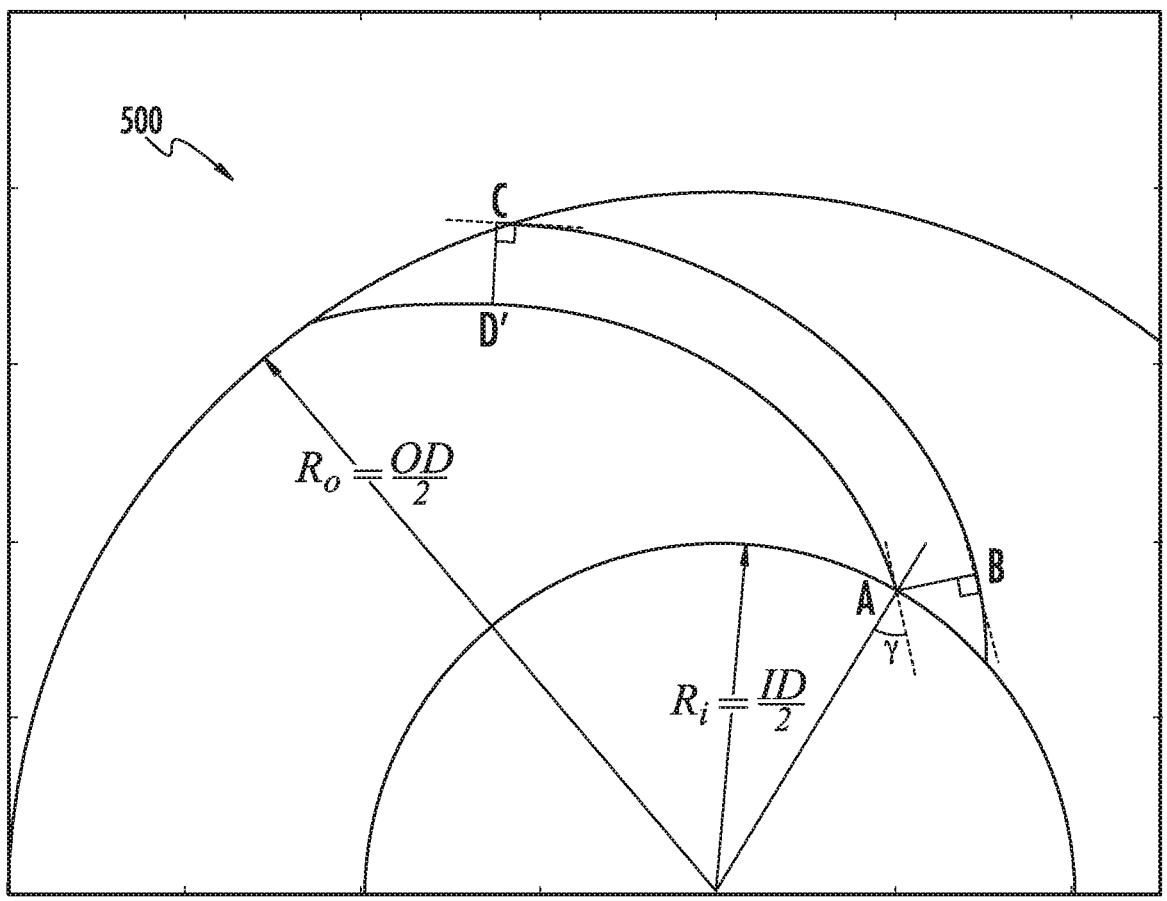
FIG. 5 shows an example spiral shape.

As described above with respect to FIGS. 3A through 3D, the spiral shape for each of the flow channels 308 is chosen such that each flow channel 308 has a uniform channel width (i.e., the normal surface-to-surface distance between the walls defining the flow channel 308) from the inner diameter 304 to the outer diameter 306. This is achieved through manipulation of an involute spiral shape. The mathematics of an involute spiral shape can be described by a number of mathematical equations. FIG. 5 shows a spiral shape 500 having various parameters labeled, which are used in the description of the following mathematical equations. Table 1 below describes the various parameters labeled in FIG. 5 along with additional parameters used in the following mathematical equations.

TABLE 1

| Symbol | Parameter | Equation |
|---|---|---|
| A | Cross point of rotated spiral and inner radius, | |
| B | Perpendicular foot of point A on source spiral, | |
| C | Cross point of source spiral and outer radius, | |
| D' | Cross point of rotated spiral and normal of source spiral at point C, | |

TABLE 1-continued

| Symbol | Parameter | Equation |
|---|---|---|
| H | Height of the seperation stack, | |
| ID | Inner diameter, | |
| OD | Outer diameter, | |
| $R_i$ | Inner radius, | |
| $R_o$ | Outer radius, | |
| $N_T$ | Number of arms in a full turn, i.e. from 0 to $2\pi$, | |
| a | Starting radius of a spiral, | |
| b | Successive turn factor of Archimedean spiral, or radius increase in addition to starting radius of a at radian $\theta$ of 1. | |
| m | Exponent factor of Archimedean spiral, | |
| r | Polar radius of a spiral, | |
| t | Parameter of involute spiral, i.e. the tangent angle, | |
| $t_{inlet}$, $t_i$ | Parameter of source involute spiral at inlet/inner radius, | $\tan(\gamma)$ |
| $t_{outlet}$, $t_o$ | Parameter of source involute spiral at outlet/outer radius, | $\sqrt{\sigma^2 - 1 + \sigma^2 \tan^2(\gamma)}$ |
| $\alpha$ | Normalized starting location of a spiral by inner radius, | $\dfrac{a}{R_i}$ |
| $\beta$ | Normalized successive factor of Archimedean spiral, | $\dfrac{b}{R_i}$ |
| $\delta$ | Shift angle between source spiral and rotated spiral, | $\dfrac{2\pi}{N_r}$ |
| $\theta$ | Polar angle of a spiral, | |
| $\theta_{inlet}$, $\theta_i$ | Polar angle of a source spiral a the inlet, or point i | |
| $\theta_{outlet}$, $\theta_o$ | Polar angle of a source spiral at outlet, or point C | |
| $\rho$ | Normalized polar radius of a spiral, | $\dfrac{r}{R_i}$ |
| $\gamma$ | Interception angle, the angle between radial line and tangent on a spiral, | |
| $\sigma$ | Ratio of outer diameter to inner diameter or outer radius to inner radius, | $\dfrac{OD}{ID} = \dfrac{R_o}{R_i}$ |

The following mathematical discussion describes the derivation of the optimized involute spiral used to define the flow channels 308 of the separator plate 300. An involute spiral is given by the equations of polar radius, Equations (2) and (3).

$$r(t) = a\sqrt{1+t^2} \tag{2}$$

$$\theta(t) = t - \tan^{-1}(t) \tag{3}$$

Once normalized by inner radius, $R_i$, Equation (2) transforms into Equation (4).

$$\rho(t) = \dfrac{a}{R_i}\sqrt{1+t^2}. \tag{4}$$

Given a desired interception angle, $\gamma$, the starting radius of spiral, a, takes the form defined by Equation (5).

$$a = R_i \cos(\gamma) \tag{5}$$

Accordingly, Equation (4) can be transformed into Equation (6) in view of Equation (5).

$$\rho(t) = \cos(\gamma)\sqrt{1+t^2} \tag{6}$$

To construct the spiral, the parameter, t, at both the inlet and the outlet, $t_{inlet}$ and $t_{outlet}$ must be known. The parameters $t_{inlet}$ and $t_{outlet}$ are defined by Equations (7) and (8), respectively.

$$t_{inlet} = \tan(\gamma) \tag{7}$$

$$t_{outlet} = \sqrt{\sigma^2 - 1 + \sigma^2 \tan^2(\gamma)} \tag{8}$$

Based on Equation (5), the starting radius/point, a, of an involute is always less than the inner radius, $R_i$, unless the interception angle is zero (i.e. the spiral is normal to inner radius). However, as shown best in FIG. 3B, the spiral defining the flow channels 308 is not normal to the inner radius (e.g., the spiral defining the flow channels 308 has a non-zero intercept angle $\gamma$ in the same manner as shown in FIG. 5). As discussed above, the performance of disclosed separation device 124 largely depends on the ESA, which is defined according Equation (1). Equation (1) can be rewritten according to Equations (9.1), (9.2), or (9.3).

$$ESA = \iint_A \vec{r} \cdot d\vec{A} \tag{9.1}$$

$$ESA = \iint_A \vec{r} \cdot \vec{n} \, dA \tag{9.2}$$

$$ESA = H\int_{\theta_i}^{\theta_o} \vec{r} \cdot \vec{n} \, ds \tag{9.3}$$

In Equations (9.1)-(9.3), H is the height of a single piece, $\vec{r}$ is the radial unit vector, $\vec{n}$ is the unit normal vector of a small piece of surface area dA, ds is a small arc length. Additionally, the integral $\int_{\theta_i}^{\theta_o} \vec{r} \cdot \vec{n} \, ds$ reduces to $\int_{\theta_i}^{\theta_o} r(\theta) d\theta$. Accordingly, given an interception angle $\gamma$ at inner radius, the ESA of an involute takes the form in equation (10).

$$ESA(\text{involute}) = \dfrac{1}{2}H \, R_i \, \cos(\gamma) \left[ t\sqrt{1+t^2} - \dfrac{1}{2}\ln\left(\dfrac{\sqrt{1+t^2}+t}{\sqrt{1+t^2}-t}\right) \right] \Bigg|_{t_i}^{t_o} \tag{10}$$

Figure 6:
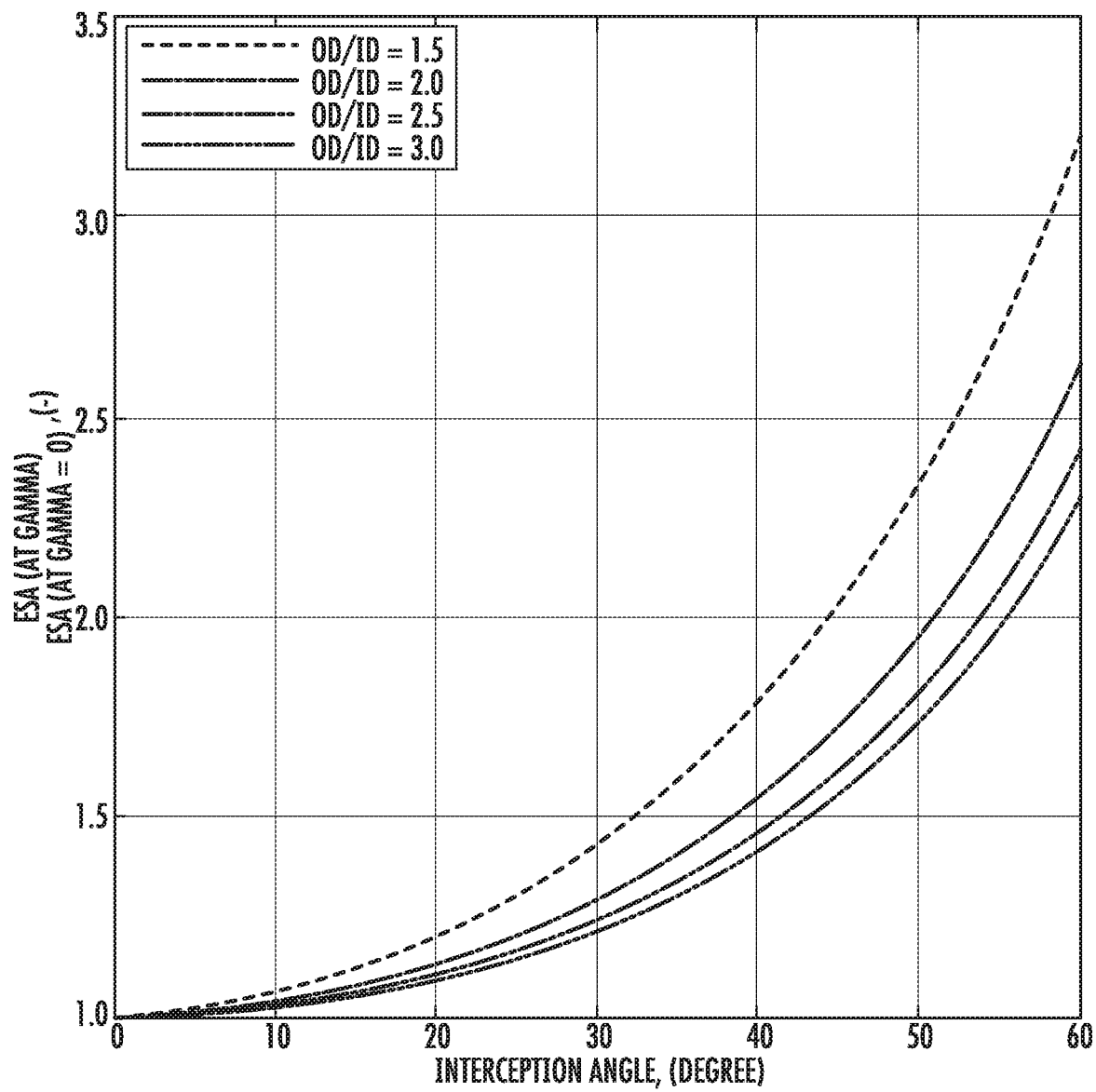
FIG. 6 shows a graph that plots the difference in ESA for an involute spirals having varying interception angles with various OD/ID ratios.

In Equation (10), the $t_i$ and $t_o$ are the parameters t at inlet and outlet of a given separator plate (e.g., the separator plate 300), as defined by Equations (7) and (8). Equation (10) is valid to both involutes with or without interception that is normal to the inner radius. FIG. 6 shows a graph that plot the difference in ESA for an involute spirals having varying interception angles with various OD/ID ratios. As shown in FIG. 6, spirals having an interception angle greater than zero have greater ESA with various OD/ID ratios.

As discussed above with respect to the separator plate 300, the shape of the spiral may also be defined by an Archimedean spiral (e.g., as approximated by a Chebyshev series mathematical function) instead of an involute spiral.

The optimal Archimedean spiral has an optimized exponent of approximately 0.71 for a specific case where the ratio of the outer diameter to the inner diameter is about two and the intercept angle is forty-five degrees. In other arrangements, the Archimedean spiral has an optimized exponent in the range of about 0.6 to 0.8.

FIGS. 7A through 16C describe alternate arrangements of separator plates that are formed with the above optimized spiral flow channel analysis.

Figure 7A:
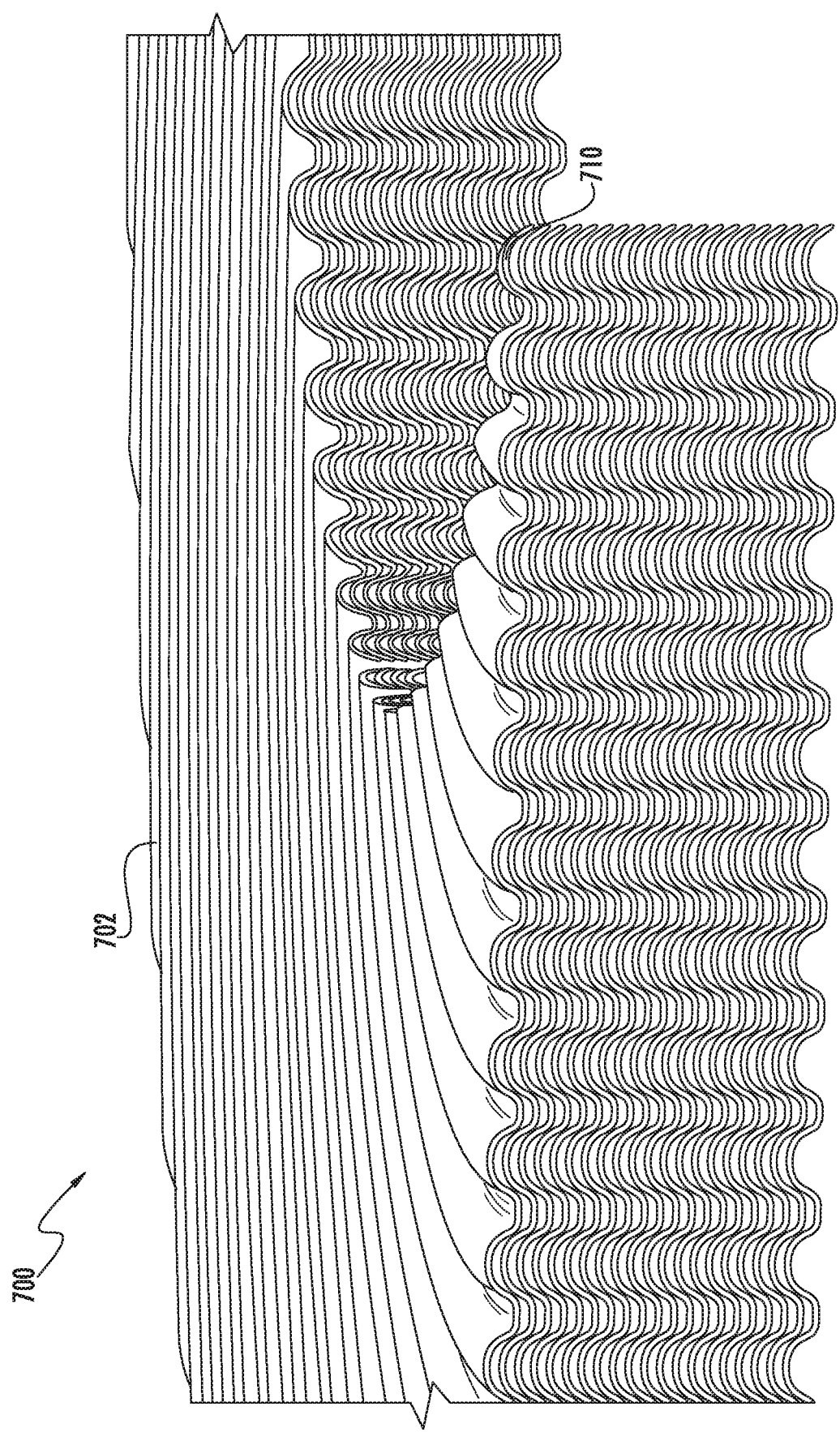

Referring to FIGS. 7A through 7D views of a separator plate 700 are shown according to an example embodiment. FIG. 7A shows a perspective view of a plurality of the separator plates 700 arranged in a stacked manner. FIG. 7B shows a top view of the separator plate 700. FIG. 7C shows a cross-sectional view of the separator plate 700 taken at section A-A of FIG. 7B. FIG. 7D shows a detailed cross-sectional view of the separator plate 700. The separator plate 700 is similar to the separator plate 300. The primary difference between the separator plate 700 and the separator plate 300 is the cross-sectional shape of the flow channels.

Figure 7F:
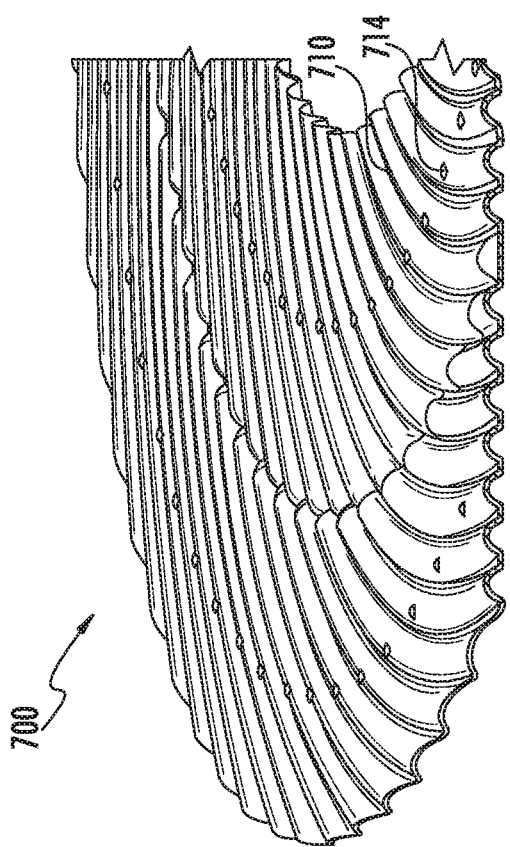
FIGS. 7F and 7G show another variation of the separator plates of FIGS. 7A through 7D where the separator plate includes spacers.
Figure 7G:
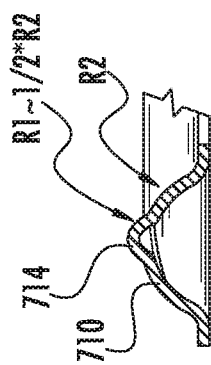
Figure 7E:
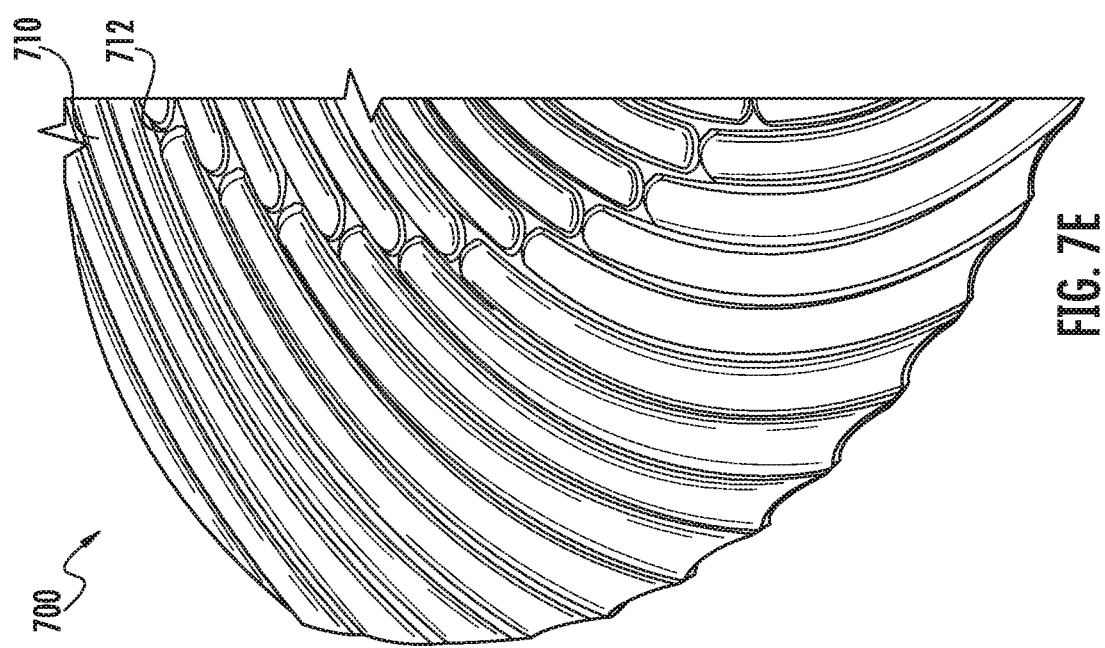
FIG. 7E shows a variation of the separator plate of FIGS. 7A through 7D where the separator plate includes discontinuous bumps.

The separator plate 700 has a main body 702 having an inner diameter 704 that defines a central opening and an outer diameter 706 that defines the outer edge of the separator plate 700. The main body 702 may be a thin film having a thickness of approximately 0.1-0.2 mm. The main body 702 of the separator plate 700 is annular in shape (i.e., is disc-shaped) and includes a plurality of flow channels 708 having a spiral shape. In some arrangements, the intercept angle of the spiral shape is forty-five degrees and the starting point of the involute spiral is approximately 70% of the inner diameter 704. In some arrangements, the plurality of flow channels 708 are formed in the separator plate 700 main body 702 through a vacuum thermoforming process, such that the main body 702 includes small spiral "bumps" 710 of radius somewhat larger than the thickness of the main body 702 (e.g., 2-10 times larger than the thickness of the main body 702). This creates geometry for the separator plate 700 whereby the bump 710 shape coupled with an approximately constant material thickness prevents the separator plates 700 from fully nesting when stacked (e.g., as shown in FIG. 7A). Accordingly, when the separator plates 700 are stacked, spiral flow gap channels are and surface area are created for particles impingement on surfaces of spiral bump. Due to the thinness of main body 702 and the high density of the flow channels 708 bumps, which leads to a large number of the separator plates 700 that can be stacked in a given volume, i.e. the ESAVPD of the separator plate 700 is very high. Referring to FIGS. 7E, 7F, and 7G variations of the separator plate 700 are shown.

FIG. 7E shows a variation of the separator plate 700 where the bumps 710 are discontinuous between the inner diameter 704 and the outer diameter 706. Accordingly, in such an arrangement, the bumps 710 are separated by an interruption 712. The interruption 712 minimally reduces ESA of the separator plate 700. However, the interruption 712 allows for cross flow between adjacent flow channels 708, thereby allowing flow through the separator plate 700 to bypass a possible blockage (e.g., a blockage caused by a large solid particle, or other material) in a first channel to the neighboring unblocked channel of the flow channels 708. The channel discontinuity feature may be applied to any of the described separator plates in this disclosure.

FIGS. 7F and 7G show a variation of the separator plate 700 where the bumps 710 include a smaller, spacer bump 714 on the peaks of the bumps 710. The spacer bumps 714 maintain the spacing of a stacked arrangement of the separator plates 700 (e.g., as shown in FIG. 7A). The radius of the spacer bumps 714 is approximately one-half of the radius of the bumps 710. The spacer bumps 714 may be hemispherical in shape. In an alternative arrangement, the spacer bumps 714 are replaced by small (i.e., <0.5 mm diameter) perforations at the top of the bumps 710 that are intermittently punched/formed through the bumps 710 of the main body 702. In such an arrangement, the projecting/extruded/folded-over edge of the displaced material of the perforation creates the desired stand-off feature that maintains the spacing between adjacent separator plates 700.

Figure 8:
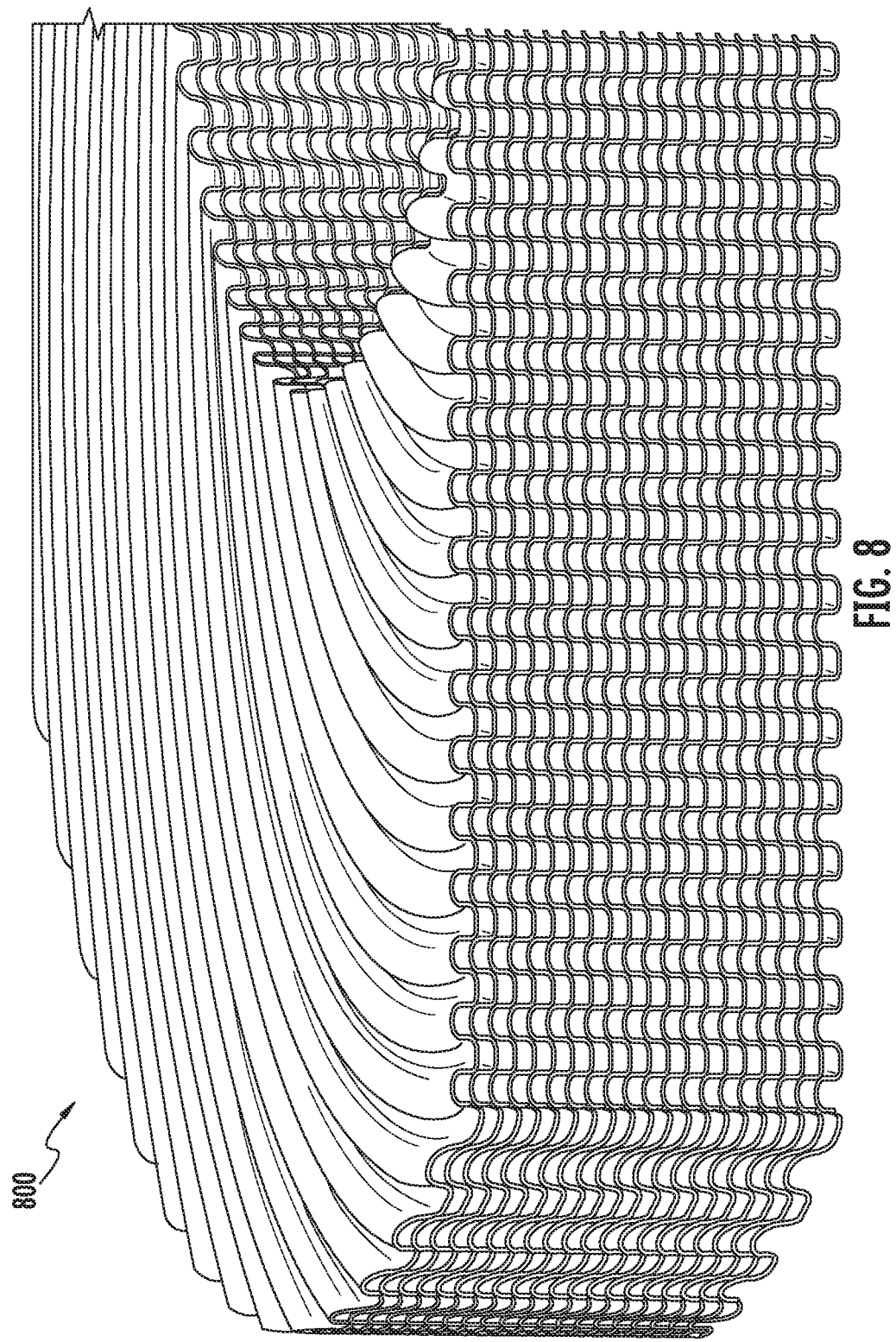
FIG. 8 shows a stack of separator plates 800 is shown according to an example embodiment.

Referring to FIG. 8, a stack of separator plates 800 is shown according to an example embodiment. The separator plates 800 are substantially the same as the separator plates 700. The only difference between the separator plates 800 and the separator plates 700 is that the shape of the channels of the separator plates 800 is an axially taller U-shaped channel created by a deeper draw ratio during manufacturing, which results in a slightly lower plate packing density (i.e., a larger plate-to-plate pitch).

Figure 9A:
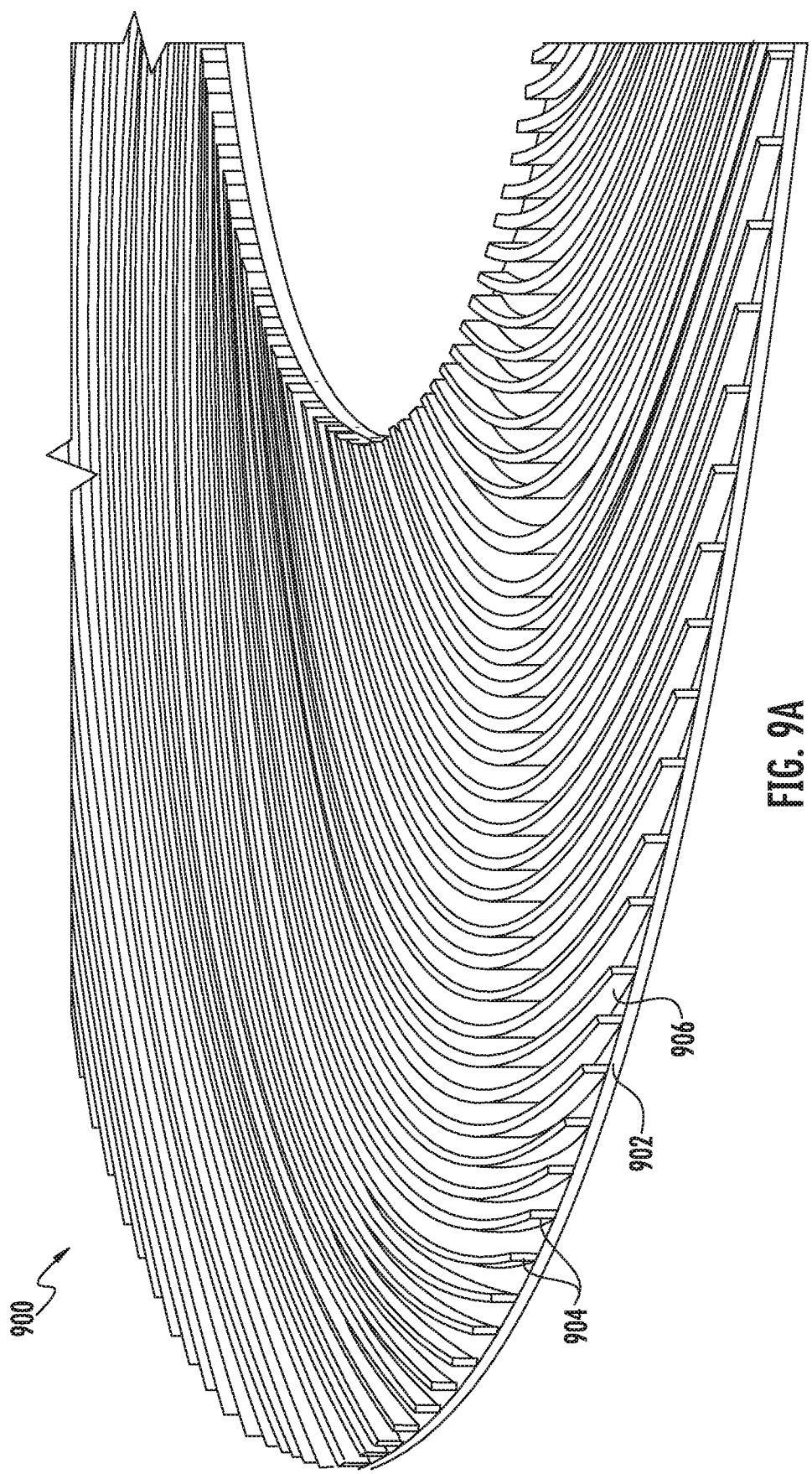
FIGS. 9A through 9C show views of a separator plate according to an example embodiment.
Figure 9B:
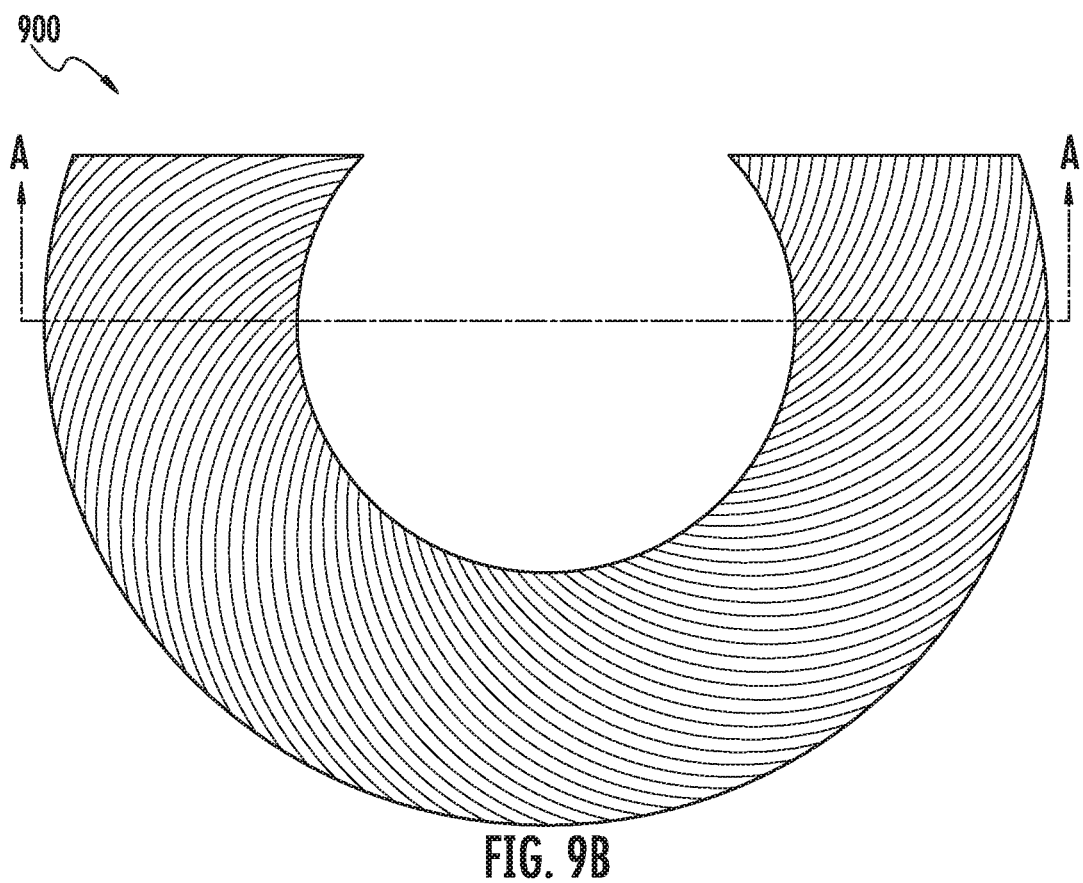
Figure 9C:

Referring to FIGS. 9A through 9C, views of a separator plate 900 are shown according to an example embodiment. FIG. 9A shows a perspective view of the separator plate 900. FIG. 9B shows a top view of the separator plate 900. FIG. 9C shows a cross-sectional view of the separator plate 900 taken at section A-A of FIG. 9B. The separator plate 900 includes a main body 902 having a plurality of ribs 904 extending in an axial direction with respect to the main body 902. The ribs 904 have a spiral shape in which a uniform gap exists between adjacent ribs 904. The spiral shape is defined by an involute source spiral having a starting radius at about 70% of the inner diameter of the separator plate 900. In an alternate arrangement, the spiral shape of the ribs 904 is defined by an Archimedean spiral having an optimized exponent (i.e., approximately 0.71 with an outer diameter to inner diameter ratio of 2 and an intercept angle of 45 degrees) to form uniform gaps between adjacent ribs 904. The separator plate 900 includes flow channels 906 formed by the main body 902 and the uniform gap between adjacent ribs 904.

Referring to FIG. 10, a perspective cross-sectional view of a separator plate 1000 is shown according to an example embodiment. The separator plate 1000 is similar to the separator plate 900. The separator plate 1000 includes a main body 1002 and a plurality of spiral-shaped ribs 1004 extending in an axial direction from the main body 1002 to define a plurality of flow channels 1006. The gap (at any fixed axial positional height, if ribs are drafted) between adjacent ribs 1004 is uniform from the inner diameter to the outer diameter of the separator plate 1000. The equal-gap spiral definition allows the ribs 1004 to have a near constant wall thickness that reduces problems with molding like warpage, sinks, and the like while maximizing ESA by increasing average intercept angle and eliminating any disruptions to flow and particle separation caused by "splitter" vanes. In some arrangements the ribs 1004 are formed with a draft angle to facilitate mold-ejection of the separator plate 1000 from an injection mold during an injection molding manufacturing process.

Figure 11A:
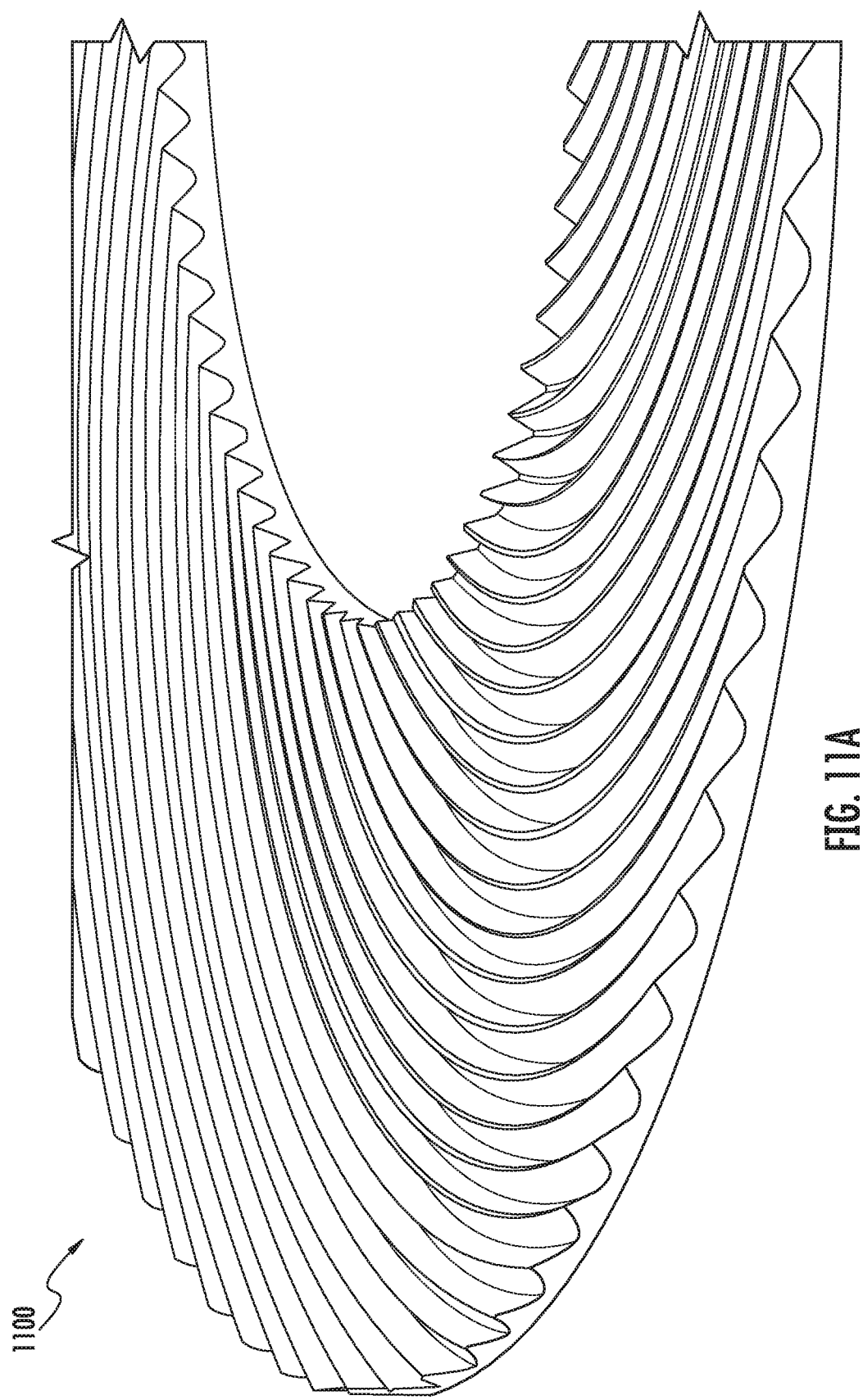
FIGS. 11A, 11B, and 11C show views of a separator plate according to a further example embodiment.
Figure 11B:
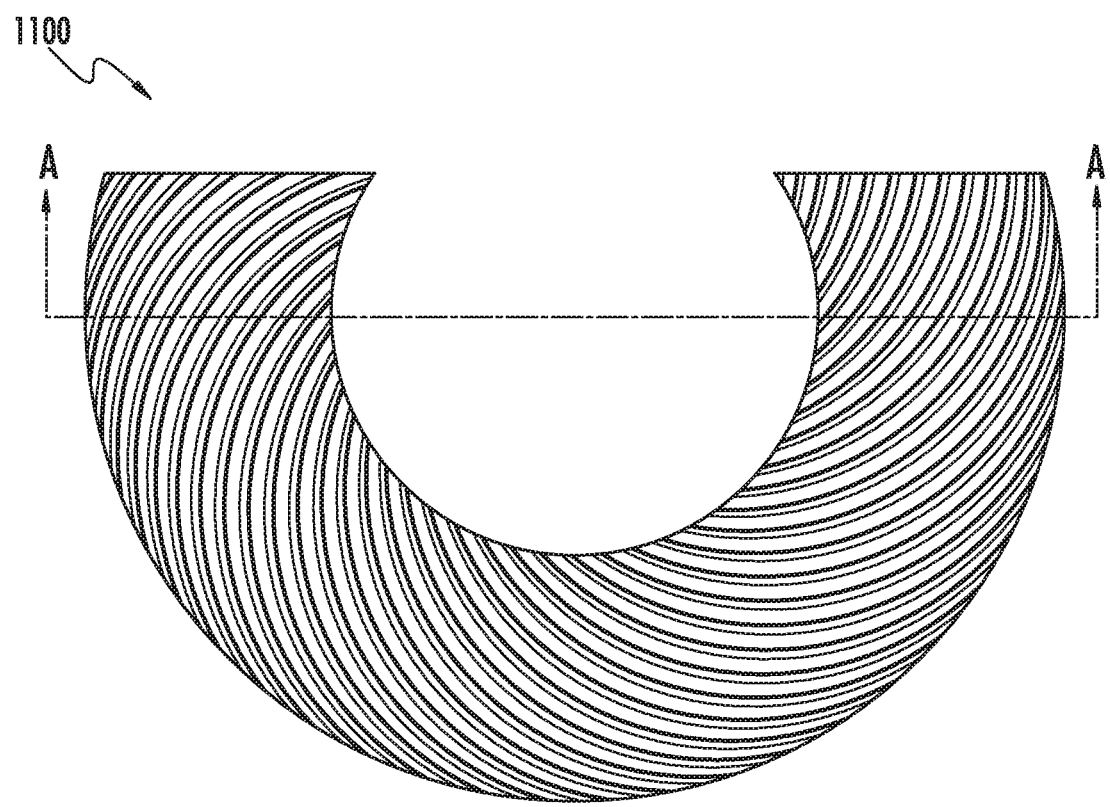
Figure 11C:
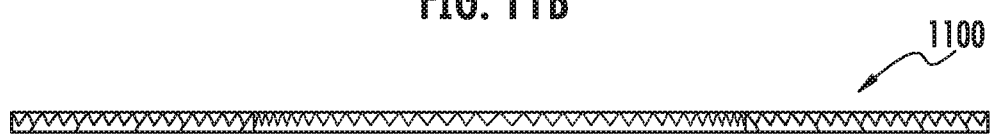

Referring to FIGS. 11A, 11B, and 11C, views of a separator plate 1100 are shown according to an example embodiment. FIG. 11A shows a perspective view of the separator plate 1100. FIG. 11B shows a top view of the separator plate 1100. FIG. 11C shows a cross-sectional view of the separator plate 1100 taken along section A-A of FIG. 11B. The separator plate 1100 is substantially the same as the separator plate 1000. The primary difference between the separator plate 1100 and the separator plate 1000 is that the shape of the flow channels formed between adjacent ribs of the separator plate 1100 has a V-shape where the bottom of the groove comes to a point.

Figure 12A:
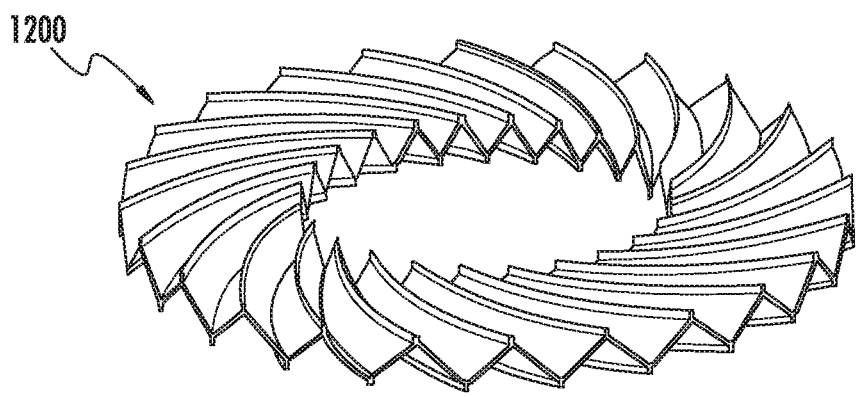
FIGS. 12A through 12E show views of a separator plate according to an example embodiment.
Figure 12B:
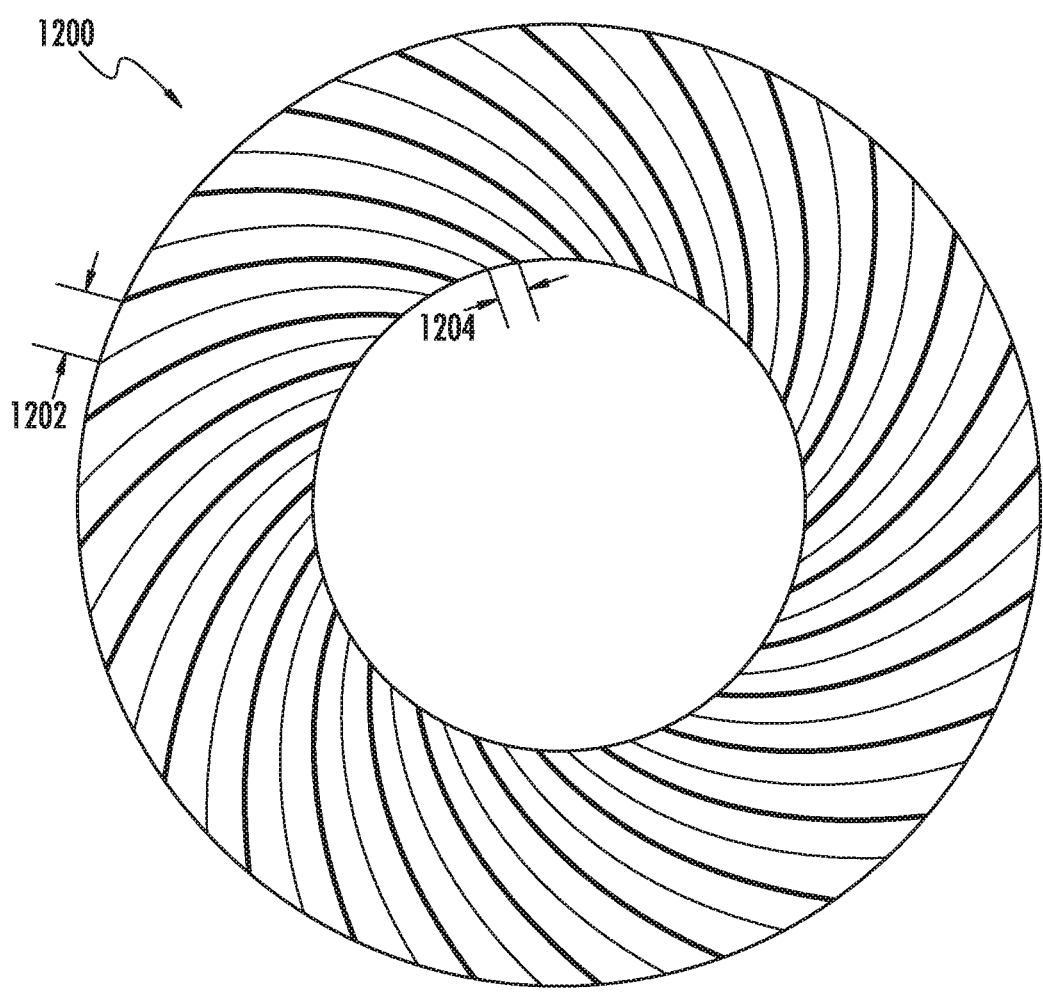
Figure 12C:
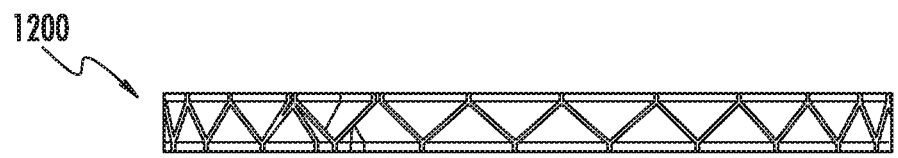
Figure 12D:
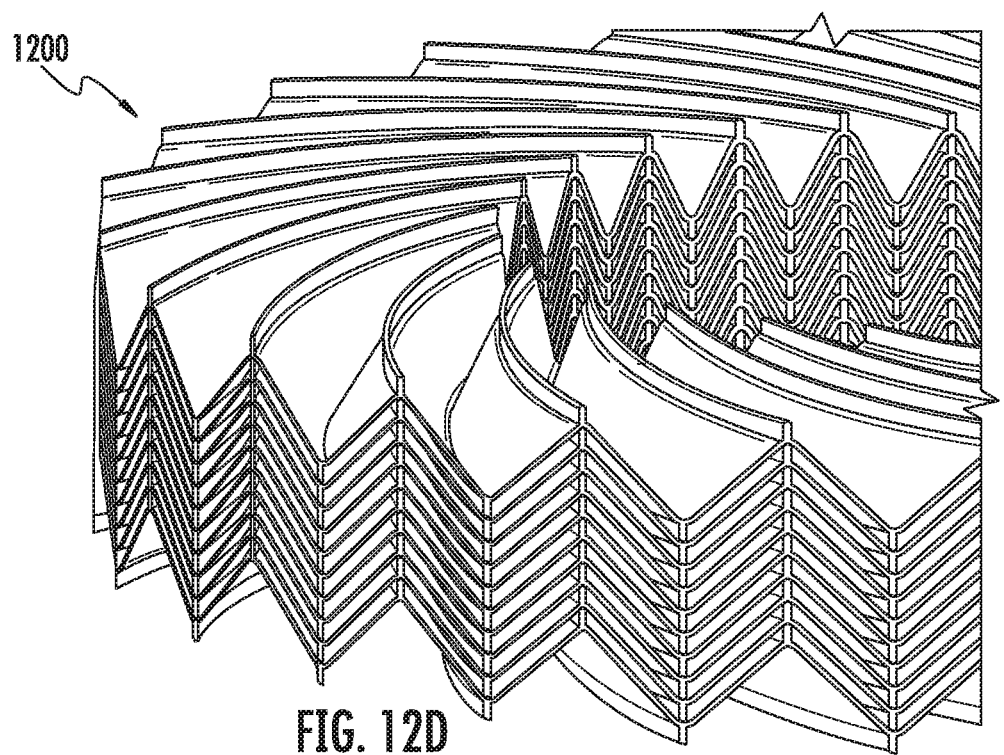
Figure 12E:
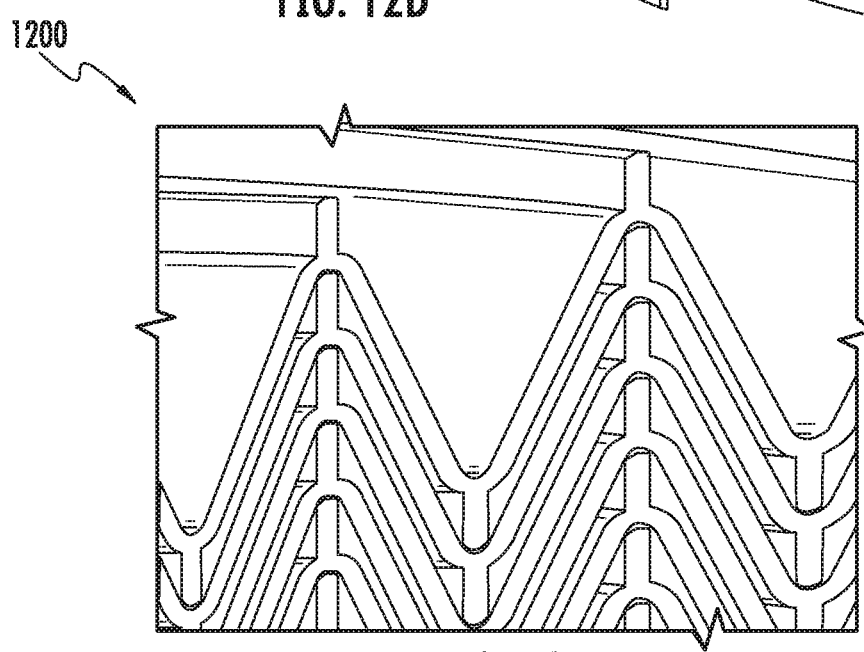

Referring to FIGS. 12A through 12E, views of a separator plate 1200 are shown according to an example embodiment. FIG. 12A shows a perspective view of the separator plate 1200. FIG. 12B shows a top view of the separator plate 1200. FIG. 12C shows a cross-sectional view of the separator plate 1200. FIG. 12D shows a view of a plurality of separator plates 1200 arranged in a stacked formation. FIG. 12E shows a close-up view of the plurality of separator plates 1200 as stacked in FIG. 12D.

The separator plate 1200 is similar to the separator plate 300. A difference between the separator plate 1200 and the separator plate 300 is that the separator plate 1200 has flared channels that have a wider outer width 1202 at the outer diameter and a narrower inner width 1204 at the inner diameter. In some arrangements, the flared channels originating from a logarithmic spiral have equal intercept angle regardless of radius. The cyclically-repeating V-shaped flared spiral channels include axial-projecting ribs that maintain the spacing between stacked separator plates 1200 (e.g., as shown in FIGS. 12D and 12E). The flared channels create non-radial direction rectangular flow passages with high ESA. The V-shapes are flared to accommodate the growing circumference as required by a logarithmic spiral definition for the peak/valley definition. The passage surfaces are non-radial (i.e., tilted) due to combination of both V-angle and spiral angle. The tops and bottoms of the V-shape include small ribs to mate against adjacent nested separator plates 1200 thereby creating two separate/flow-isolated generally trapezoidal channels per the V-shape (e.g., as shown in FIG. 12D), and also to provide positive control of stack spacing (i.e., stacking pitch) such that two separate rectangular passages are created for each V-shaped channel. The ribs also help to maintain solid-body flow rotation by preventing flow channel slippage, which would negatively impact efficiency of a separator device constructed of the separator plates 1200.

Figure 12F:
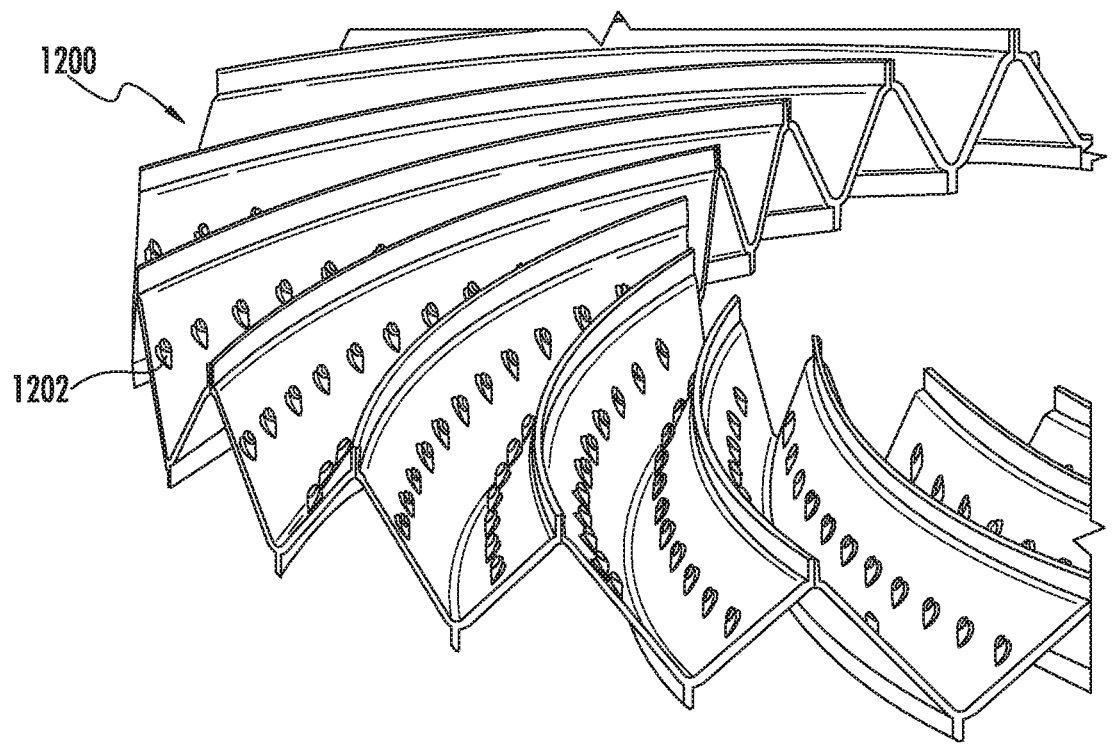
FIG. 12F shows a first variation of the separator plate of FIGS. 12A through 12E according to an example embodiment.

Referring to FIG. 12F, a variation of the separator plate 1200 is shown according to an example embodiment. In the variation, the separator plate 1200 includes cylindrical projections 1202 projecting outwardly from the sides of the V-shape channels. The cylindrical projections provide additional ESA and help to maintain the spacing between adjacent separator plates 1200 in a separator plate stack, which helps to account for warping of the separator plates 1200 and/or manufacturing defects. The cylindrical projections 1202 may be applied to any of the arrangements of separator plates or cones described herein.

Figure 12G:
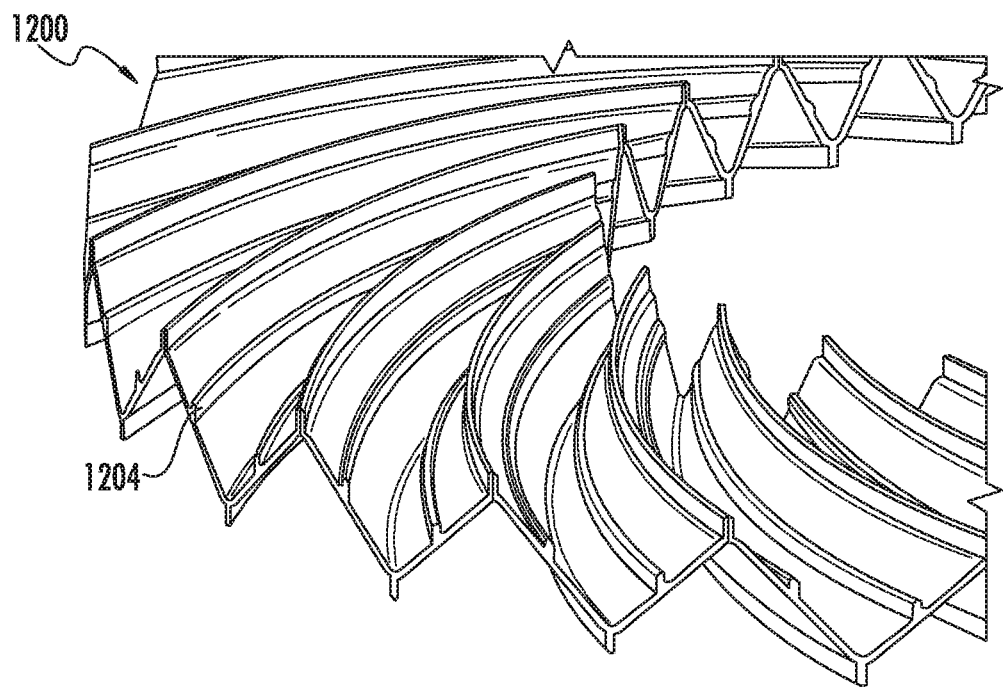
FIGS. 12G and 12H show a second variation of the separator plate of FIGS. 12A through 12E according to an example embodiment.
Figure 12H:
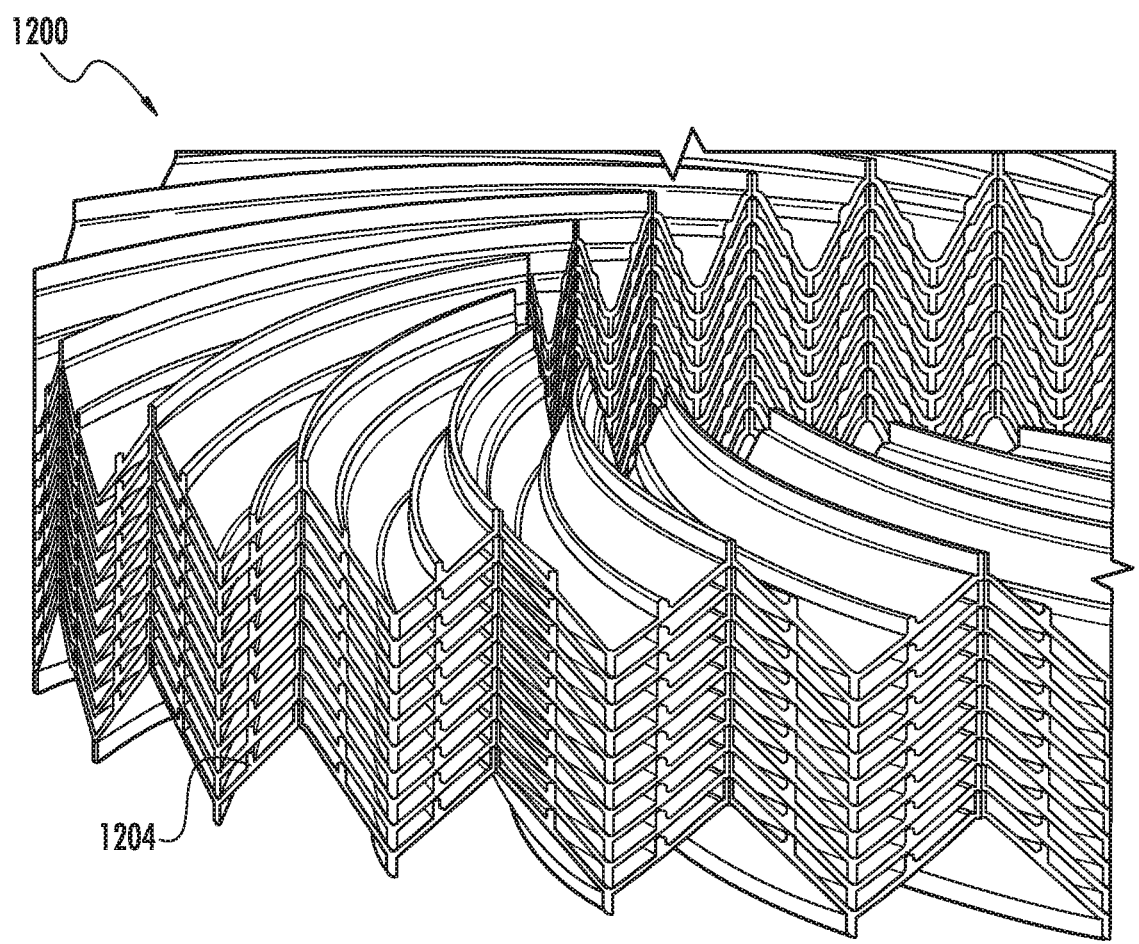

Referring to FIGS. 12G and 12H, another variation of the separator plate 1200 is shown according to the example embodiment. In the variation, the separator plate 1200 includes spacer ribs 1204 that help to maintain the spacing between adjacent separator plates 1200 in a separator plate stack (e.g., as shown in FIG. 12H). The spacer ribs 1204 may be applied to any of the arrangements of separator plates or cones described herein.

Figure 13A:
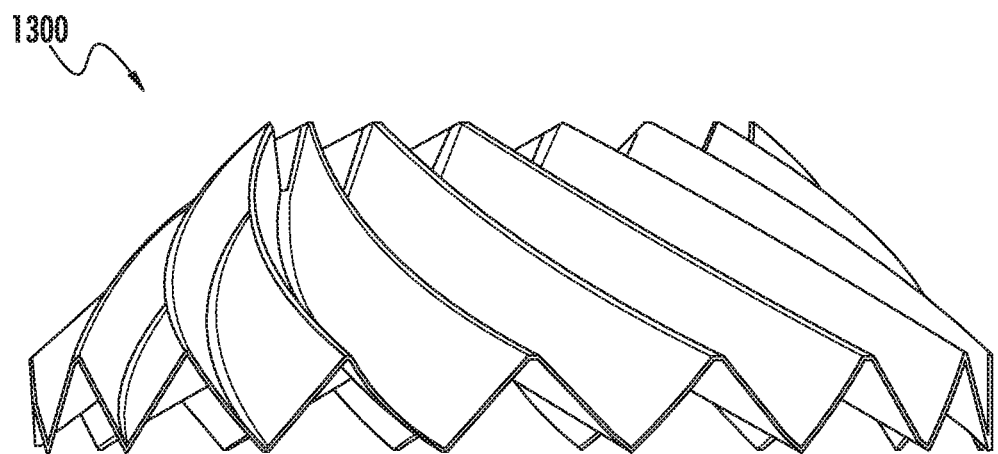
FIGS. 13A through 13C show views of a separator cone according to an example embodiment.
Figure 13B:
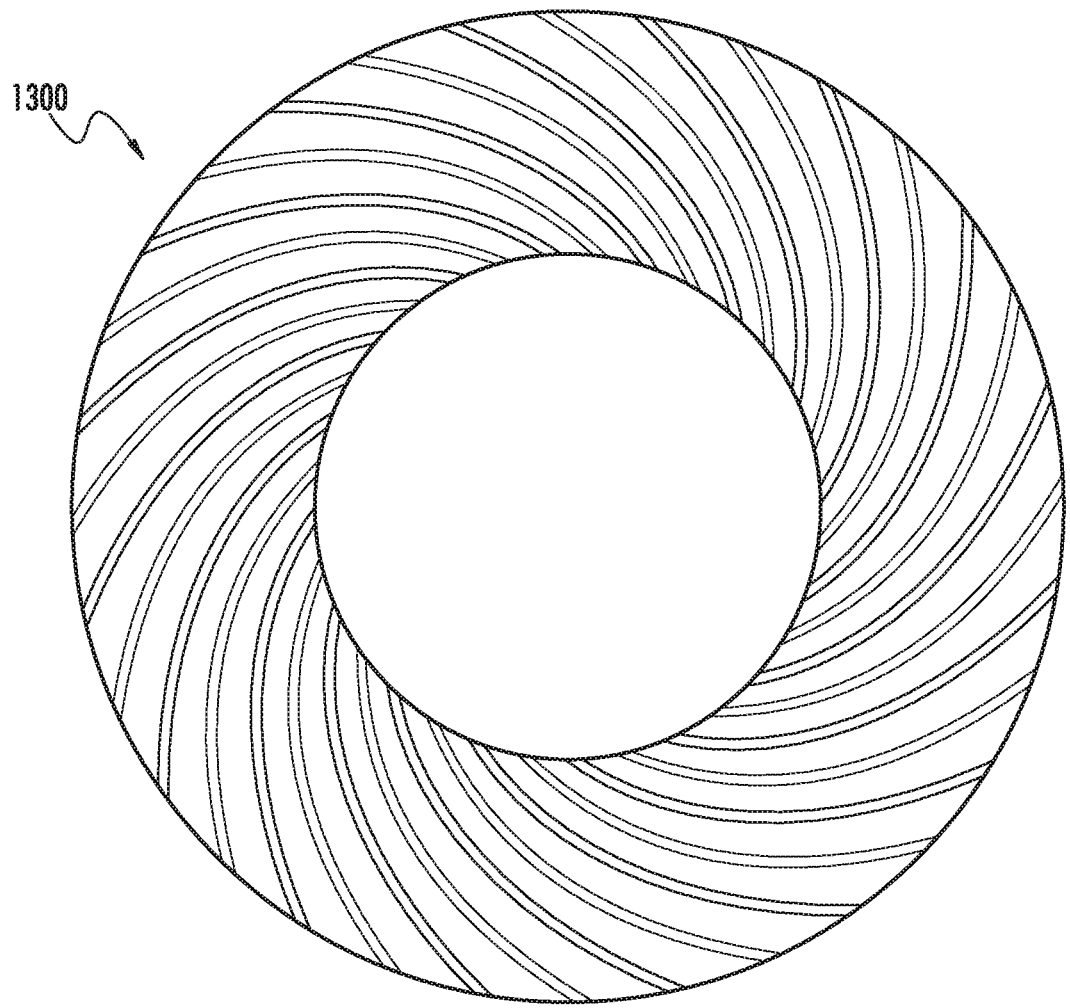
Figure 13C:
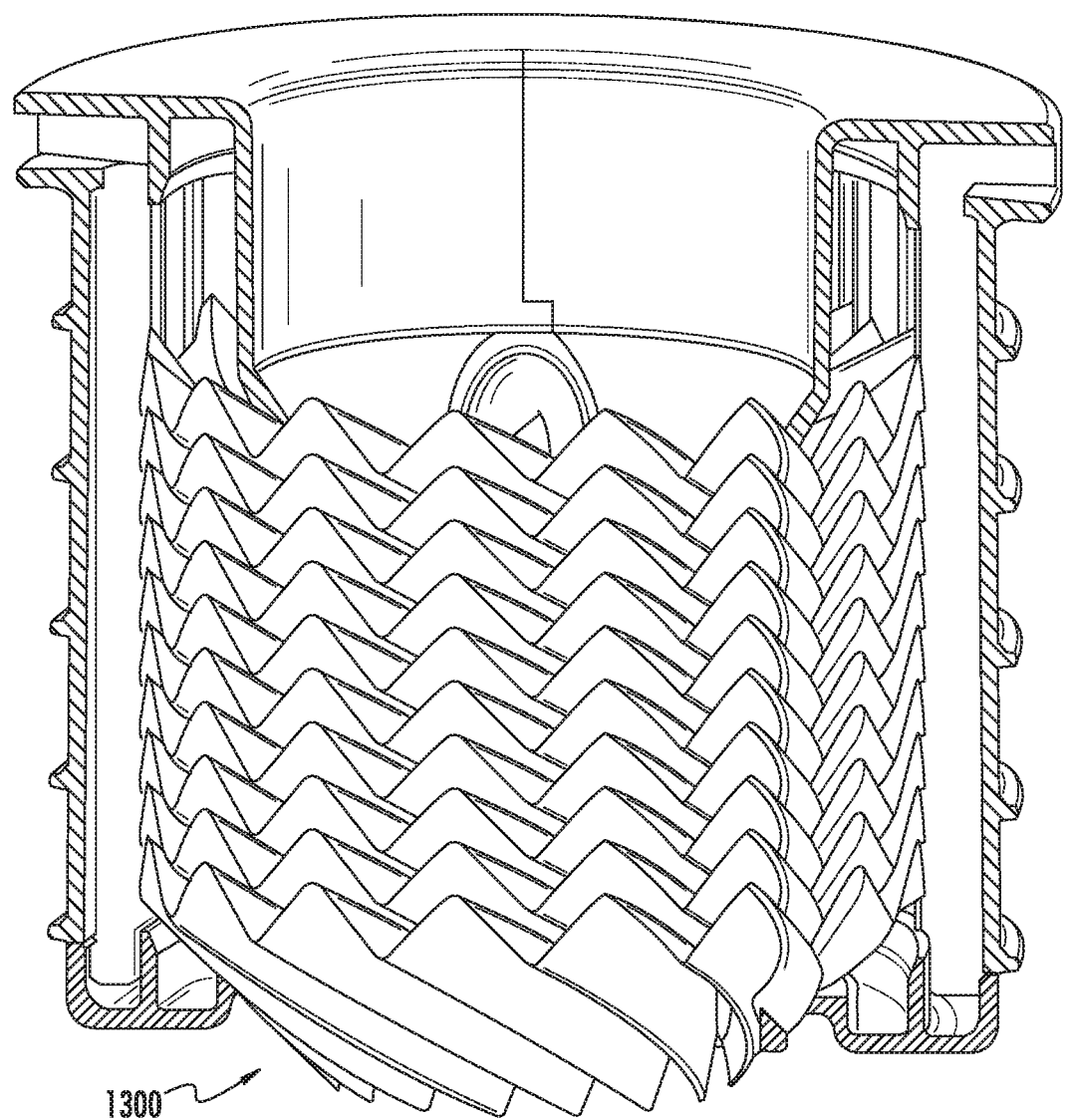

Referring to FIGS. 13A through 13C, views of a separator cone 1300 are shown according to an example embodiment. FIG. 13A shows a perspective view of the separator cone 1300. FIG. 13B shows a top view of the separator cone 1300. FIG. 13C shows the separator cone 1300 arranged as a cone-stack in a rotating filter element. The separator cone 1300 is substantially similar to the separator plate 1200. However, the separator cone 1300 is structured to have a generally frustoconical cross-sectional shape instead of a flat (i.e., axis-perpendicular) shape as in the separator plate 1200. The arrangement of the separator cone 1300 may be beneficial when an oddly-shaped space envelope is available for the separating device 124. For example, as shown in FIG. 13C, the angle of the frustoconical shape allows the waffle surfaces at OD to "reach upward" into a volume otherwise blocked by a central hub component on the rotor carrier assembly as shown in FIG. 13C.

Figure 14A:
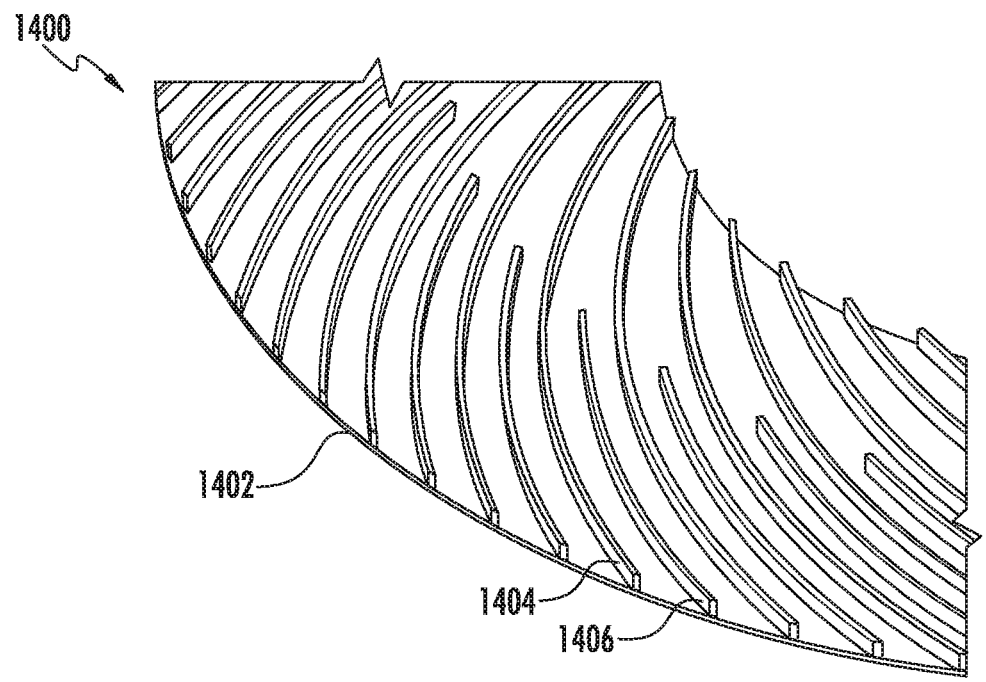
FIGS. 14A through 14C show views of a separator plate according to another example embodiment.
Figure 14B:
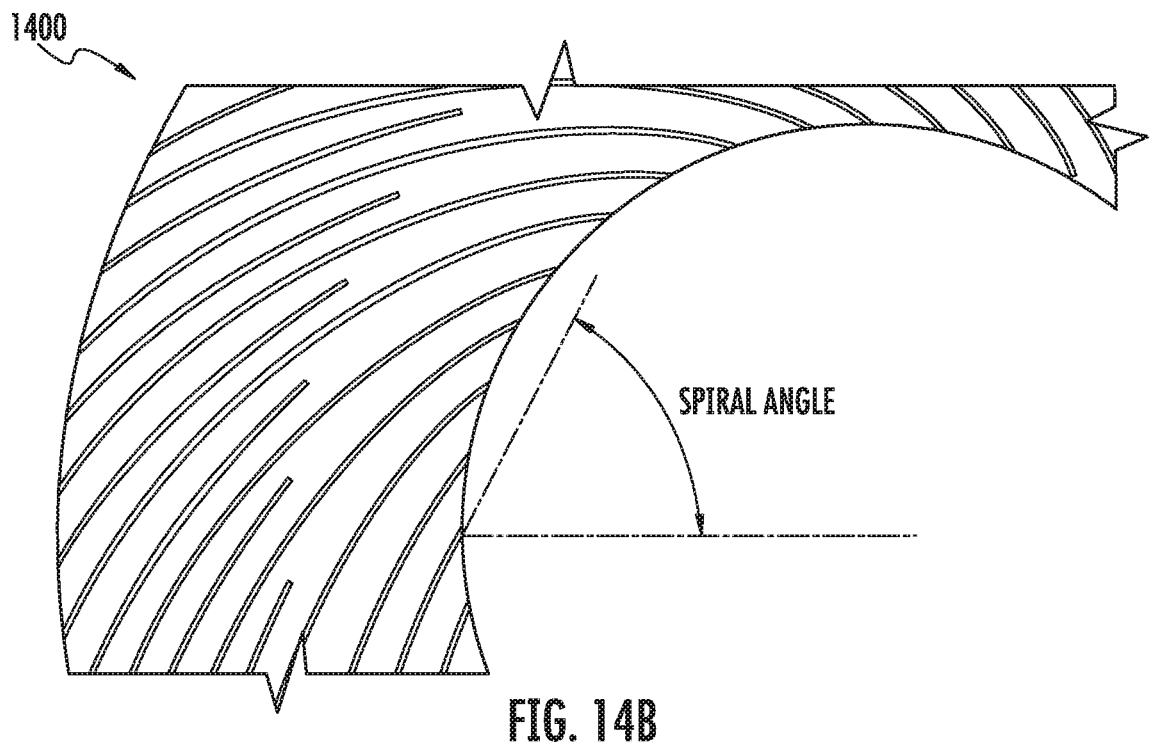
Figure 14C:
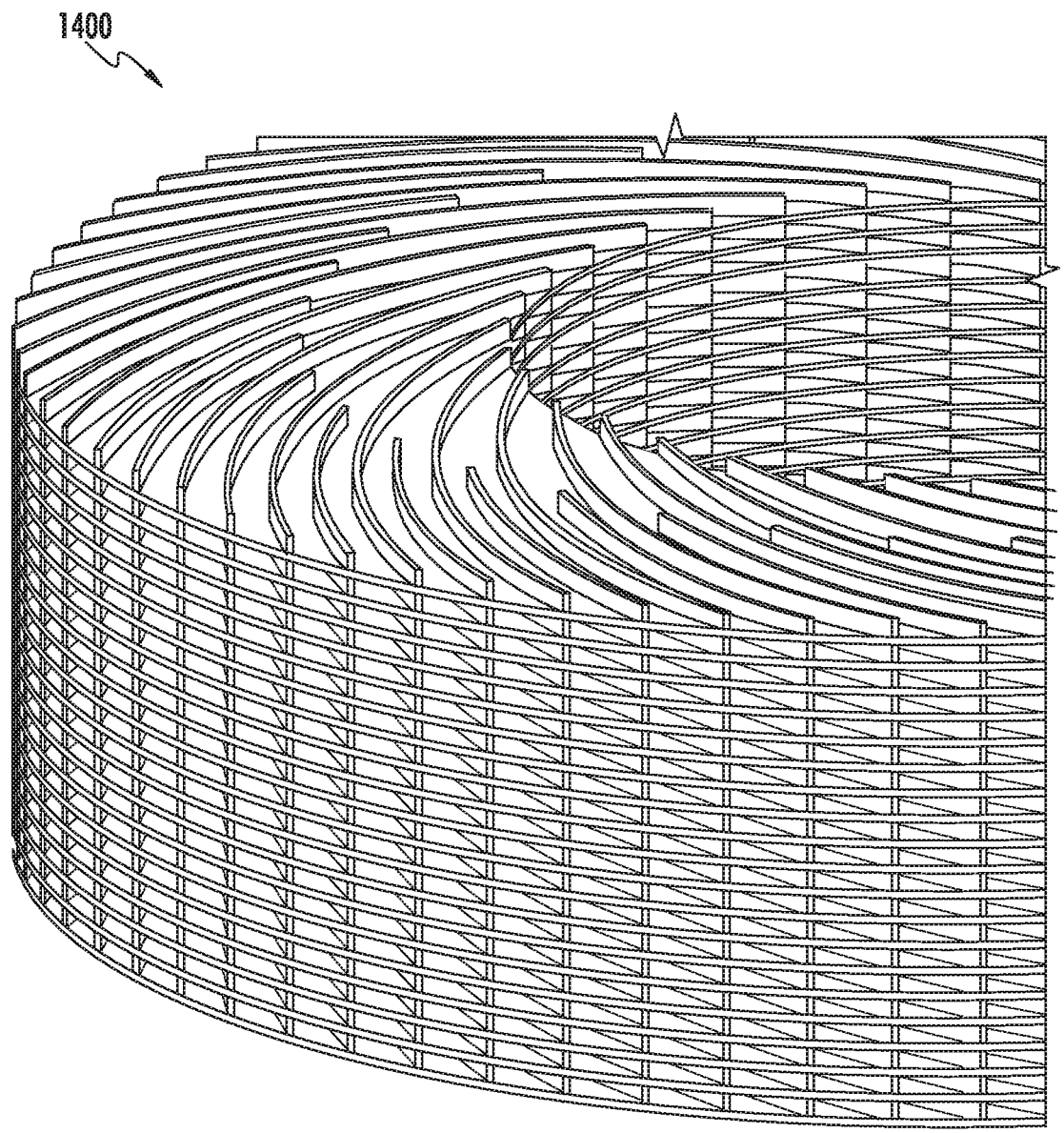

Referring to FIGS. 14A through 14C, views of a separator plate 1400 are shown according to an example embodiment. FIG. 14A is a perspective view of the separator plate 1400. FIG. 14B is a top view of the separator plate 1400. FIG. 14C is a perspective view of a stack of separator plates 1400. The separator plate 1400 includes a main body 1402 and a plurality of axial-projecting (or drafted) spiral ribs 1404 and additional splitter ribs 1406 to maximize ESA with constant rib thickness. The splitter ribs 1406 beginning at a radial midpoint (or radially-staged if multiple splitters are used) of the spiral ribs 1404. The term "spiral" as used with respect to the separator plate 1400 means that a radial vector intercepts the spiral surface at an approximately constant value as illustrated in FIGS. 14A through 14C, which is derived from a logarithmic spiral equation (i.e., $r=ae^{b\theta}$). The spiral angle may be between 30 and 70 degrees. In some arrangements, the spiral angle is 45 degrees. For maximum ESA and ESAVPD, a rib height of the ribs 1404/1406 should be as large as possible, since the "flat" plate main body 1402 provides no useful separation function, aside from "carrying" the ribs 1404/1406. In some arrangements, the maximum height of the ribs 1404/1406 is approximately 3-10 times the thickness of the main body 1402. In such arrangements, the thickness of the main body 1402 may be as thin as 0.25-0.5 mm. Accordingly, the total main body rib thickness of the ribs 1404/1406 may be in the range of about 1-5 mm.

Figure 15A:
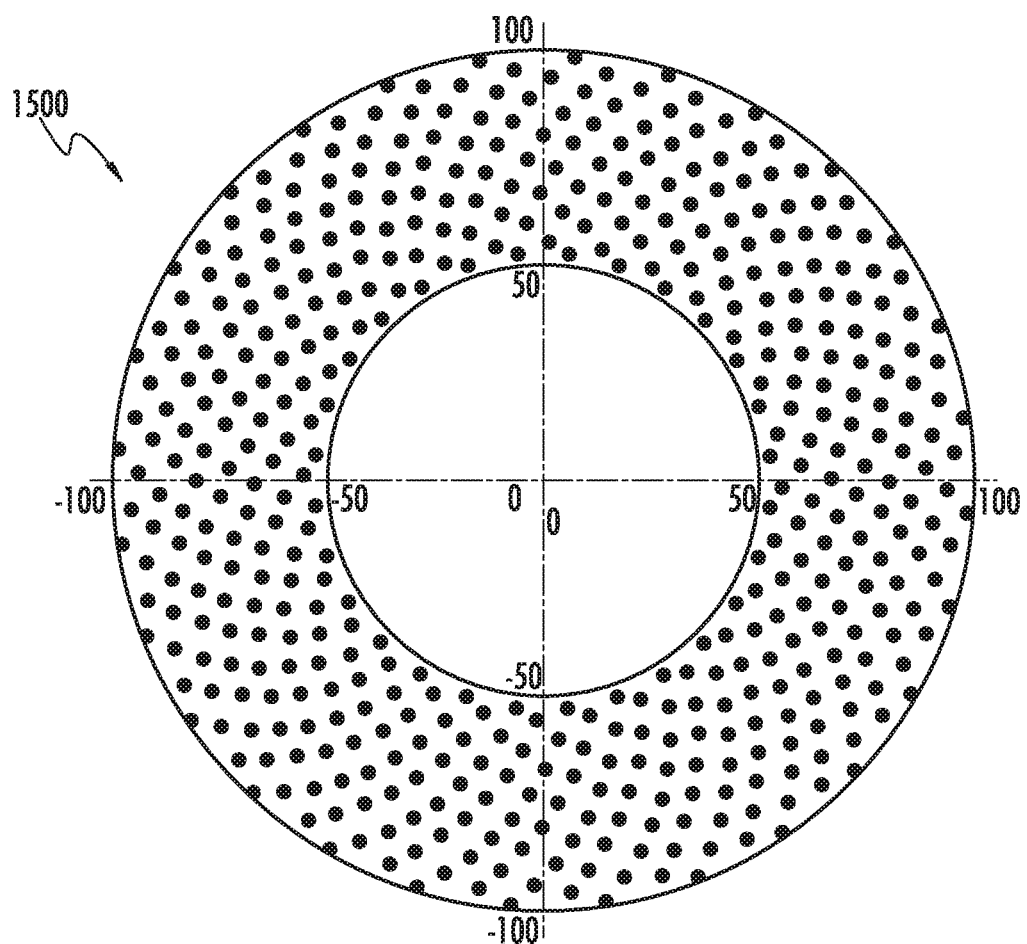
FIGS. 15A and 15B show views of a separator plate according to a further example embodiment.
Figure 15B:
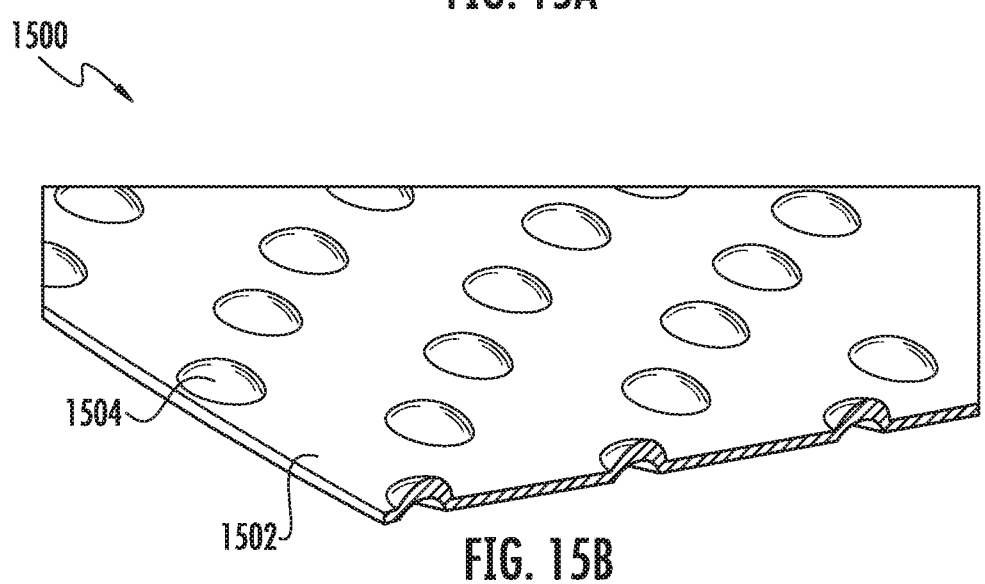

Referring to FIGS. 15A and 15B, views of a separator plate 1500 are shown according to an example embodiment. FIG. 15A shows a top view of the separator plate 1500. FIG. 15B shows a perspective cross-sectional view of the separator plate 1500. The separator plate 1500 increases the ESA of the planar main body 1502 by including hemispherical bumps 1504, unlike the above-described separator plates that include spiral shaped channels. In some arrangements, the hemispherical bumps 1504 are arranged in a repeating spiral sequence such that the center points of a grouping of hemispherical bumps 1504 can be connected by a line to form a spiral pattern similar to any of the above-described separator plates. In other arrangements, the hemispherical bumps 1504 are arranged in a different spiral pattern such as a Fermat spiral pattern, a Fibonacci sequence pattern, or the like. The separator plate 1500 may be formed by vacuum thermoforming the main body 1502, injection molding the main body 1502, or the like. The hemispherical bumps 1504 also help to maintain spacing between adjacent separator plates 1500 when a plurality of the separator plates 1500 are positioned in a stacked arrangement. Although shown as hemispherical bumps 1504, the bumps 1504 may be arranged as other shapes, such as cylindrical pillars, pyramids, square boxes, rectangular boxes, or the like.

Figure 16A:
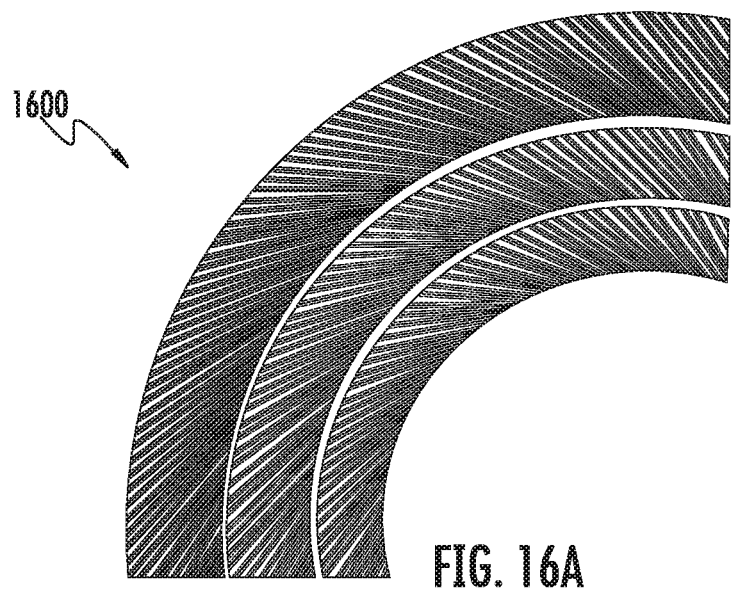
FIGS. 16A and 16B, views of a separator plate according to an example embodiment.
Figure 16B:
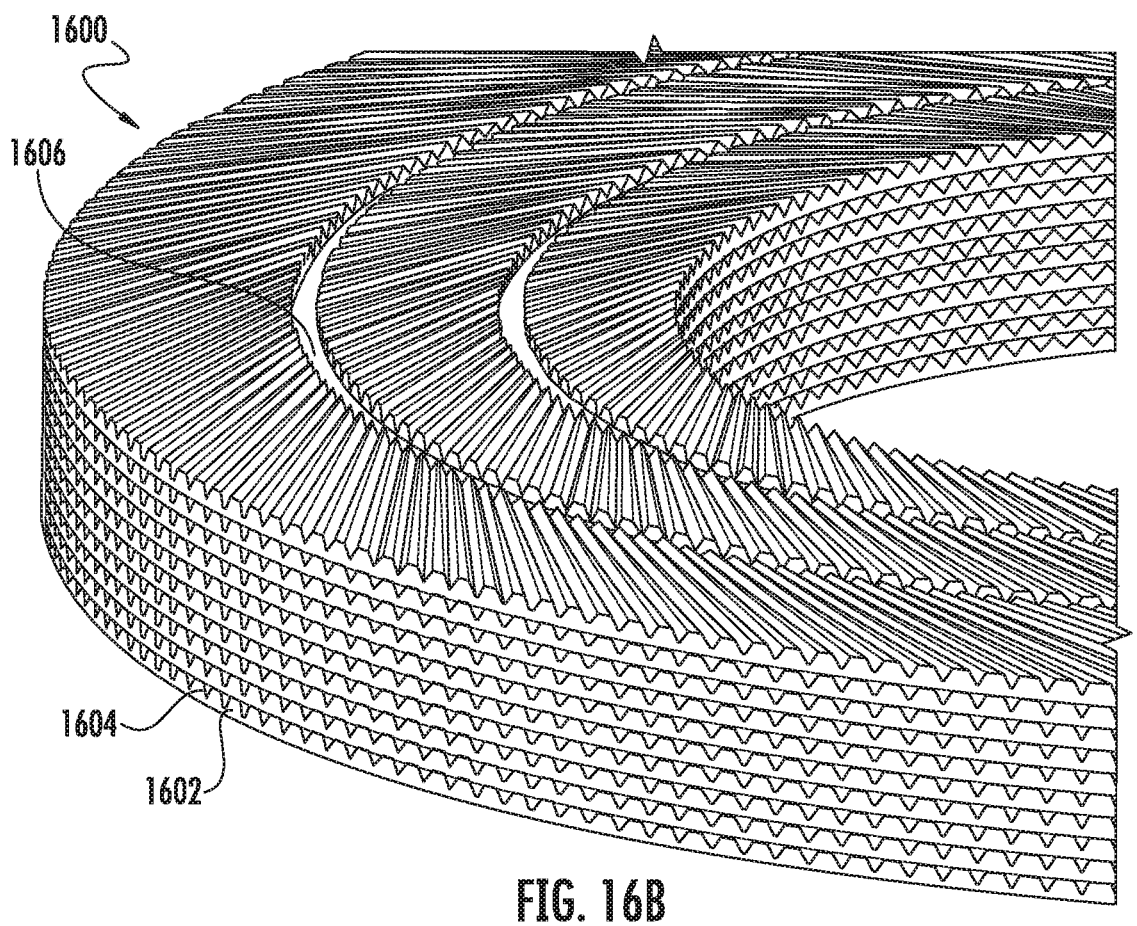

Referring to FIGS. 16A and 16B, views of a separator plate 1600 are shown according to an example embodiment. FIG. 16A shows a top view of the separator plate 1600. FIG. 16B shows a perspective view of a plurality of the separator plates 1600 arranged in a stacked configuration. The separator plate 1600 includes a main body 1602 and a plurality of inwardly projecting grooves 1604. The grooves 1604 may have a V-shaped cross-section with an incline angle (discussed in further detail with respect to FIG. 16C). In some arrangements, the grooves 1604 are arranged in a spiral manner (e.g., to trace any of the above-described spiral patterns). In such arrangements, the grooves 1604 are arranged with a spiral angle (discussed in further detail with respect to FIG. 16C). In other arrangements, the grooves 1604 are arranged in a linear manner. The grooves 1604 form flow passages through which gases can flow when the separator plates 1600 are arranged in a stacked manner (e.g., as shown in FIG. 16B). The grooves 1604 may be arranged in radial stages that are separated by annular gap grooves 1606. The radial stages create a linear approximation of a logarithmic spiral. The annular gap grooves 1606 allow the number of grooves 1604 to be increased at the more radially outward stages than the radially inward stages thereby increasing the ESA of the separator plate 1600. The annular gap grooves 1606 also allows for the cross-flow or redistribution of gases between grooves 1604 between adjacent stages. In some arrangements the grooves 1604 could flare as the grooves 1604 traverse from the ID to the OD. However, such arrangements would reduce the ESA of the separator plate 1600. In such arrangements, the gap grooves 1606 may be eliminated.

Figure 16C:
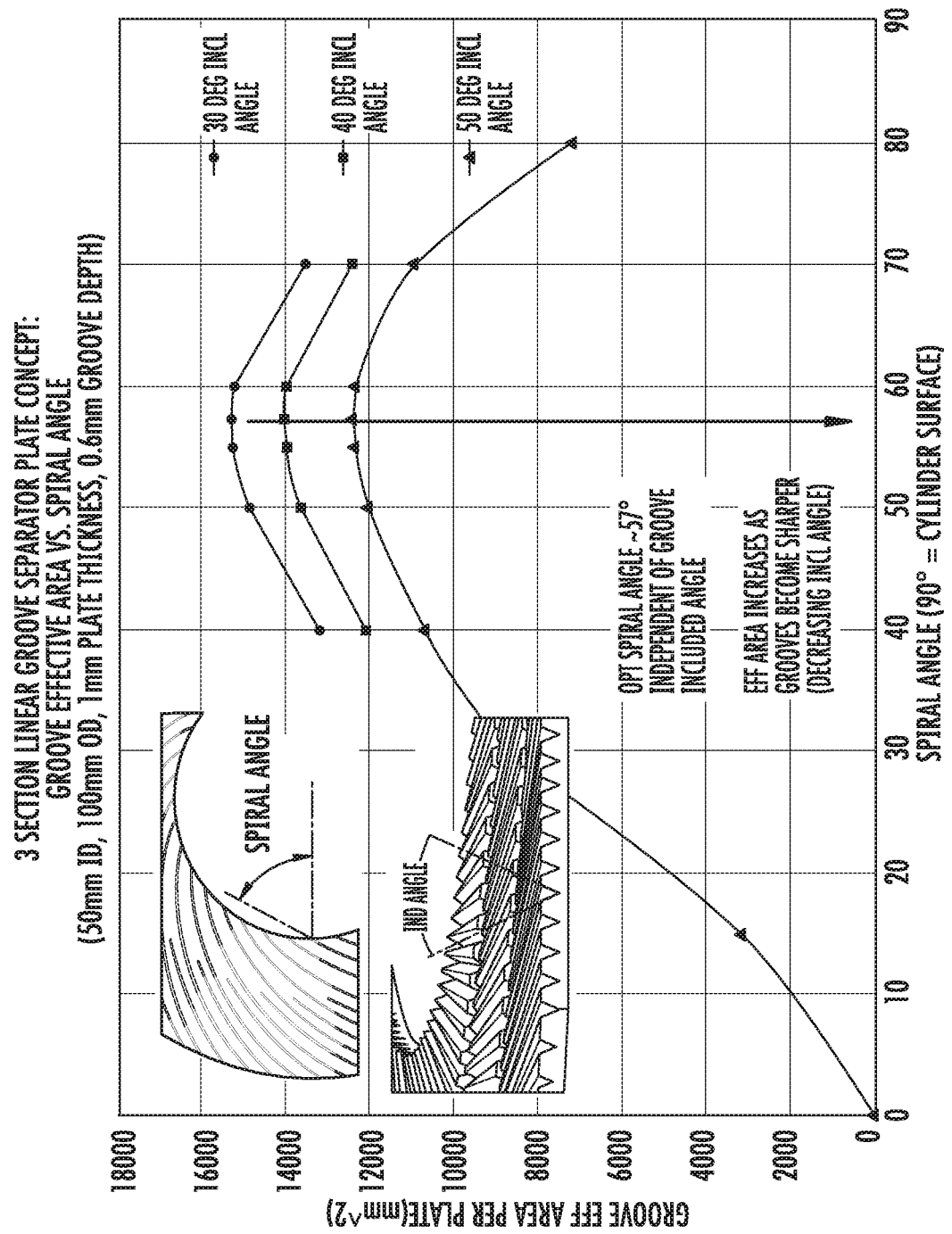
FIG. 16C shows a graph of ESA per separator plate of FIGS. 16A and 16B for various spiral angles and incline angles of the grooves.

FIG. 16C shows a graph of ESA per separator plate 1600 for various spiral angles and incline angles of the grooves 1604. As shown in the graph of FIG. 16C, the optimal spiral angle is about 57 degrees. Additionally, as the incline angle decreases, the ESA of the separator plate 1600 increases.

Figure 17A:
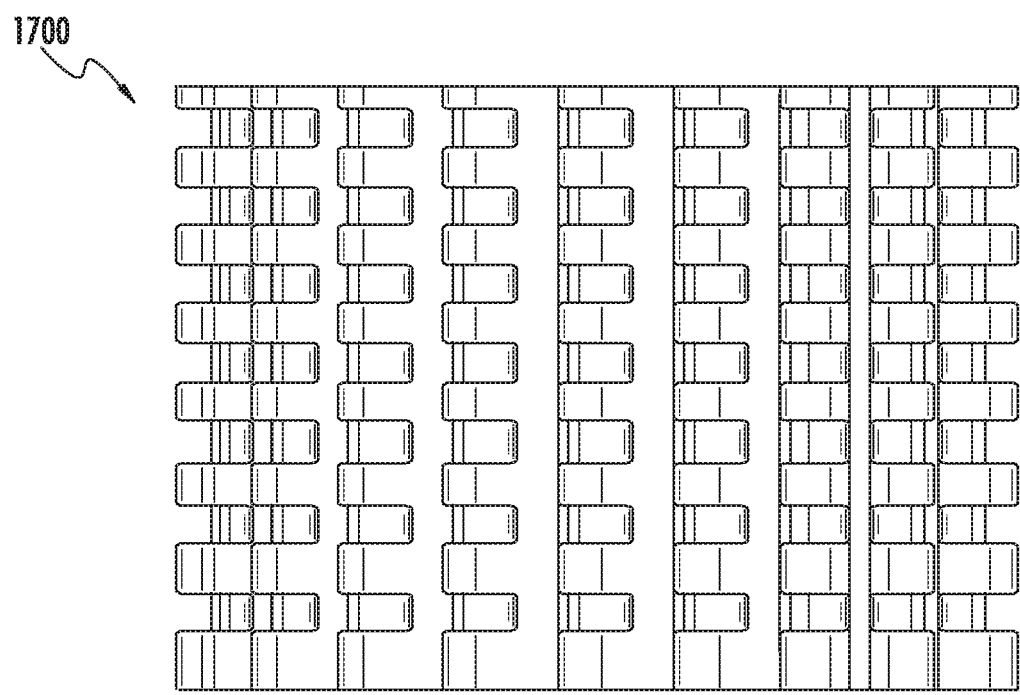
FIGS. 17A through 17D show a separating element according to an example embodiment. The separating element can be used in place of the separating element of FIG. 1.
Figure 17B:
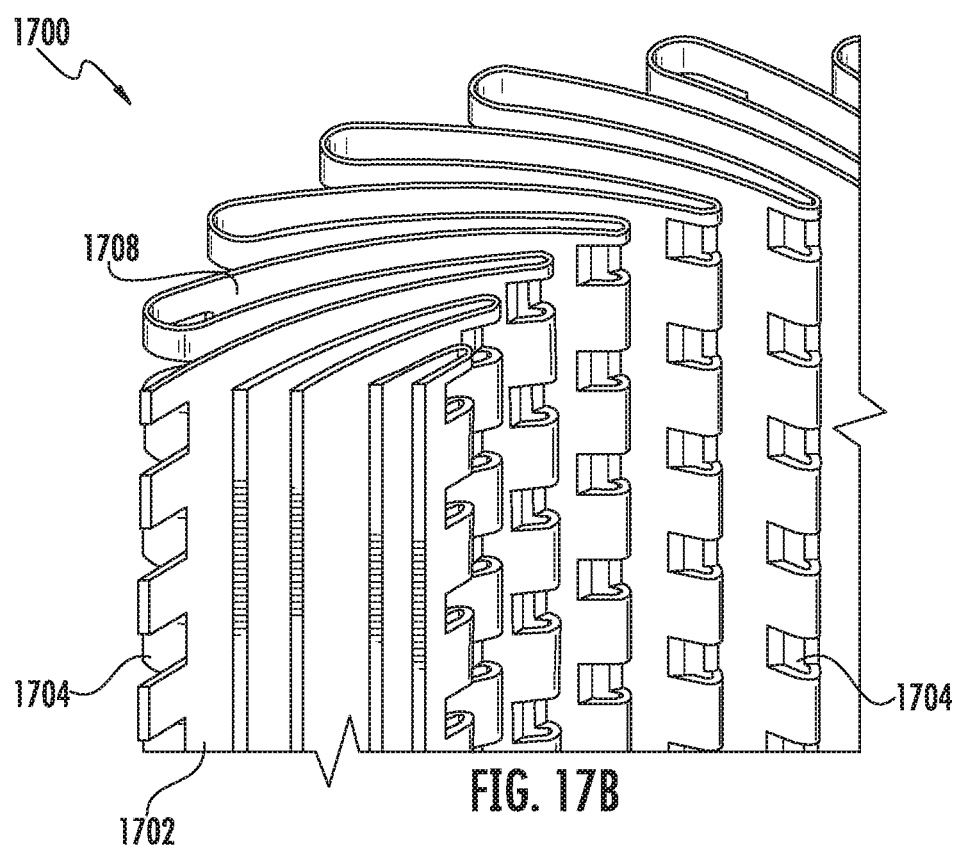
Figure 17C:
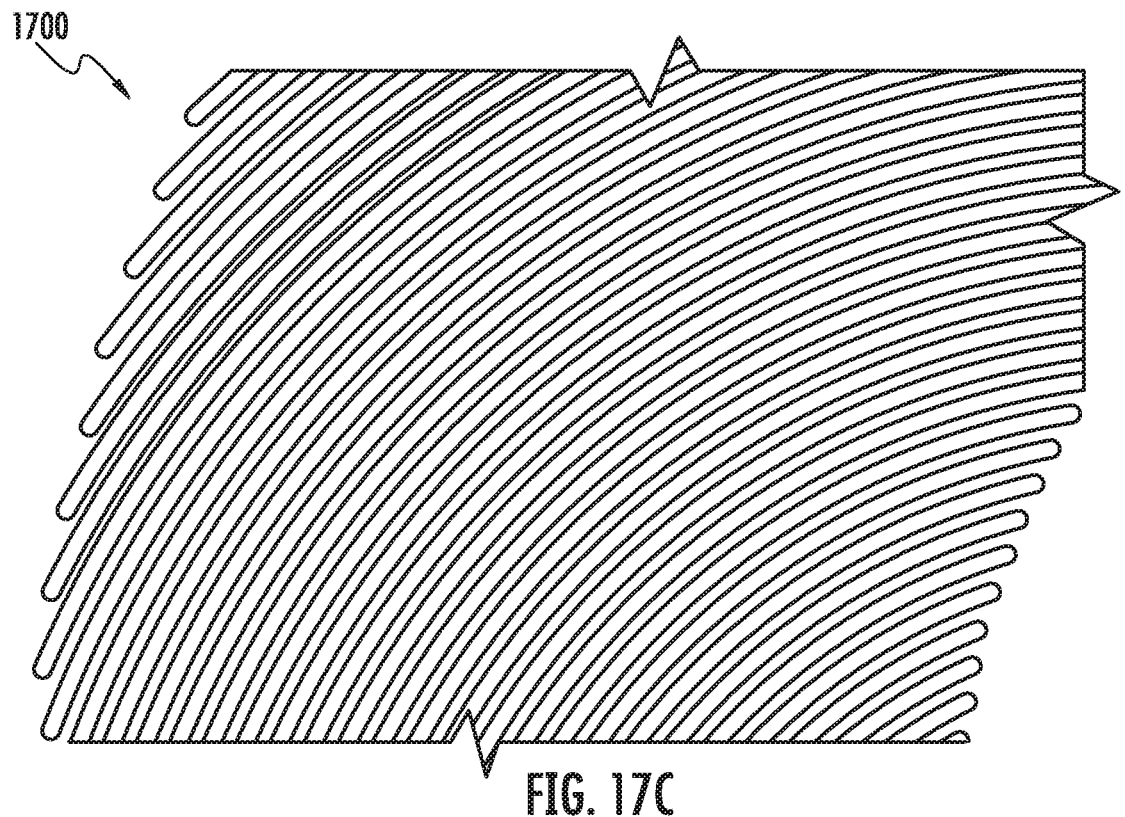
Figure 17D:
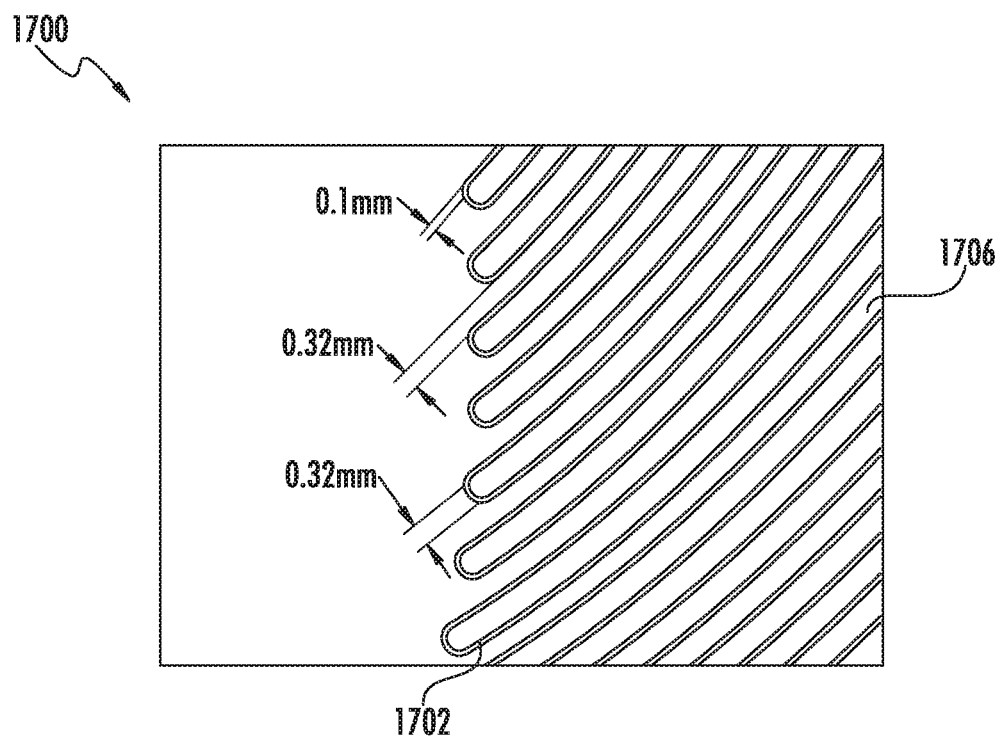

Referring to FIGS. 17A through 17D, a separating element 1700 is shown according to an example embodiment. The separating element 1700 can be used in place of the separating device 124 of FIG. 1. FIG. 17A shows a side view of the separating element 1700. FIG. 17B shows a cross-sectional perspective view of the separating element 1700. FIGS. 17C and 17D each show different top views of the separating element 1700. The separating element 1700 is formed by a spiral-pleated impermeable or semi-permeable membrane 1702. The membrane 1702 may be, for example, a polymer film or thin sheet. In some arrangements, the membrane 1702 is 0.1 mm thick. The membrane 1702 includes a plurality of openings 1704 (e.g., holes, slots, notches, etc. provided at the ID and OD of the "pleat tips" of the membrane 1702). The openings 1704 allow flow to enter and escape the generally rectangular axial spiral-gap channels 1706 between the formed pleats of the membrane 1702. In FIGS. 17A an 17B, a small number of pleats are illustrated for clarity purposes. In some arrangements, the spiral-gap channels 1706 are about 0.32 mm in width. The spiral defining the spiral-gap channels 1706 may be defined by the above described involute or Archimedean spirals described above with respect to the separator plate 300. The pleat density of the separating element 1700 may be much greater (e.g., as shown in FIGS. 17C and 17D) to maximize ESA. In some arrangements, the spiral gap channels 1706 may include hemispherical or elongated dimples or bumps formed (not illustrated) to help maintain the gap that defines the spiral-gap channels 1706.

Figure 18A:
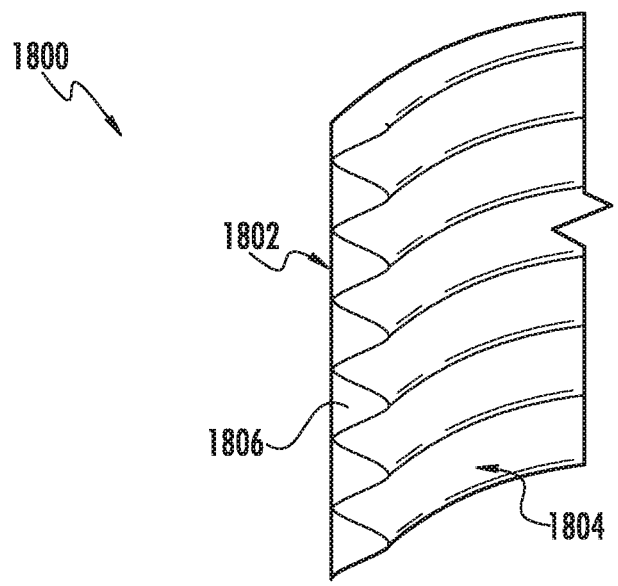
FIGS. 18A and 18B show a separating element according to another example embodiment. The separating element can be used in place of the separating element of FIG. 1.
Figure 18B:
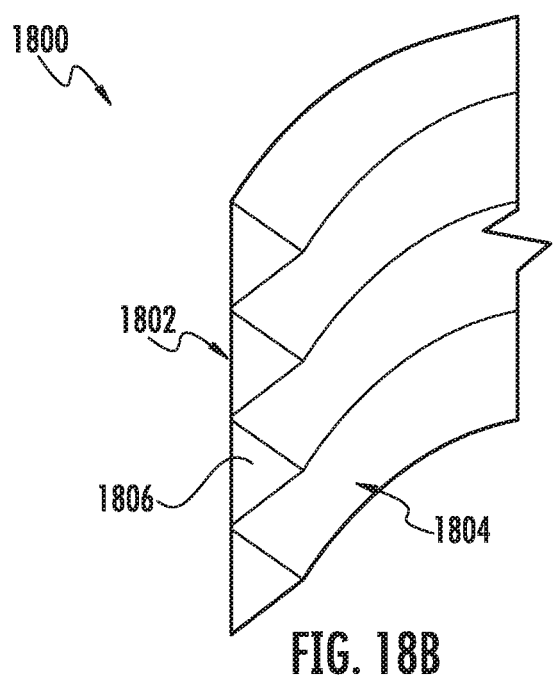

Referring to FIGS. 18A and 18B, a separating element 1800 is shown according to an example embodiment. The separating element 1800 can be used in place of the separating device 124 of FIG. 1. FIG. 18A shows a cross-sectional view of a first arrangement of the separating element 1800 using a corrugated media. FIG. 18B shows a cross-sectional view of a second arrangement of the separating element 1800. The separating element 1800 is a "spiral-laid" separating element that alternates a flat sheet 1802 with a channeled sheet 1804 thereby defining a series of flow channels 1806 between the flat sheet 1802 and the channeled sheet 1804. In some arrangements, the flat sheet 1802 and the channeled sheet 1804 each have a thickness of less than 0.5 mm. The flat sheet 1802 is made of an impermeable material such that flow cannot pass through the flat sheet 1802. The channeled sheet 1804 is made of an impermeable or semi-permeable membranes and defines flow channels 1806 between the sheets. The only difference between the arrangements of FIGS. 18A and 18B is the shape of the flow channels 1806 formed in the separating element 1800: the arrangement of FIG. 18A uses a corrugated channeled sheet 1804, while the arrangement of FIG. 18B uses a triangular corrugated, dimpled, or tetrahedral channeled sheet 1804.

The arrangement shown in FIGS. 18A and 18B show a single strip of material separating element material, which can then be repeatedly folded back and forth onto itself, wound around a core, or the like. The alternating sheets may be corrugated or dimpled. To help maintain flow gap between sheets as well as high ESA, one sheet may be formed into an irregular or undulating surface (such as sine wave, triangle wave, tetrahedral folds or similar; as shown in FIG. 18B) while the other sheet remain smooth, while following the spiral contour of the opposite sheet. Flow would be confined to the spaced bounded by the smooth and formed sheets, from ID to OD of the separator element. Pairs of sheets could be formed separately into their basic spiral form and joined together by adhesive material, ultrasonic welding, or other suitable bonding method. The spiral formed by the sheets 1802 and 1804 may be defined by the above described involute or Archimedean spirals described above with respect to the separator plate 300.

Figure 19:
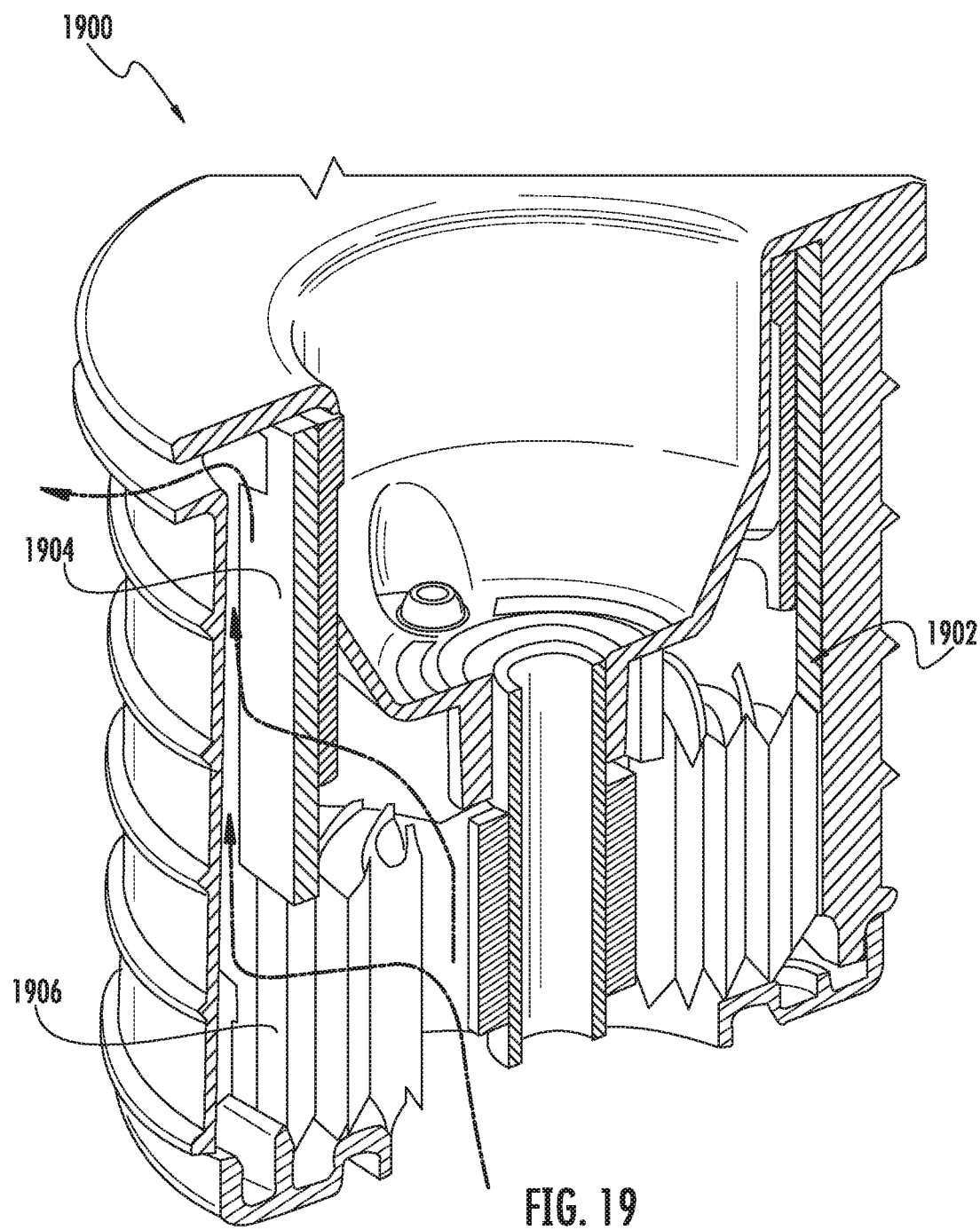
FIG. 19 shows a coalescing element according to the example embodiment.

Referring to FIG. 19, a coalescing element 1900 is shown according to an example embodiment. The coalescing element 1900 includes a separating element 1902 that is comprised of a first separating element portion 1904 and a second separating element portion 1906 that are coupled to each other and arranged in an axially stacked manner. The first separating element portion 1904 and the second separating element portion 1906 are arranged in a parallel flow arrangement such that part of the flow passes through plates, and part through media. In some arrangements, the first separating element portion 1904 is a coalescing filter media and the second separating element portion 1906 includes any of the above-described separating elements, separating plates, or separating cones. Such an arrangement provides parallel flow path opportunity for the blowby gases being processed by the coalescing element 1900, which provides plugging-failure risk mitigation. Accordingly, if one of the separating element portions becomes plugged, flow and separation can still occur through the other of the separating element portions.

Figure 20:
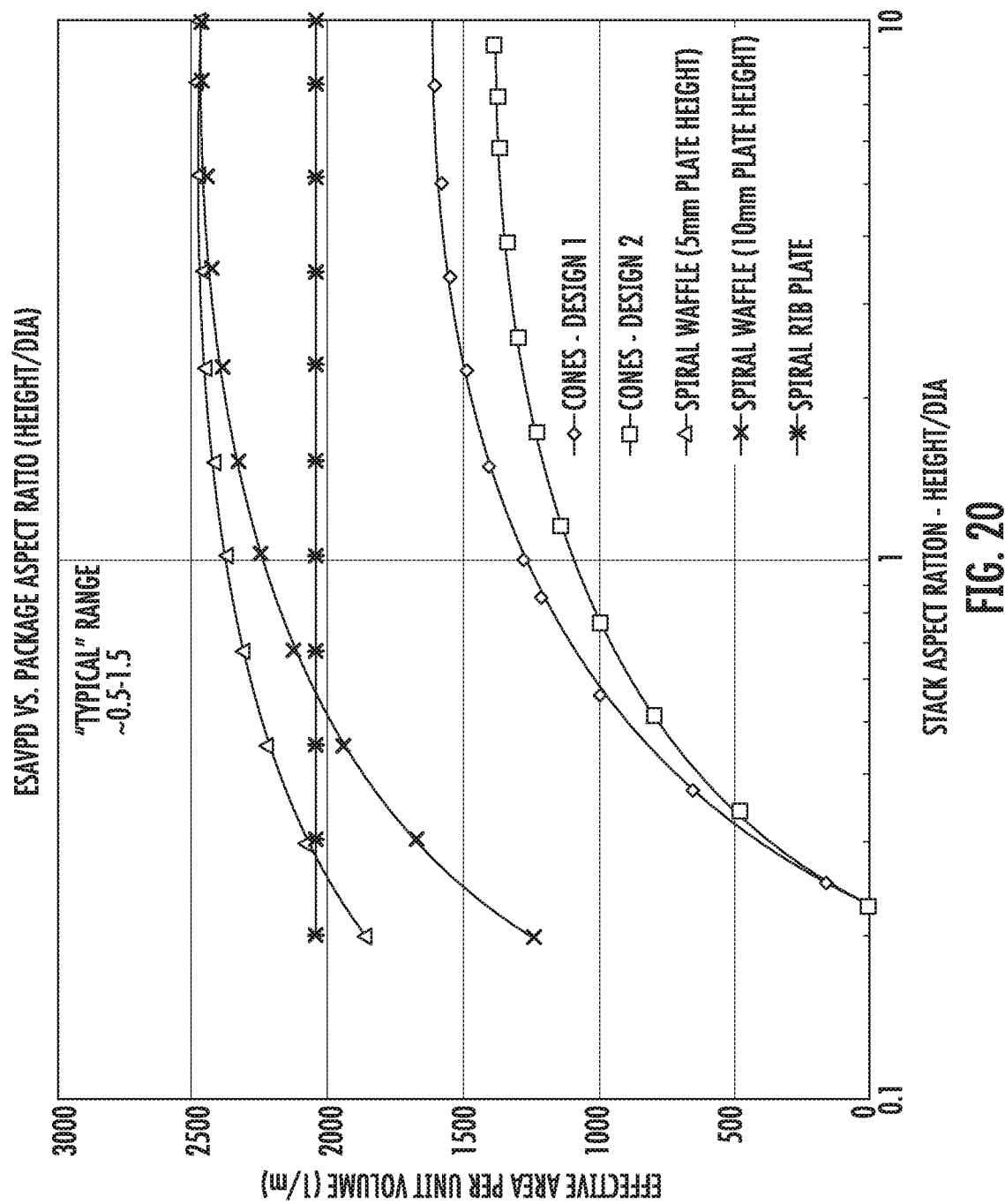
FIG. 20 shows a graph of effective area per unit volume vs. stack aspect ratio for various arrangements of separating elements having different plate stack configurations.

Referring to FIG. 20, a graph of effective area per unit volume vs. stack aspect ratio for various arrangements of separating elements having different plate stack configurations is shown. The graph of FIG. 20, five different arrangements are shown: two different cone-stack separators, a spiral waffle plate separator (e.g., as shown in FIGS. 3A-3D) having a 5 mm height, a spiral waffle plate separator having a 10 mm height, and a spiral rib-plate design (e.g., as shown in FIG. 10). As shown, the ESA of a waffle separator plate configuration is approximately double that of a cone-stack separator (i.e., about 2200 l/m vs. about 1100 l/m in the typical aspect ratio range). The separator plates described in the present application provide significant ESAVPD advantage vs. cone-stack separators, due to reduced end-volume waste and higher radial impingement angle (vs. cone angle). As a separator stack height increases, the advantage of the described separator plates over the cone-stack separators diminishes somewhat because the end-volume wasted by the tall cones diminishes relative to the total volume. However, the spiral waffle (and other) configurations still provide continued advantage due to the increased radial impingement angle. For case of explanation, the ESAVPD was calculated for "typical" design configuration with OD/ID ratio of about two. The comparison illustrates the significant relative advantage that can be provided by the described separator plates of the present application (e.g., the separator plate 300). Additionally, the "limit particle size" (d lim; i.e., the size above which separation efficiency is 100%) follows an inverse square root of ESA. Accordingly, if ESA is doubled, the d lim would be reduced by a factor $2^{-0.5}$ (i.e., about 0.71). Thus, if baseline d lim size were 1 micron, the d lim size achieved with the described separator plates would be approximately 0.58 micron, which provides a significant advantage over similarly sized cone-stack separator devices.

Referring to FIG. 21, a graph showing preliminary performance studies using for some of the above-described separating plate/cone designs is shown. As shown in FIG.

21, the described arrangements show significant increases in ESAVPD compared to traditional cone-stack arrangements.

However, the preferred rotation direction with respect to spiral angle is forward-facing, which provides a slightly higher particle removal efficiency or improved particle cut size. "Forward-facing" is defined as a spiral which rotates out from the inner diameter in the same direction as the plate or rotor assembly is physically rotating during operation.

Figure 22B:
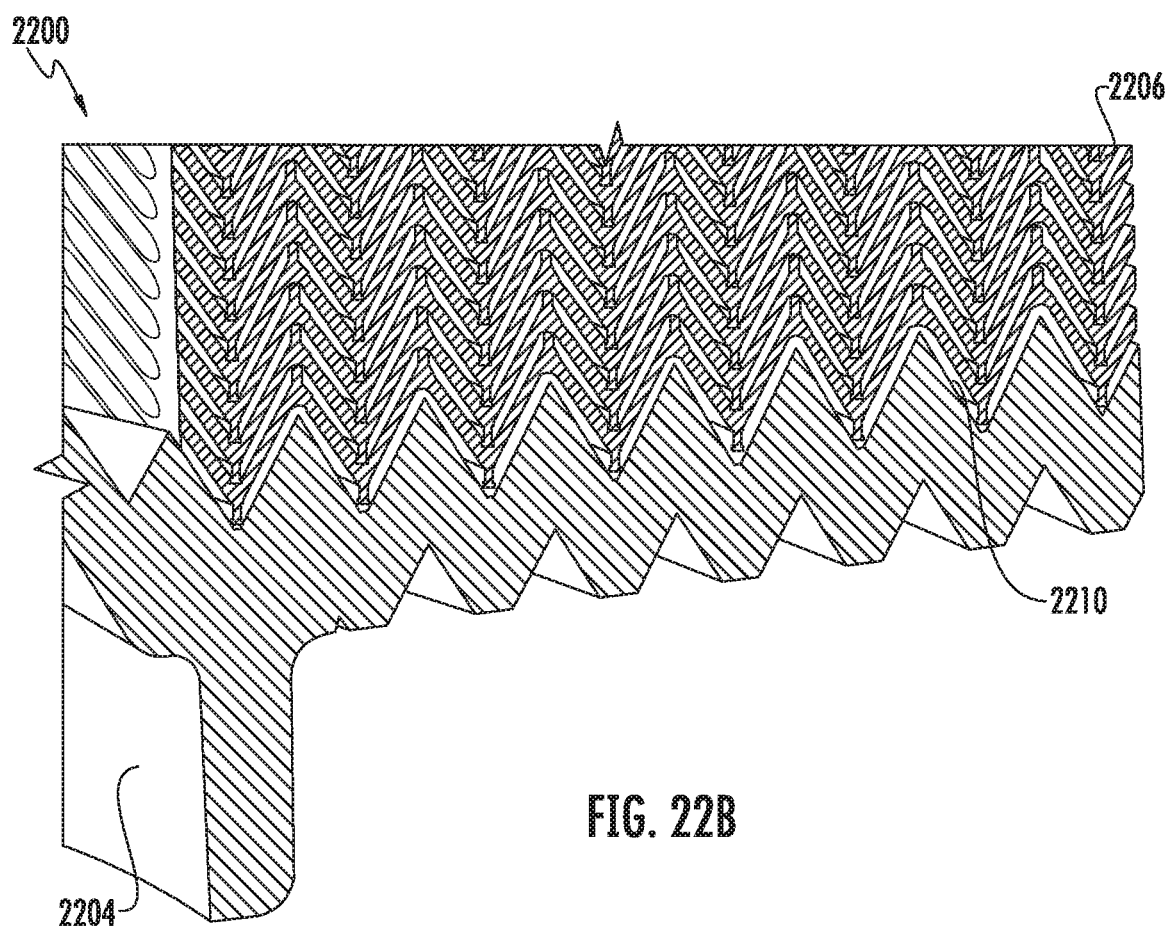
Figure 22C:
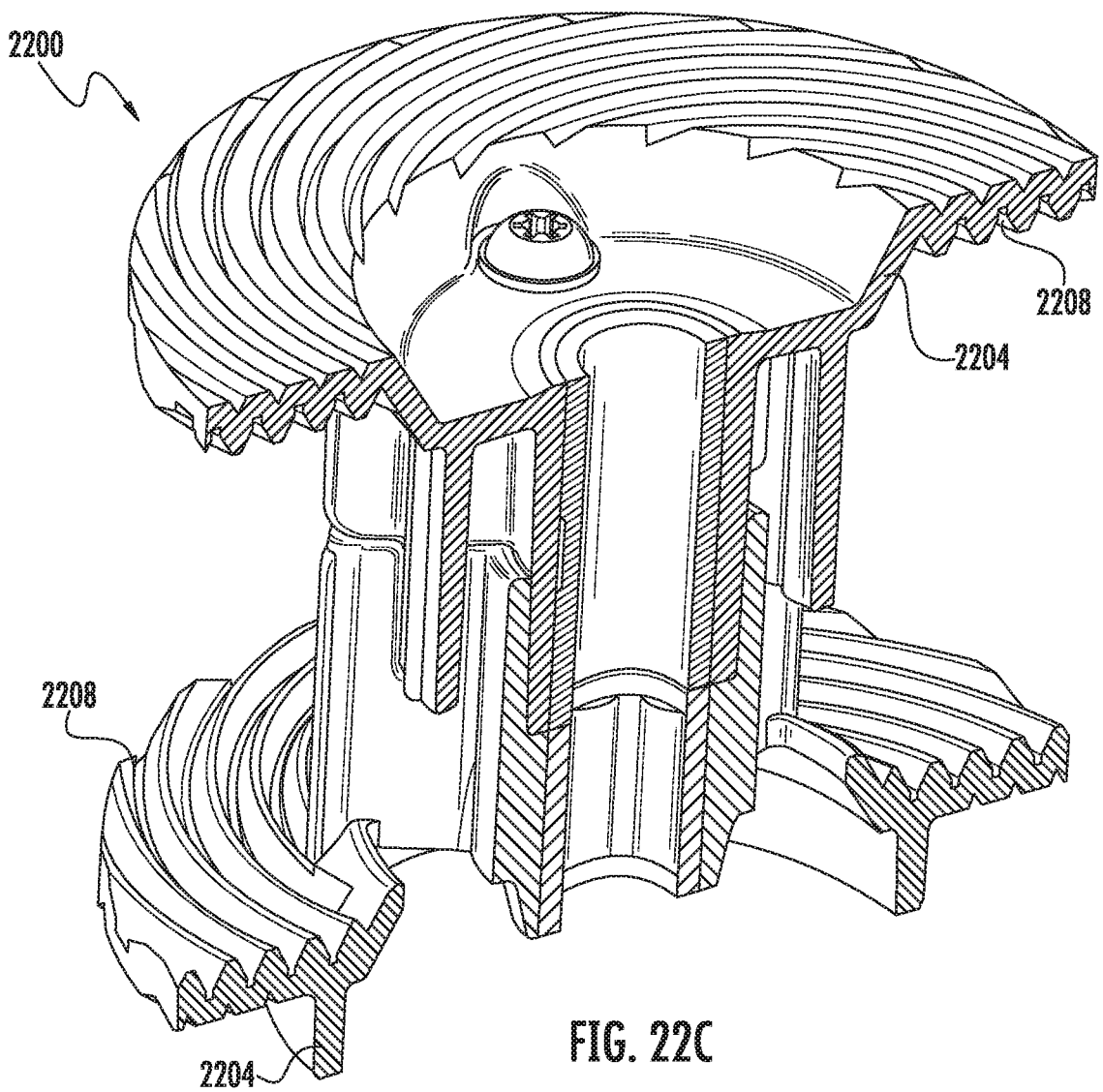
Figure 22D:
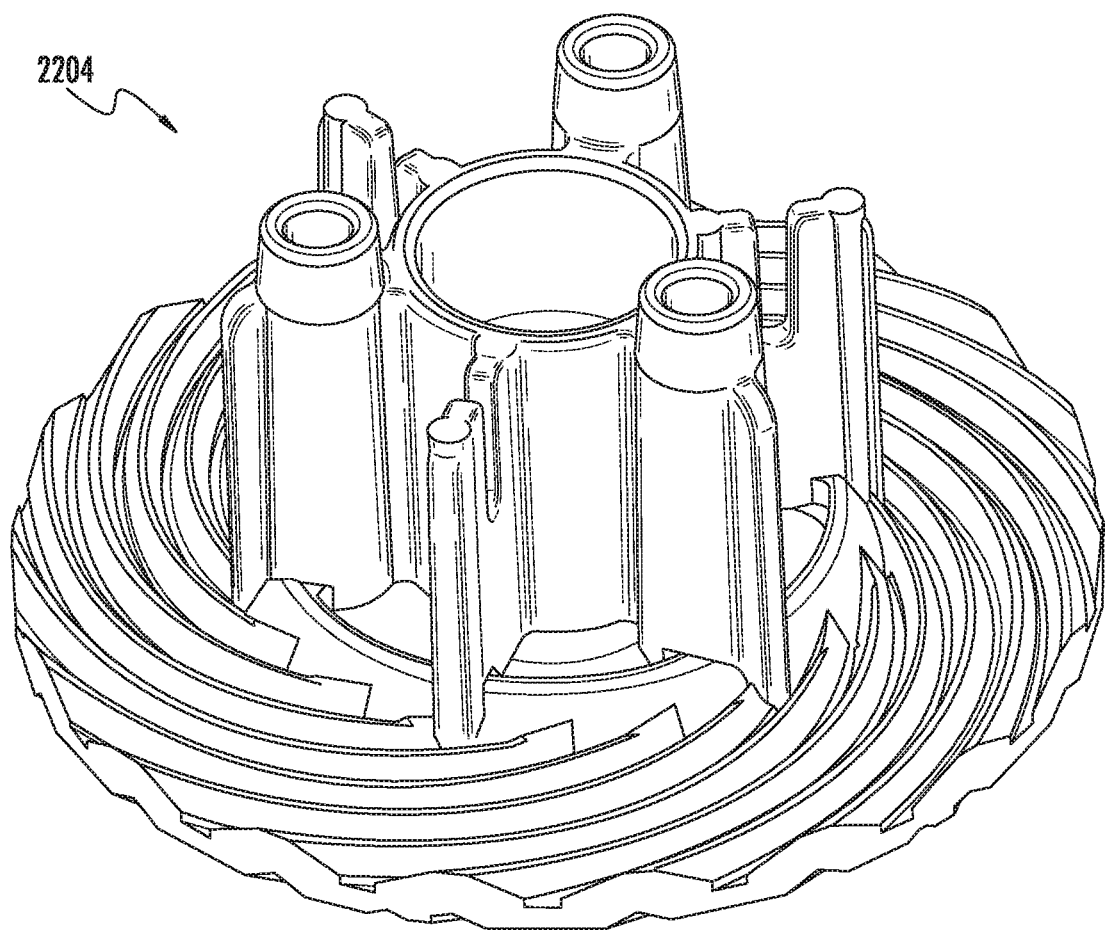
Figure 22E:
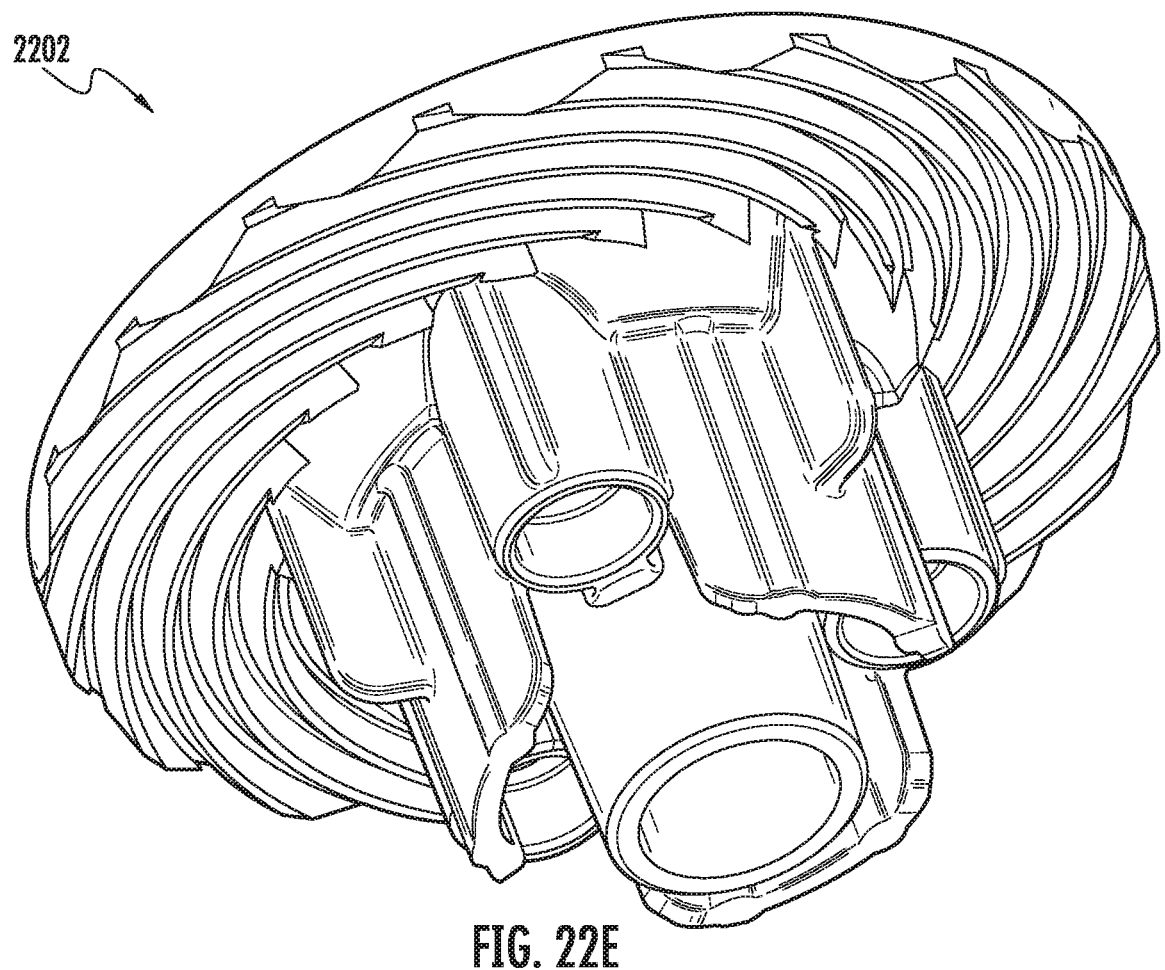

Referring to FIGS. 22A through 22E, views of a rotating coalescer element 2200 are shown according to an example embodiment. FIG. 22A shows a cross-sectional perspective view of the rotating coalescer element 2200. FIG. 22B shows a close-up cross-sectional view of the interaction between a bottom endcap 2204 of the rotating coalescer element 2200 and the stack of separator plates 2206. FIG. 22C shows a cross-sectional perspective view of the rotating coalescer element 2200 having the stack of separator plates 2206 removed. FIG. 22D shows a perspective view of the bottom endcap 2204. FIG. 22E shows a perspective view of the top endcap 2206.

As shown in FIGS. 22A through 22E, the rotating coalescer element 2200 includes a top endcap 2202, a bottom endcap 2204, and a stack of separator plates 2206 positioned between the top endcap 2202 and the bottom endcap 2204. In some arrangements, the separator plates 2206 are the separator plate 300 of FIGS. 3A through 3D. In other arrangements, the separator plates 2206 are any of the other above-described separator plates. In some arrangements, the outer diameter of the top and bottom endcaps 2202 and 2204 is smaller than the outer diameter of the separator plates 2206. In other arrangements, the outer diameter of the top and bottom endcaps 2202 and 2204 is the same size as the outer diameter of the separator plates 2206. In further arrangements, the outer diameter of the top and bottom endcaps 2202 and 2204 is larger than the outer diameter of the separator plates 2206. As shown best in FIG. 22C, the top endcap 2202 and the bottom endcap 2204 each include spiral channels 2208 that are sized and shaped to mate with the spiral channels of the separator plates 2206. Accordingly, when the separator plates 2206 are installed between the top endcap 2202 and the bottom endcap 2204, the peaks and valleys of the separator plates 2206 nest with the peaks and valleys of the spiral channels 2208. The nesting arrangement assists with centering the separator plates 2206 on the top and bottom endcaps 2202 and 2204 during assembly of the rotating coalescer element 2200. Additionally, the nesting arrangement helps facilitate the transfer of torque from the top and bottom endcaps 2202 and 2204 to the stack of separator plates 2206 during rotation of the rotating coalescer element 2200.

In some arrangements, flow channels 2210 are formed between the top endcap 2202 and the top separator plate and the bottom endcap 2204 and the bottom separator plate (e.g., as shown in FIG. 22B). In such arrangements, the ESA of the rotating coalescer element 2200 is increased in comparison to rotating coalescer elements having flat surfaces on the endcaps. For example, in arrangements having forty separator plates 2206, ESA can be increased by 5% through the formation of the flow channels 2210, which results in a 5% increase in residence time for flow passing through the separator plates 2206. The increase in ESA and residence time result in better efficiency and lower pressure drop. The bottom endcap 2204 geometry may either seal the adjacent bottom separator plate or provide a gap that forms the flow channels 2210 which may be similar in shape and size to the flow channels formed between the separator plates 2206. The flow channels 2210 may provide additional flow area between the bottom endcap 2204 and the adjacent separator plate.

In other arrangements, flow channels 2210 are not formed, and a first seal is formed between the top endcap 2202 and the top separator plate and a second seal is formed between the bottom endcap 2204 and the bottom separator plate. In such arrangements, although ESA is not maximized, flow velocity through the separator plates 2206 is increased.

Figure 23A:
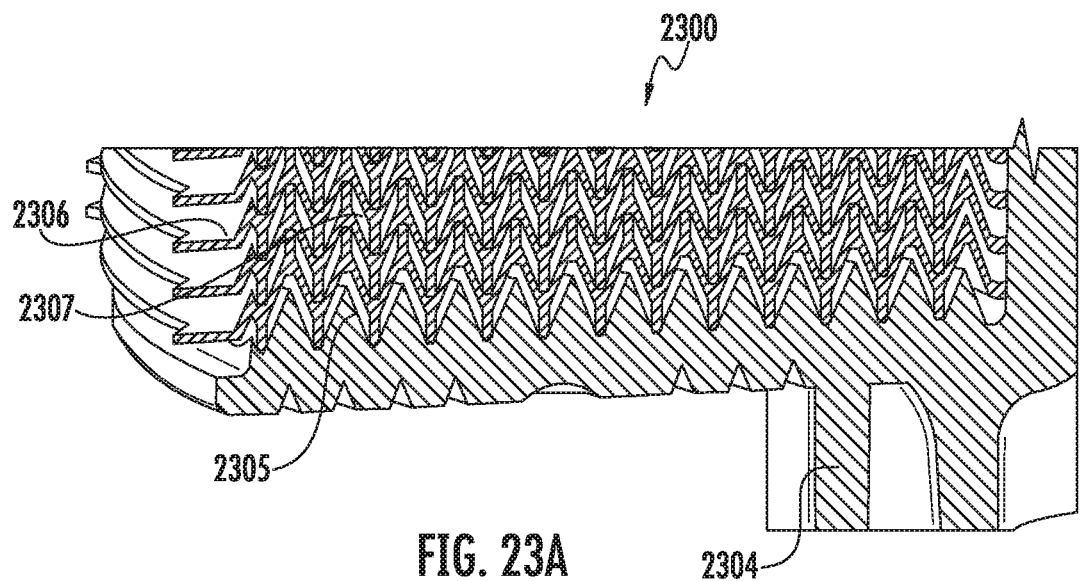
FIG. 23A is a side cross-section view of a portion of a second endcap with a plurality of separator plates stacked thereon according to a particular embodiment, which may be included in any of the rotating coalescer elements described herein.
Figure 23B:
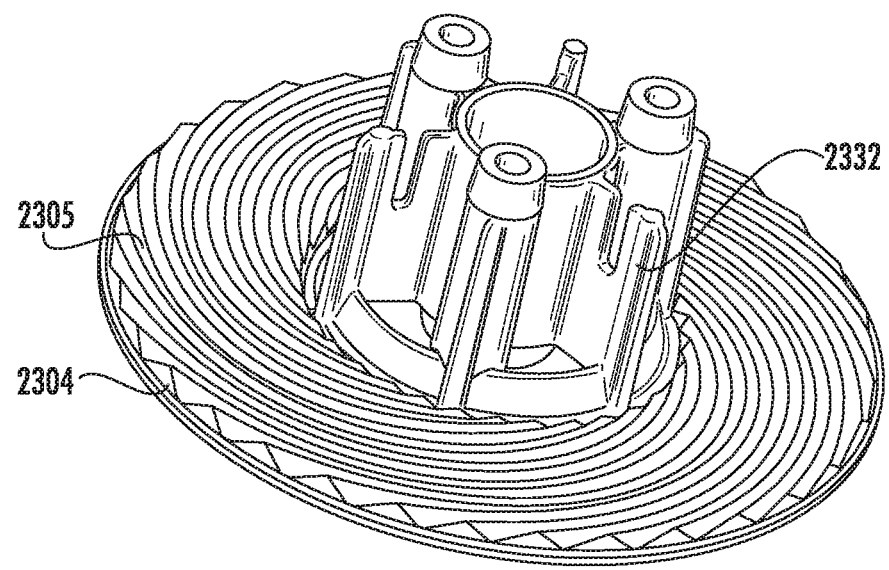
FIG. 23B is a top view of the second endcap.
Figure 24A:
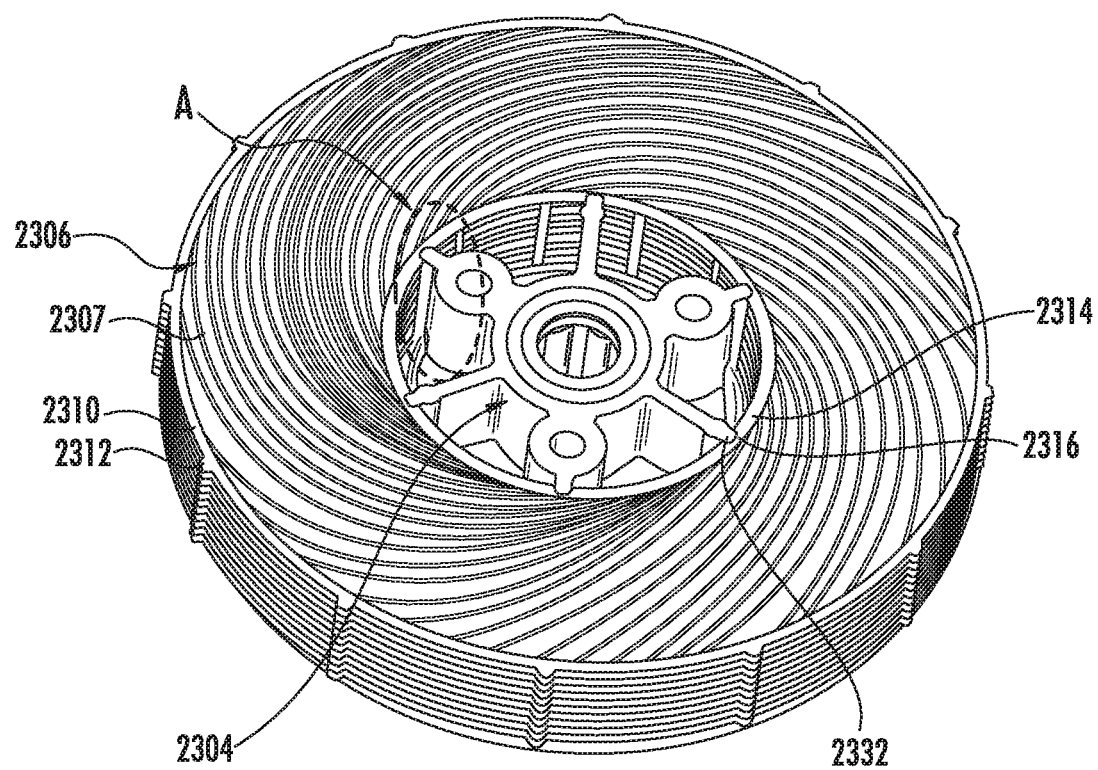
FIG. 24A is a top perspective view of the plurality of separator plates of FIG. 23A stacked on the second endcap of FIG. 23A.
Figure 24B:
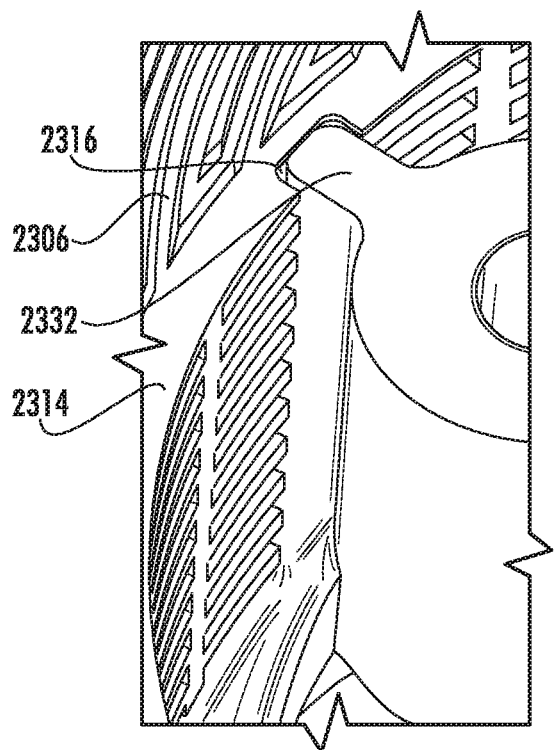
FIG. 24B is an enlarged view of a portion of the plurality of separator plates stacked on the second endcap of FIG. 24A indicated by the arrow A in FIG. 24A.

FIG. 23A is a side cross-section view of a portion of a second endcap 2304 with a plurality of separator plates 2306 stacked thereon, according to a particular embodiment. The separator plates 2306 may be used in any of the rotating coalescer elements described herein. FIG. 23B is a top view of the second endcap 2304. Referring now to FIGS. 23A-25C, the second endcap 2304 may include a bottom endcap which may be used in any of the rotating coalescer elements described herein. The plurality of separator plates 2306 may be stacked on the second endcap 2304 as shown in FIGS. 24A-B, and for example may be positioned between the second endcap 2304 and a first endcap (e.g., a top endcap of a rotating coalescer element structured to mate with the second endcap 2304). In some embodiments, the first endcap and the second endcap 2304 may be coupled via a snap-fit mechanism. As shown in FIGS. 23B and 24A-B, a set of centering ribs 2332 extend axially from the second endcap 2304, respectively, towards the plurality of separator plates 2306.

Each of the plurality of separator plates 2306 define spiral channels 2307 and have a central opening, as previously described herein. The spiral channels 2307 may include involute spiral channels, as previously described herein. The second endcap 2304 has a second outer diameter which is about the same as the outer diameter of the plurality of separator plates 2306. A second set of spiral channels 2305 are formed in the second endcap 2304 which are sized and shape to mate with each of the spiral channels 2307 of a bottom separator plate 2306 of the plurality of separator plates 2306, positioned adjacent thereto as shown in FIG. 23A. The second set of spiral channels 2305 further increase an amount of channel area or otherwise flow area between the second endcap 2304 and the bottom separator plate 2306 of the plurality of separator plates 2306, as well as prevent the stack of the plurality of separator plates 2306 from moving.

FIG. 24A is a top perspective view of the plurality of separator plates of FIG. 23A stacked on the second endcap of FIG. 23A, and FIG. 24B is an enlarged view of a portion of the plurality of separator plates stacked on the second endcap of FIG. 24A indicated by the arrow A in FIG. 24A. As shown in FIGS. 24A-B, each of the plurality of separator plates 2306 include an outer ring 2310 positioned around an outer edge of each of the plurality of separator plates 2306, and an inner ring 2314 positioned around an inner edge of each of the plurality of separator plates 2306 that forms the central opening.

A plurality of protrusions 2312 are provided on an outer periphery of the outer ring 2310. The plurality of protrusions 2312 may serve as spacers or alignment features so as to facilitate positioning of a rotating coalescer element including the plurality of separator plates 2306 within a housing, for example the housing 102 of the crankcase ventilation system 100. The plurality of protrusions 2312 may contact an inner surface of the housing and/or be positioned to mate with corresponding notches, slots, grooves or indents provided on the inner surface of the housing.

Figure 25A:
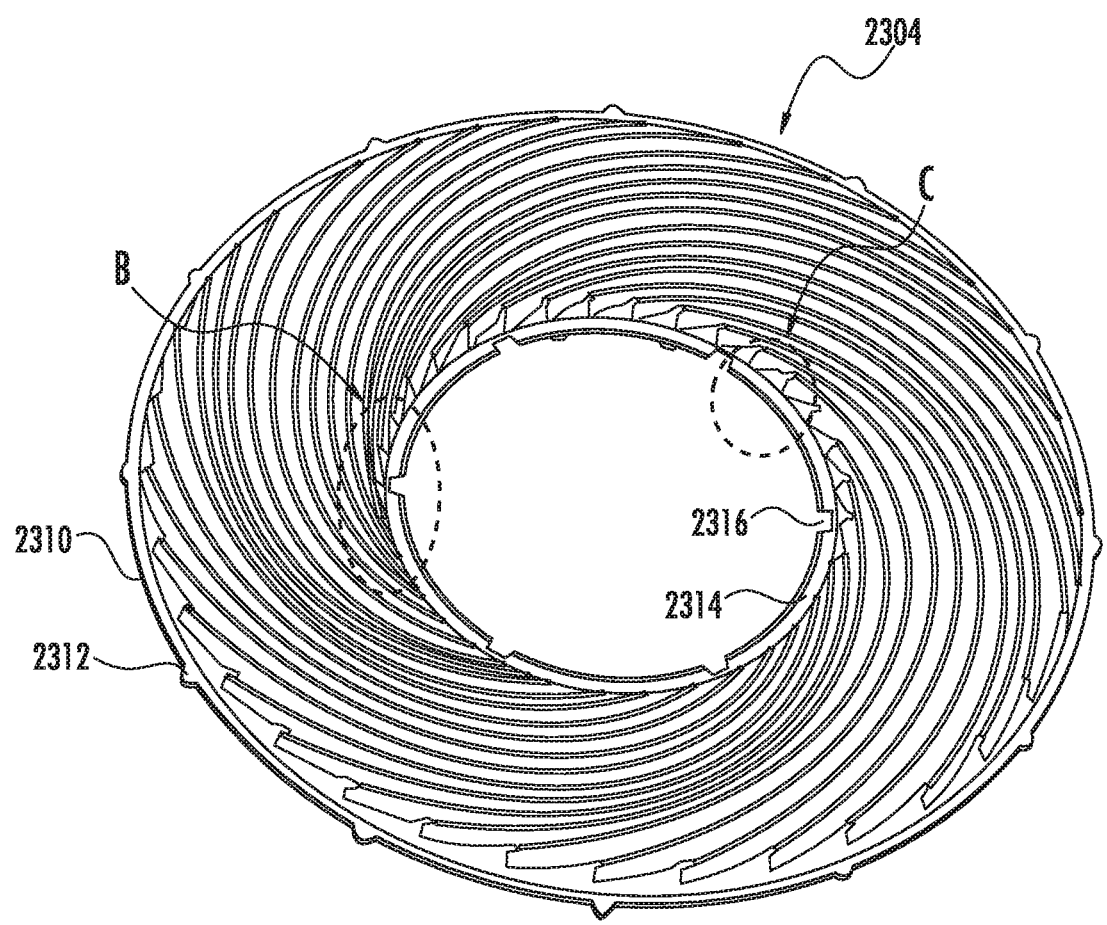
FIG. 25A is a top perspective view of the separator plate of the plurality of separator plates of FIG. 24A-B.
Figure 25B:
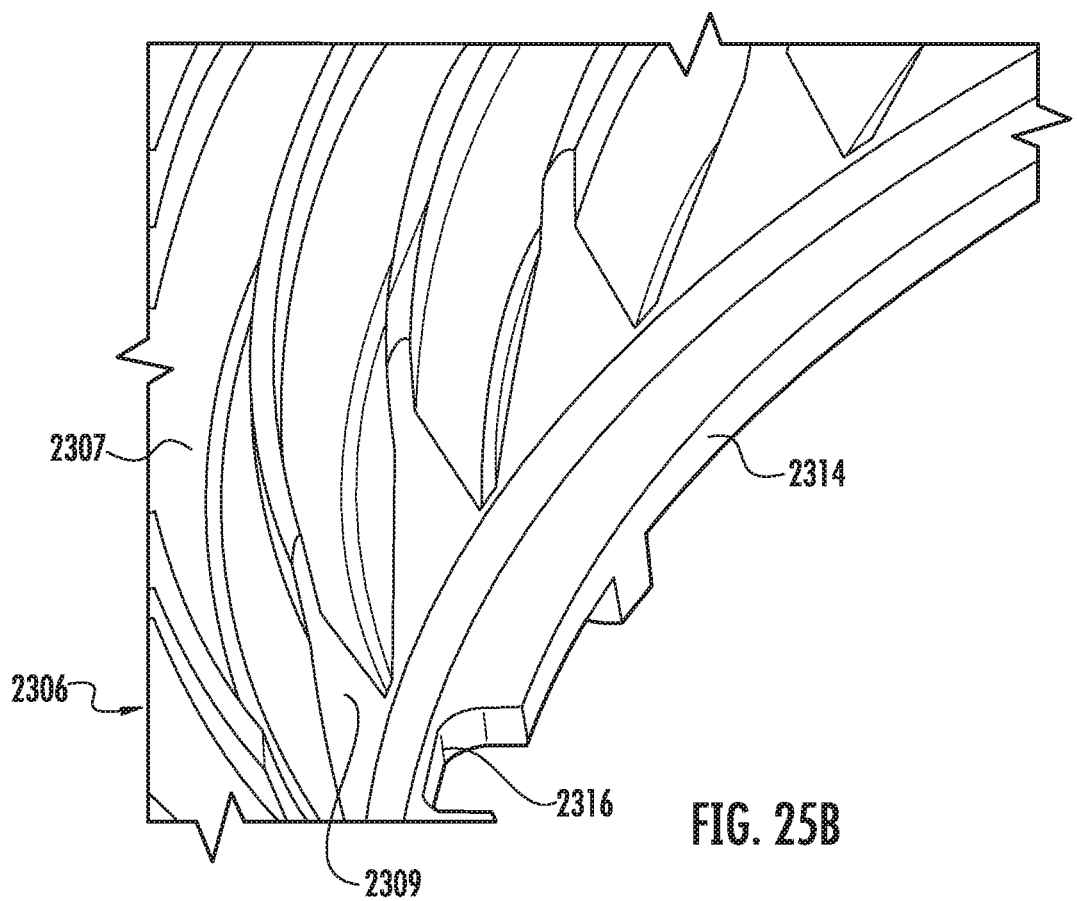
FIG. 25B is a top perspective view of a portion of the separator plate of FIG. 25A indicated by the arrow B in FIG. 25A.
Figure 25C:
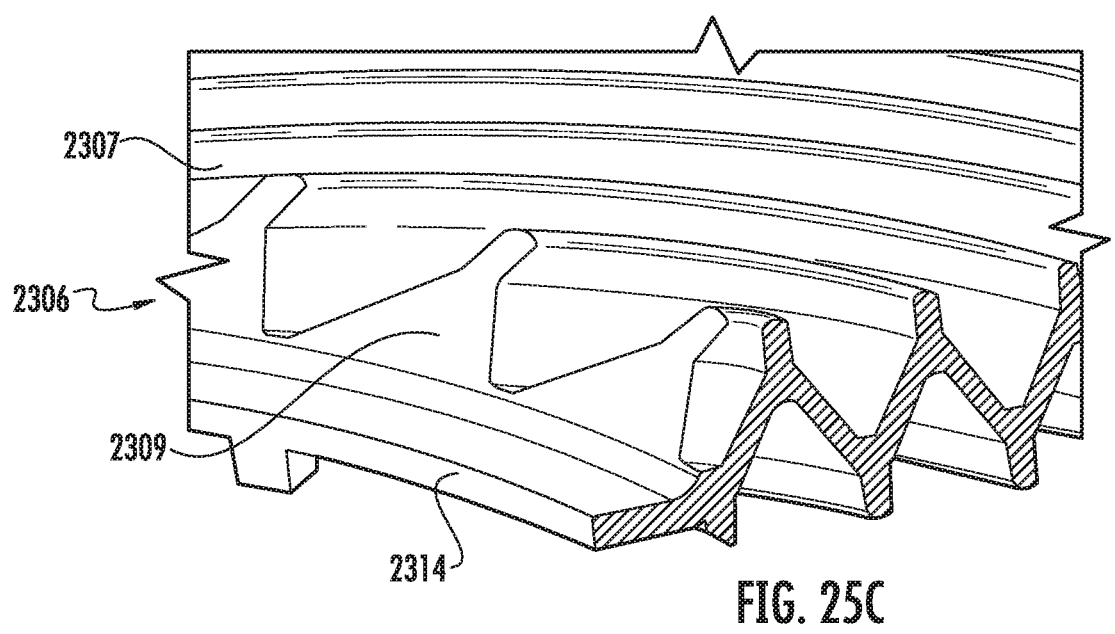
FIG. 25C is a side cross-section view of a portion of the separator plate of FIG. 25A indicated by the arrow C in the FIG. 25A.

As shown in FIGS. 25A-C, a plurality of slots 2316 are defined at predetermined locations in the inner ring 2314. The plurality of slots 2316 correspond to the set of centering ribs 2332 of the second endcap 2304. When stacked on the second endcap 2306, the plurality of slots 2314 of the inner ring 2312 engage corresponding centering ribs 2332 so as to facilitate alignment and prevent movement or sliding of the plurality of separator plates 2306 relative to each other, as well as prevent uneven spacing of the spiral channels 2307. Furthermore, as shown in FIGS. 25B-C, the edges 2309 of each of the plurality of separator plates 2306 may be notched, for example to facilitate filling of the spiral channels 2307.

The above described arrangements of separator plates, separator cones, and separating elements all share the common idea that structures that create generally "non-radial" (and preferably spiral) shaped flow channels (i.e. flow direction has a significant non-radial vector component, the channel surfaces created by structure have a substantially non-zero angle with an axis-perpendicular radial vector) offer improvements in both ESA and ESAVPD, which results in efficiency improvement for separating elements.

It should be noted that any use of the term "example" herein to describe various embodiments is intended to indicate that such embodiments are possible examples, representations, and/or illustrations of possible embodiments (and such term is not intended to connote that such embodiments are necessarily extraordinary or superlative examples).

As used herein, the terms "about" and "approximately" generally mean plus or minus 10% of the stated value. For example, about 0.5 would include 0.45 and 0.55, about 10 would include 9 to 11, about 1000 would include 900 to 1100.

References herein to the positions of elements (e.g., "top," "bottom," "above," "below," etc.) are merely used to describe the orientation of various elements in the FIGURES. It should be noted that the orientation of various elements may differ according to other example embodiments, and that such variations are intended to be encompassed by the present disclosure.

The terms "coupled" and the like as used herein mean the joining of two members directly or indirectly to one another. Such joining may be stationary (e.g., permanent) or movable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present disclosure.

What is claimed is:

1. A plurality of separating plates for a rotating separator element, each of the plurality of separating plates comprising:
a main body having an annular shape defined by an inner diameter and an outer diameter, the inner diameter defining a central opening, the outer diameter defining an outer edge of the main body, the main body comprising a plurality of bends forming a plurality of flow channels positioned between adjacent peaks of a plurality of peaks, each of the plurality of flow channels extending from the inner diameter to the outer diameter, each of the plurality of peaks associated with one of the plurality of bends, the plurality of bends having a spiral shape such that each of the channels is also defined by the spiral shape, each peak of the plurality of peaks comprises a spacer rib projecting from an apex of each of the plurality of peaks, each of the spacer ribs structured to maintain a gap between adjacent separating plates when the plurality of separator plates are stacked on top of each other.

2. The plurality of separating plates of claim 1, wherein the plurality of channels have a V-shaped cross-section.

3. The plurality of separating plates of claim 1, wherein the plurality of channels have a U-shaped cross-section.

4. The plurality of separating plates of claim 1, wherein the plurality of channels are formed on a first side of the main body and a second side of the main body, the second side opposite the first side.

5. The plurality of separating plates of claim 1, wherein each of the plurality of flow channels has a channel width.

6. The plurality of separating plates of claim 5, wherein the channel width is approximately constant from the inner diameter to the outer diameter.

7. The plurality of separating plates of claim 5, wherein the channel width flares from the inner diameter to the outer diameter such that the channel width is wider at the outer diameter than at the inner diameter.

8. The plurality of separating plates of claim 1, wherein each of the plurality of flow channels has an intercept angle of approximately 45 degrees with respect to the inner diameter.

9. The plurality of separating plates of claim 1, wherein the main body includes a plurality of projections extending into the plurality of flow channels.

10. The plurality of separating plates of claim 1, wherein the spiral shape is defined by an Archimedean spiral having an intercept angle of approximately 45 degrees.

11. The plurality of separating plates of claim 1, wherein the spiral shape is defined by an involute spiral.

12. The plurality of separating plates of claim 11, wherein the involute spiral has a starting radius of approximately 70% of the inner diameter.

13. The plurality of separating plates of claim 1, wherein a ratio of the outer diameter to the inner diameter is approximately two.

14. A rotating coalescer element comprising:
a first endcap;
a second endcap; and a separating device positioned between the first endcap and the second endcap, the separating device comprising a plurality of the separating plates arranged in an axially aligned stack, each of the plurality of separating plates comprising:

a main body having an annular shape defined by an inner diameter and an outer diameter, the inner diameter defining a central opening, the outer diameter defining an outer edge of the main body, the main body comprising a plurality of bends forming a plurality of flow channels positioned between adjacent peaks of a plurality of peaks, each of the plurality of flow channels extending from the inner diameter to the outer diameter, each of the plurality of peaks associated with one of the plurality of bends, the plurality of bends having a spiral shape such that each of the channels is also defined by the spiral shape, and wherein each peak of the plurality of peaks comprises a spacer rib projecting from an apex of each of the plurality of peaks, each spacer rib structured to maintain a gap between adjacent separating plates of the plurality of separator plates.

15. The rotating coalescer element of claim 14, wherein the second endcap comprises an axial flow inlet port.

16. The rotating coalescer element of claim 14, further comprising a central tube connecting the first endcap and the second endcap.

17. The rotating coalescer element of claim 14, wherein the separating device comprises a first separating device portion and a second separating device portion, the first separating device portion and the second separating device portion arranged in an axially stacked manner, the second separating device portion comprising the axially aligned stack of the plurality of the separating plates.

18. The rotating coalescer element of claim 17, wherein the first separating device portion comprises filter media.

19. The rotating coalescer element of claim 14, wherein the first endcap comprises a first set of centering ribs, the second endcap comprises a second set of centering ribs, and each of the plurality of separator plates further comprises an inner ring positioned around an inner edge forming the central opening, a plurality of slots defined in the inner ring and structured to engage at least one of the corresponding first set of centering ribs and the second set of centering ribs so as prevent movement of the plurality of separator plates.

20. The rotating coalescing element of claim 14, wherein each of the plurality of separator plates comprise an outer ring positioned around an outer edge of each of the plurality of separator plates, and a plurality of protrusions provided on an outer periphery of the outer ring and structured to facilitate positioning of the plurality of separator plates in a housing.

21. A crankcase ventilation system for an internal combustion engine, the crankcase ventilation system comprising a rotating coalescer element, the rotating coalescer element comprising:

a first endcap;
a second endcap; and
a separating device positioned between the first endcap and the second endcap, the separating device comprising a plurality of the separating plates arranged in an axially aligned stack, each of the plurality of separating plates comprising a main body having an annular shape defined by an inner diameter and an outer diameter, the inner diameter defining a central opening, the outer diameter defining an outer edge of the main body, the main body comprising a plurality of bends forming a plurality of flow channels positioned between adjacent peaks of a plurality of peaks, each of the plurality of flow channels extending from the inner diameter to the outer diameter, each of the plurality of peaks associated with one of the plurality of bends, the plurality of bends having a spiral shape such that each of the channels is also defined by the spiral shape, and wherein each peak of the plurality of peaks comprises a spacer rib projecting from an apex of each of the plurality of peaks, each spacer rib structured to maintain a gap between adjacent separating of the plurality of separating plates.

22. The crankcase ventilation system of claim 21, wherein the first endcap comprises a first set of centering ribs, the second endcap comprises a second set of centering ribs, and each of the plurality of separator plates further comprises an inner ring positioned around an inner edge forming the central opening, a plurality of slots defined in the inner ring and structured to engage at least one of the corresponding first set of centering ribs and the second set of centering ribs so as prevent movement of the plurality of separator plates.

23. The crankcase ventilation system of claim 21, wherein each of the plurality of separator plates comprise an outer ring positioned around an outer edge of each of the plurality of separator plates, and a plurality of protrusions provided on an outer periphery of the outer ring and structured to facilitate positioning of the plurality of separator plates in a housing.

24. A rotating coalescer element comprising:

a first endcap;
a second endcap; and
a separating device positioned between the first endcap and the second endcap, the separating device comprising a plurality of the separating plates arranged in an axially aligned stack, each of the plurality of separating plates comprising:

a main body having an annular shape defined by an inner diameter and an outer diameter, the inner diameter defining a central opening, the outer diameter defining an outer edge of the main body, the main body comprising a plurality of bends forming a plurality of flow channels positioned between adjacent peaks of a plurality of peaks, each of the plurality of flow channels extending from the inner diameter to the outer diameter, each of the plurality of peaks associated with one of the plurality of bends, the plurality of bends having a spiral shape such that each of the channels is also defined by the spiral shape, wherein the first endcap comprises a first set of centering ribs, the second endcap comprises a second set of centering ribs, and each of the plurality of separator plates further comprises an inner ring positioned around an inner edge forming the central opening, a plurality of slots defined in the inner ring and structured to engage at least one of the corresponding first set of centering ribs and the second set of centering ribs so as prevent movement of the plurality of separator plates.

25. A crankcase ventilation system for an internal combustion engine, the crankcase ventilation system comprising a rotating coalescer element, the rotating coalescer element comprising:

a first endcap;
a second endcap; and
a separating device positioned between the first endcap and the second endcap, the separating device comprising a plurality of the separating plates arranged in an axially aligned stack, each of the plurality of separating plates comprising a main body having an annular shape defined by an inner diameter and an outer diameter, the inner diameter defining a central opening, the outer diameter defining an outer edge of the main body, the main body comprising a plurality of bends forming a plurality of flow channels positioned between adjacent peaks of a plurality of peaks, each of the plurality of flow channels extending from the inner diameter to the outer diameter, each of the plurality of peaks associated with one of the plurality of bends, the plurality of bends having a spiral shape such that each of the channels is also defined by the spiral shape, wherein the first endcap comprises a first set of centering ribs, the second endcap comprises a second set of centering ribs, and each of the plurality of separator plates further comprises an inner ring positioned around an inner edge forming the central opening, a plurality of slots defined in the inner ring and structured to engage at least one of the corresponding first set of centering ribs and the second set of centering ribs so as prevent movement of the plurality of separator plates.

* * * * *